US011990702B2

(12) United States Patent
Pachoud et al.

(10) Patent No.: US 11,990,702 B2
(45) **Date of Patent: *May 21, 2024**

(54) ELECTRICAL CORD CAP WITH EASY CONNECT HOUSING PORTIONS

(71) Applicant: Zonit Structured Solutions, LLC, Boulder, CO (US)

(72) Inventors: William Pachoud, Boulder, CO (US); Steve Chapel, Iliff, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,862

(22) Filed: Mar. 29, 2022

(65) Prior Publication Data

US 2022/0368059 A1 Nov. 17, 2022

Related U.S. Application Data

(63) Continuation of application No. 16/827,626, filed on Mar. 23, 2020, now Pat. No. 11,289,844, which is a (Continued)

(51) Int. Cl.
*H01R 13/50* (2006.01)
*H01R 13/405* (2006.01)

(Continued)

(52) U.S. Cl.
CPC ......... *H01R 13/501* (2013.01); *H01R 13/405* (2013.01); *H01R 13/58* (2013.01);

(Continued)

(58) Field of Classification Search
CPC .... H01R 13/501; H01R 13/405; H01R 13/58; H01R 13/6271; H01R 13/70; H01R 13/6666; H01R 43/20

(Continued)

(56) References Cited

U.S. PATENT DOCUMENTS 4,721,475 A * 1/1988 Burke, Jr. .......... H01R 13/6392 439/304
5,352,132 A 10/1994 O'Keefe et al.

(Continued)

FOREIGN PATENT DOCUMENTS

EP 2 483 977 B1 11/2014
WO 2014/134218 A1 9/2014

OTHER PUBLICATIONS

Office Action, dated Oct. 28, 2022, from related CA Application No. 3,133,279.

(Continued)

*Primary Examiner* — Khiem M Nguyen
(74) *Attorney, Agent, or Firm* — Davis Graham & Stubbs LLP

(57) ABSTRACT

An electrical connector body is provided includes first and second housing portions formed from molded plastic. The housing portions include first and second interface surfaces that are configured to butt against one another to define a housing and one or more electrical components are disposed within an interior of the housing. The one or more electrical components may comprise connectors of a male or female cord cap, an in-line surge suppression circuit, and/or a compact automatic transfer switch. In one implementation, each of the first and second connector body portions may include a strain relief extension for engaging an electrical cord and a compression member (3691) may be disposed over the strain relief extensions to secure together the first and second connector body portions. The compression member may be selected from a set of compression members based on a size of the electrical cord.

23 Claims, 100 Drawing Sheets

Related U.S. Application Data continuation-in-part of application No. 16/824,554, filed on Mar. 19, 2020, now Pat. No. 11,664,677, and a continuation-in-part of application No. 16/817,504, filed on Mar. 12, 2020.

(60) Provisional application No. 62/820,726, filed on Mar. 19, 2019, provisional application No. 62/817,456, filed on Mar. 12, 2019.

(51) Int. Cl.

| | |
|---|---|
| ***H01R 13/58*** | (2006.01) |
| ***H01R 13/627*** | (2006.01) |
| ***H01R 13/66*** | (2006.01) |
| ***H01R 13/70*** | (2006.01) |
| ***H01R 43/20*** | (2006.01) |

(52) U.S. Cl.
CPC ..... *H01R 13/6271* (2013.01); *H01R 13/6666* (2013.01); *H01R 13/70* (2013.01); *H01R 43/20* (2013.01)

(58) Field of Classification Search
USPC .................................................. 439/366–371
See application file for complete search history.

(56) References Cited

U.S. PATENT DOCUMENTS

| | | | | |
|---|---|---|---|---|
| 5,507,664 | A * | 4/1996 | Carmo | H01R 13/629 439/372 |
| 6,507,882 | B1 | 1/2003 | Golka | |
| 7,553,181 | B1 * | 6/2009 | Van Dalinda, III | H01R 13/6392 174/92 |
| 7,791,890 | B2 | 9/2010 | Ishida | |
| 8,138,634 | B2 | 3/2012 | Ewing | |
| 8,476,540 | B2 * | 7/2013 | Dahl | H02G 3/088 439/369 |
| 8,729,730 | B2 | 5/2014 | Lathrop | |
| 8,917,493 | B2 | 12/2014 | Wang | |
| 9,537,341 | B2 | 1/2017 | Lee | |
| 9,722,381 | B1 | 8/2017 | Moen | |
| 10,088,883 | B2 | 10/2018 | Cohen | |
| 11,289,844 | B2 * | 3/2022 | Pachoud | H01R 13/6271 |
| 2003/0117761 | A1 | 6/2003 | Pebles et al. | |
| 2010/0068913 | A1 * | 3/2010 | Edge | H01R 13/6392 439/369 |
| 2010/0141038 | A1 | 6/2010 | Chapel et al. | |
| 2011/0207362 | A1 * | 8/2011 | Lifson | H01R 13/6392 439/369 |
| 2017/0005510 | A1 | 1/2017 | Rohr et al. | |
| 2017/0279267 | A1 | 9/2017 | Cheng | |

OTHER PUBLICATIONS

Non-Final Office Action, dated Nov. 10, 2022, from related U.S. Appl. No. 16/905,822.
Office Action, dated Nov. 14, 2022, from related CA Application No. 3,134,050.
Non-Final Office Action, dated Nov. 23, 2022, from related U.S. Appl. No. 17/707,862.
Communication pursuant to Rules 70(2) and 70a(2) EPC, dated Nov. 25, 2022, from related EP Application No. 20772758.7.
Final Office Action, dated Dec. 5, 2022, from related U.S. Appl. No. 17/093,485.
Final Office Action, dated Dec. 7, 2022, from related U.S. Appl. No. 16/905,846.
Communication pursuant to Rules 70(2) and 70a(2) EPC, dated Dec. 16, 2022, from related EP Application No. 20769754.1.
Office Action, dated Jan. 4, 2023, from related CA Application No. 3, 134,065.
Notice of Allowance, dated Jan. 19, 2023, from related U.S. Appl. No. 16/824,554.

* cited by examiner

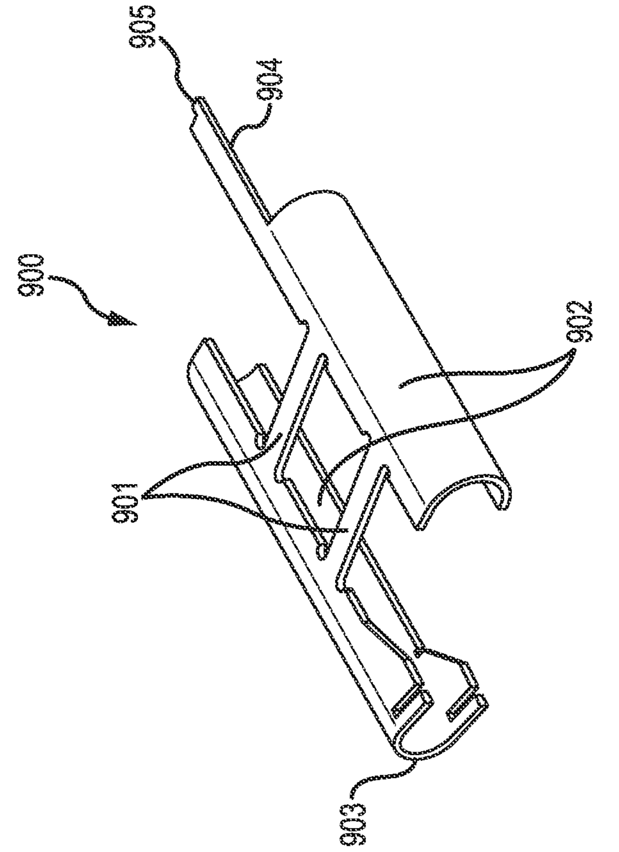
FIG. 1H
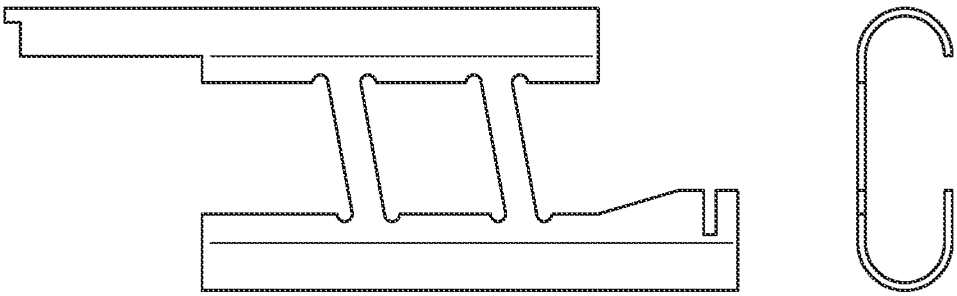

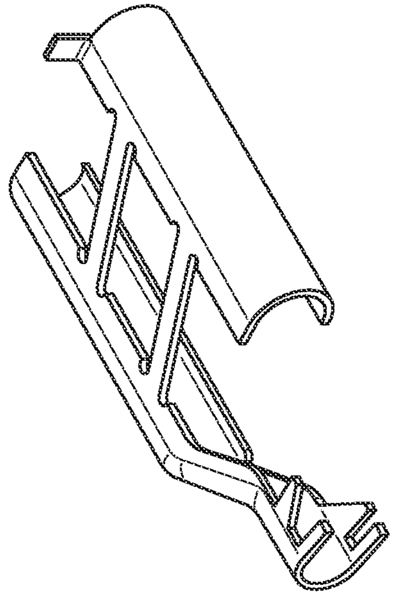
FIG. 11
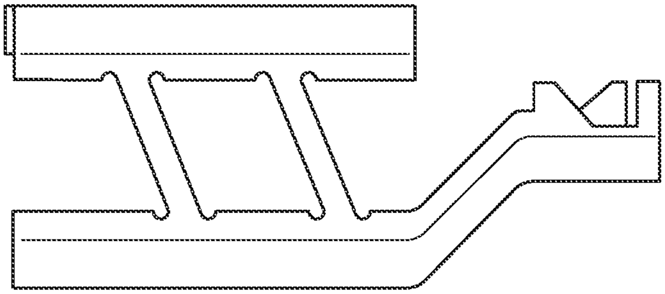
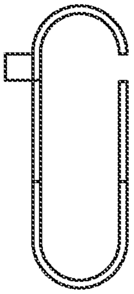

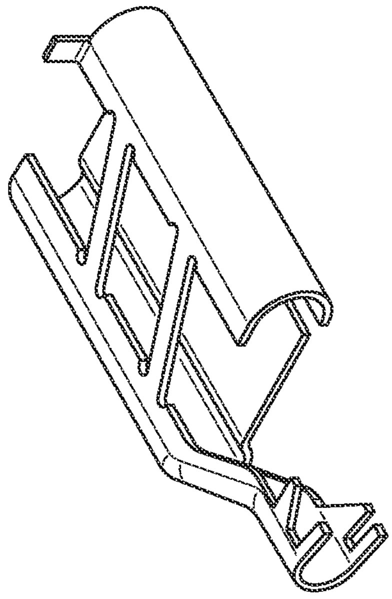
FIG. 1J
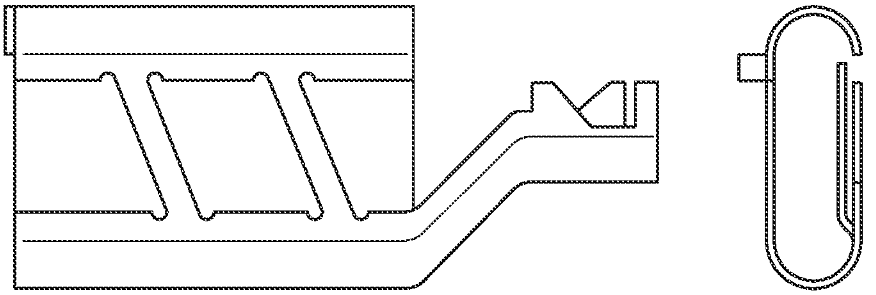

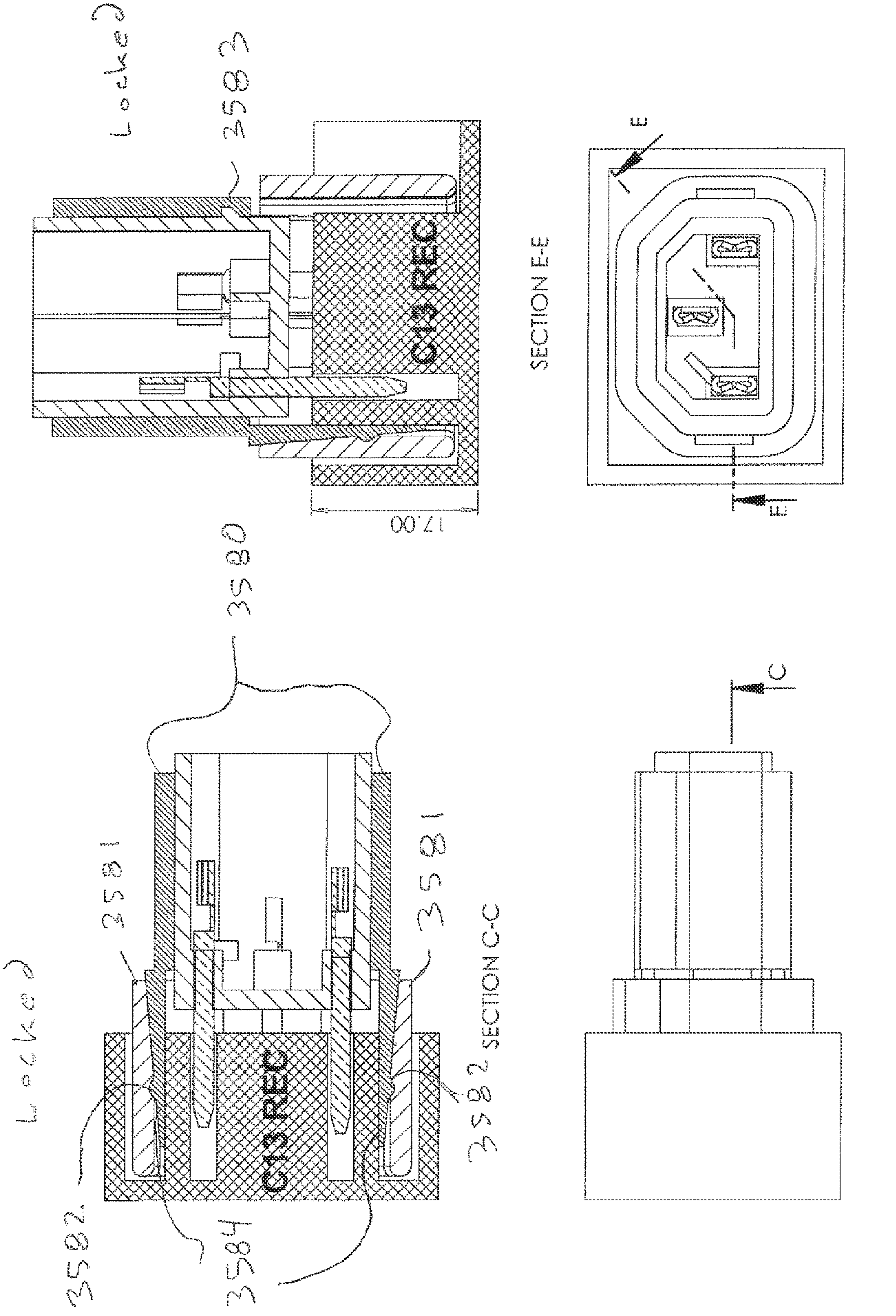
Figure 18-K 2

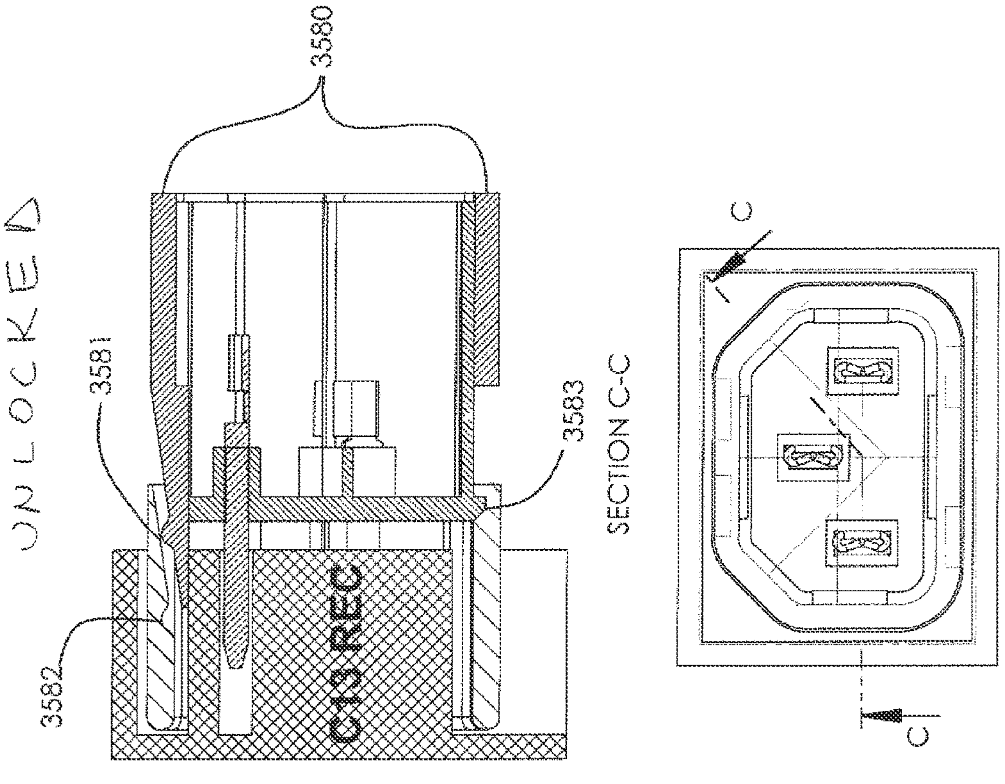
Figure 18-K 2b

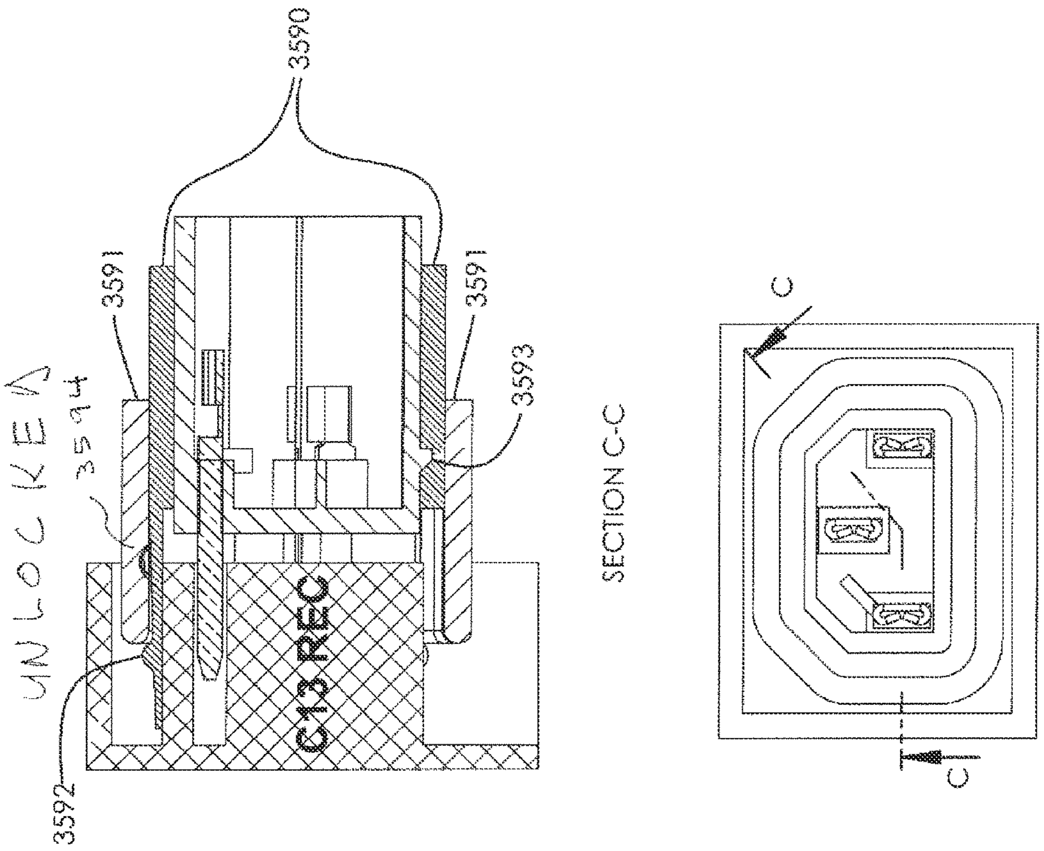
Figure 18-K 3

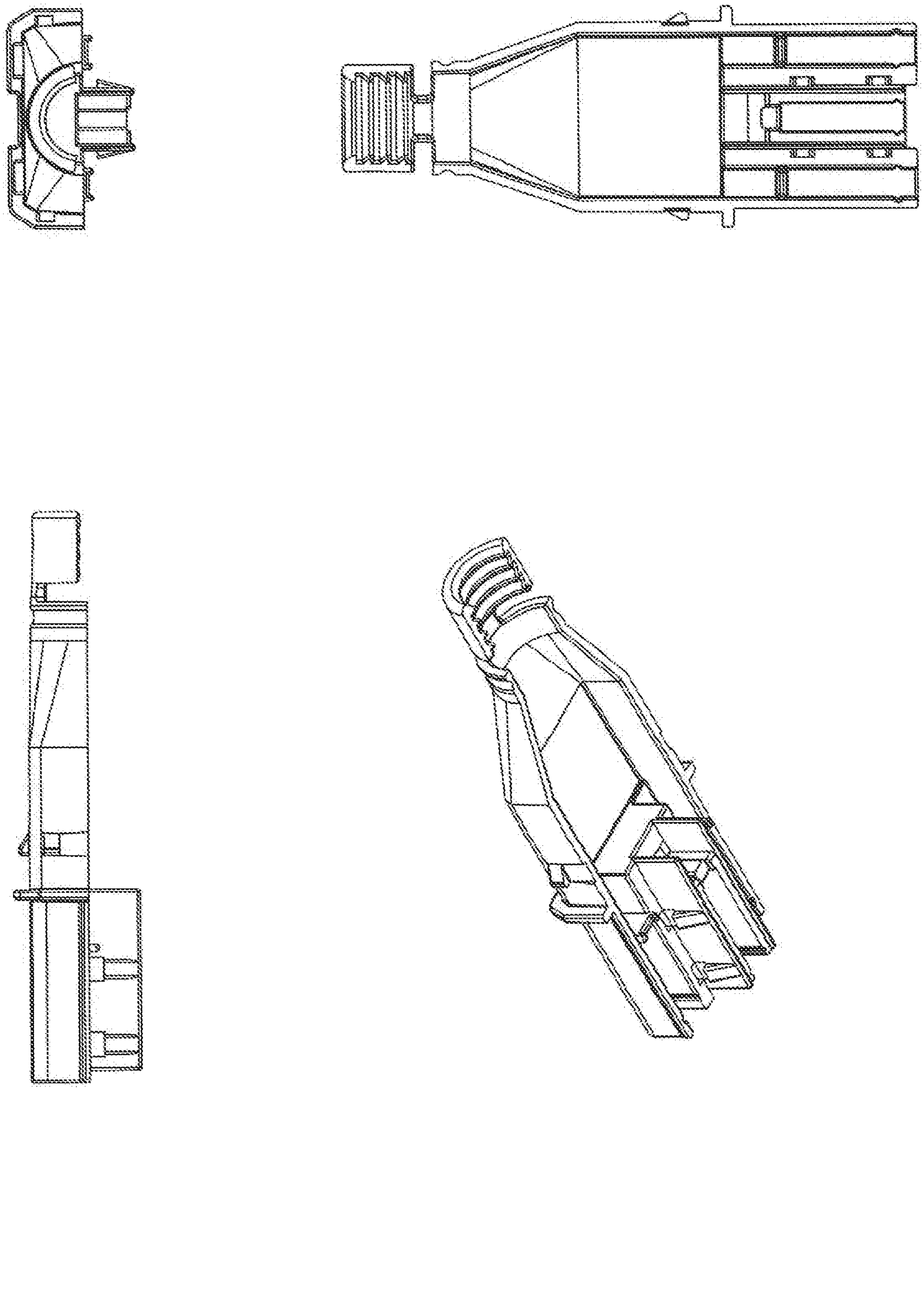
Fig. 18 G-G

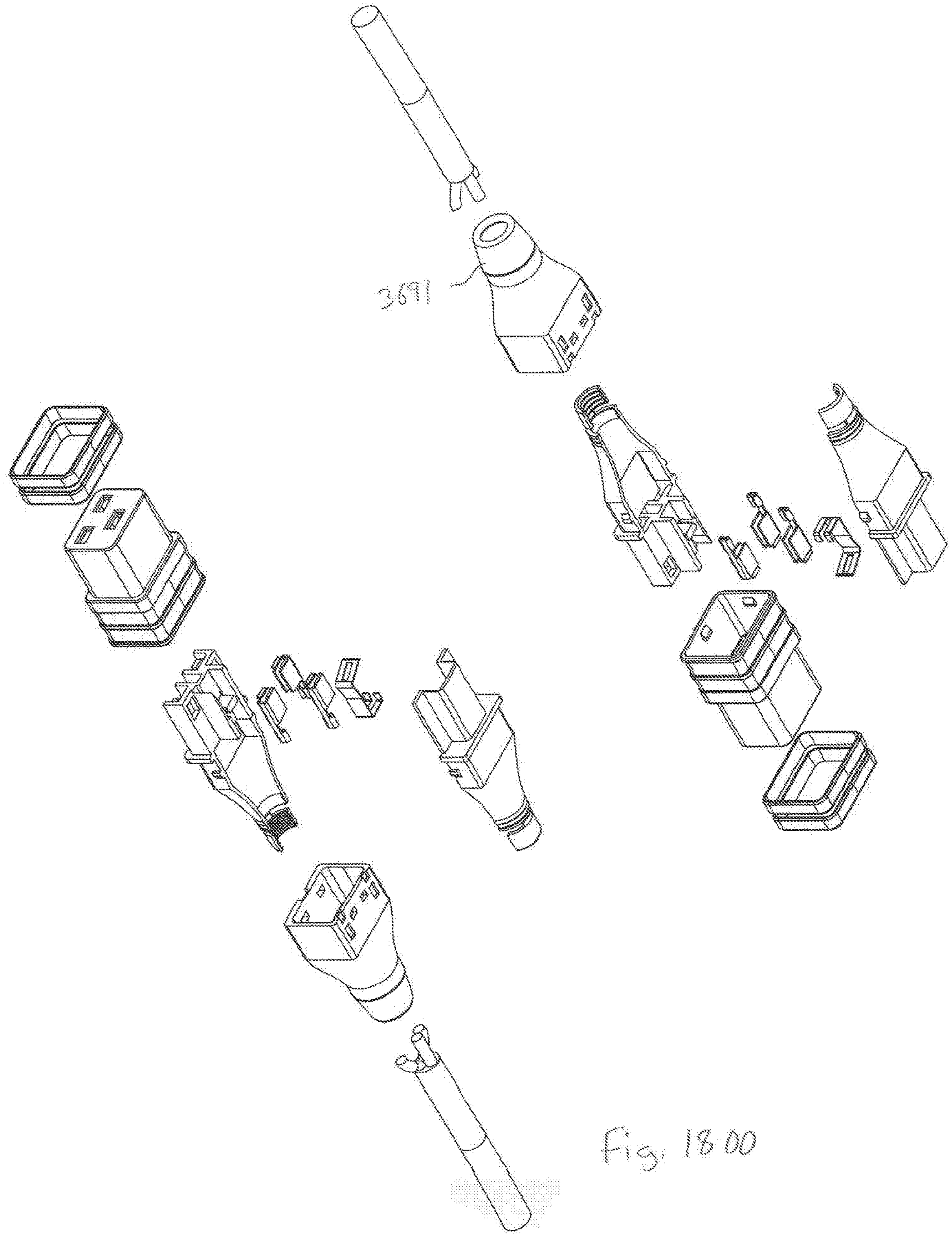
Fig. 1800

ELECTRICAL CORD CAP WITH EASY CONNECT HOUSING PORTIONS

CROSS-REFERENCE TO RELATED APPLICATION

This application is a continuation of U.S. patent application Ser. No. 16/827,626 entitled "ELECTRICAL CORD CAP WITH EASY CONNECT HOUSING PORTIONS" filed on Mar. 23, 2020, which is a continuation in part of U.S. patent application Ser. No. 16/817,504, entitled, "RELAY CONDITIONING AND POWER SURGE CONTROL", filed on Mar. 12, 2020, which claims benefit of provisional of U.S. Provisional Application No. 62/817,456, entitled, "RELAY CONDITIONING AND POWER SURGE CONTROL", filed on Mar. 12, 2019. U.S. patent application Ser. No. 16/824,626 is also a continuation in part of U.S. application Ser. No. 16/824,554, entitled, "INTELLIGENT AUTOMATIC TRANSFER SWITCH MODULE" filed on Mar. 19, 2020 which claims benefit of provisional of U.S. Provisional Application No. 62/820,726, entitled, "INTELLIGENT AUTOMATIC TRANSFER SWITCH MODULE," filed Mar. 19, 2019. The contents of the above-noted applications (collectively, the "parent applications") are incorporated by reference herein as if set forth in full and priority to these applications are claimed to the full extent allowable under U.S. law and regulations.

INCORPORATED BY REFERENCE

The following cases are incorporated by reference herein:

1. U.S. patent application Ser. No. 14/217,278, entitled, "FRICTIONAL LOCKING RECEPTACLE WITH PROGRAMMABLE RELEASE," filed on Mar. 17, 2014, which is a nonprovisional of from U.S. Provisional Patent Application No. 61/799,971, entitled, "SECURE ELECTRICAL RECEPTACLE," filed on Mar. 15, 2013, and claims the benefit of U.S. Provisional Patent Application No. 61/944,506, entitled, "FRICTIONAL LOCKING RECEPTACLE WITH PROGRAMMABLE RELEASE," filed on Feb. 25, 2014.

2. U.S. patent Ser. No. 13/228,331, entitled, "LOCKING ELECTRICAL RECEPTACLE WITH ELONGATE CLAMPING SURFACES," filed on Sep. 8, 2011, which is a continuation-in-part of and claims priority to U.S. patent Ser. No. 12/568,444, entitled, "LOCKING ELECTRICAL RECEPTACLE," filed on Sep. 28, 2009, which in turn is a continuation-in-part of U.S. patent Ser. No. 12/531,235, entitled, "LOCKING ELECTRICAL RECEPTACLE," filed on Sep. 14, 2009, which is the U.S. National Stage of PCT Application US2008/57149, entitled, "LOCKING ELECTRICAL RECEPTACLE," filed Mar. 14, 2008, which claims priority from U.S. Provisional Application No. 60/894,849, entitled, "LOCKING ELECTRICAL RECEPTACLE," filed on Mar. 14, 2007.

3. U.S. application Ser. No. 13/088,234, entitled, "LOCKING ELECTRICAL RECEPTACLE" filed on Apr. 15, 2011, which claims priority from U.S. Provisional Application Ser. No. 61/324,557, filed Apr. 15, 2010, entitled "LOCKING ELECTRICAL RECEPTACLE SECURE LOCKING MECHANISM;" The contents of all of the above-noted applications, including the parent applications, are incorporated herein by reference as if set forth in full.

BACKGROUND

A wide variety of electrical connectors are known to provide electrical contact between power supplies and electrical devices. Connectors typically include prong type terminals, generally referred to as plugs, and female connectors designed for receiving the prong type terminals, generally referred to as receptacles, often described as electrical outlets, or simply outlets. The most common types of outlets include a pair of terminal contacts that receive the prongs of a plug that are coupled to "hot" and "neutral" conductors. Further, outlets may include a terminal contact that receives a ground prong of a plug. A variety of standards have been developed for outlets in various regions of the world. Regardless of the standard at issue, the design of the aforementioned most common plug and receptacle system generally incorporates a friction only between metallic contacts means of securing the two in the mated position. The frictional coefficient varies depending on a variety of conditions, including, but not limited to, manufacturing processes, foreign materials acting as lubricants, and wear and distortion of the assemblies. This characteristic results in a non-secure means of interconnecting power between two devices. It is arguably the weakest link in the power delivery system to electrical or electronic devices utilizing the system. However, it has been adopted worldwide as a standard, and is used primarily due to low cost of manufacture, ease of quality control during manufacture, and efficient use of space for the power delivery it is intended to perform. The primary limitation of this connection technique is simply the friction fit component. In some applications where the continuity of power may be critical, such as data or medical applications, a technique to secure the mated connection may be desirable to improve the reliability. This may especially be true in mechanically active locations, such as where vibration is present, or where external activity may cause the cords attached to the plugs and receptacles to be mechanically deflected or strained in any manner. It is against this background that the secure electrical receptacle of the present invention has been developed.

SUMMARY

The present invention is directed to electrical connector bodies and methods for constructing such bodies. Electrical connector bodies include housings for electrical components that terminate or are interposed on electrical cords. Common examples are cord caps that form a male plug or female receptacle for connecting cords to wall outlets, power strips, other cords, electrical equipment, or other connectors. The present invention discloses embodiments implementing locking cord caps that inhibit unintentional breaking of such connections. The present invention also includes connector bodies embodying in-line surge suppression circuits and compact automatic transfer switches mounted on electrical power cords (typically at least two input power cords and an output that may connect to a cord or directly to a piece of equipment), among other things. The invention simplifies construction by reducing or eliminating the need for PVC over-molding and enabling electrical connector bodies to be formed by joining injection molded housing portions. In one implementation, the housing portions can be joined by slipping a compression cone over strain relief extensions of the housings to concomitantly join the housing portions and compressingly engage the electrical cord. This greatly simplifies construction and allows for construction and assembly to be distributed across manufacturers and geographies to facilitate various business and distribution strategies.

In accordance with one aspect of the present invention, a method is provided for assembling an electrical cord connector body. The method involves providing first and second connector body housing portions formed from injection molded plastic. The first and second connector body housing portions include first and second interface surfaces that are configured to butt against one another to define a housing interface. The method further involves disposing one or more electrical components on the first connector body housing portion and positioning the second connector body housing portion over the first connector body housing portion so that the first and second interface surfaces are in an aligned, butting relationship. The first and second connector body housing portions are then secured together to form the electrical cord connector body.

As noted above, the electrical cord connector body can embody a number of different types of electrical components. In this regard, the electrical components may include connection contacts for forming an electrical connection between an electrical plug and an electrical outlet. For example, the electrical cord connector body may form a cord cap for a male plug or female outlet. The cord cap may be a locking cord cap. Alternatively or additionally, the electrical components may include a surge suppression circuit disposed on the electrical cord and/or a compact automatic transfer switch mounted on the electrical cord. In one implementation, the first and second housing portions are provided as a single molded piece. In this regard, the molded piece can be folded so that the second connector body housing portion is positioned over the first connector body housing portion. The housing portions may include alignment elements or mating connectors.

The housing portions can be secured together by various techniques including adhesives, welding, and/or snapping together. In one implementation, each of the housing portions includes a strain relief extension for engaging the electrical cord. The strain relief sections can be captured by a compression element that secures the strain relief extensions and the connector body portions together as well as compressively engaging the electrical cord. In this regard, a set of compression elements may be provided to fit different size electrical cords. The compression element may, for example, have a generally conical shape such that it progressively presses the housing portions together as it slides over the strain relief extensions. The strain relief extensions and compression element may be constructed so that they compression element snaps into place at the desired location over the strain relief extensions.

In accordance with another aspect of the present invention, an electrical connector body is provided. The connector body includes first and second housing portions formed from molded plastic. The housing portions include first and second interface surfaces that are configured to butt against one another to define a housing interface. One or more alignment features are disposed at the housing interface to assist in aligning the first and second connector body housing portions for securing the housing portions together to form a housing. In addition, one or more electrical components are disposed within an interior of the housing.

As discussed above, the one or more electrical components may comprise connectors of a male or female cord cap, an in-line surge suppression circuit, and/or a compact automatic transfer switch. The alignment features may include mating structures formed on opposing surfaces of the first and second housing portions or structure for snapping the housing portions together. In one implementation, housing portions are formed from a single piece of injection molded plastic that includes a fold line for folding the piece over so that the first and second housing portions are in aligned, butting relationship. In addition, each of the first and second connector body portions may include a strain relief extension for engaging an electrical cord. In this regard, the connector body may further include a compression member disposed over the strain relief extensions to secure together the first and second connector body portions. The compression member may be selected from a set of compression members based on a size of the electrical cord.

The present invention thus provides an electrical connector body that can be easily constructed by securing together housing portions formed from injection molded plastic. The housing portions can be secured together using a compression element thereby reducing or eliminating the need for plastic welding or other techniques that complicate assembly. The invention also reduces or eliminates the need for PVC over-molding such that construction and assembly can be implemented using inexpensive and readily available tools. Construction and assembly can thus be distributed over multiple manufacturers and geographies to facilitate various business and distribution strategies.

BRIEF DESCRIPTION OF THE DRAWINGS

For a more complete understanding of the present invention and further advantages thereof, reference is now made to the following detailed description, taken in conjunction with the drawings, in which:

FIGS. 1D-1F and 1H-1J illustrate the operation of another embodiment of a clamping mechanism in accordance with the present invention.

DETAILED DESCRIPTION

Figure 1A:
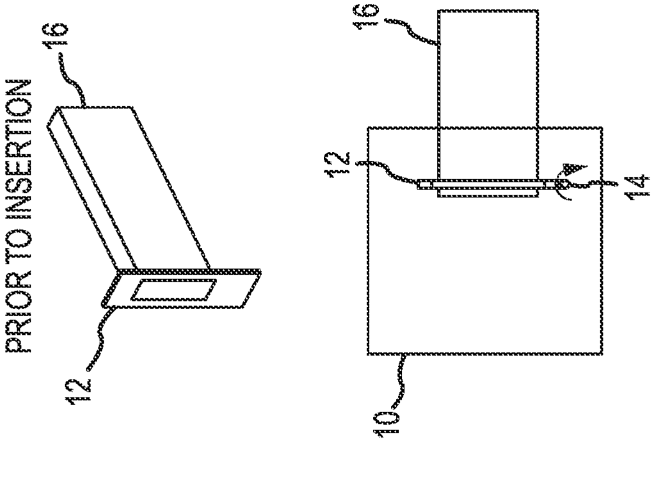
FIGS. 1A-1C illustrate the operation of an embodiment of a clamping mechanism in accordance with the present invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

As discussed above, the present invention relates to various electrical connector bodies where the connector body housing can be formed in sections of injection molded plastic. The sections can then be secured together with the electrical components inside to form the electrical connector body. Such securement may be accomplished by sliding a compression component over strain relief extensions. This methodology may be used to form a variety of types of components including cord caps, in-line surge suppression circuits, and cord mounted compact automatic transfer switches, among others. The description below sets forth a number of embodiments of locking cord caps and other locking connectors and thereafter describes embodiments and methodology related to electrical connector bodies formed from injection molded plastic.

Figure 1B:
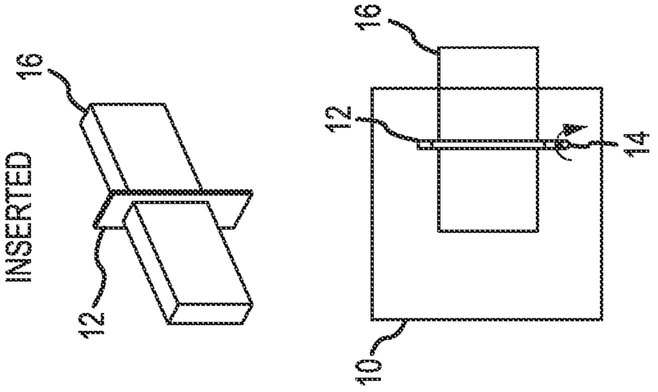
Figure 1C:
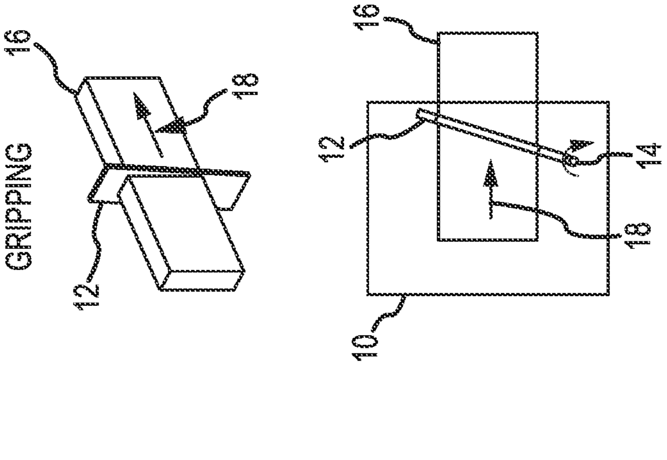

FIGS. 1A-1C illustrate the operation of an embodiment of a clamping mechanism for securing a mated electrical connection that may be included in a locking receptacle of the present invention. In each of the FIGS. 1A-1C, the bottom portion represents a side view of a prong 16 and a clamping mechanism 12, while the top portion represents a perspective view. Referring first to FIG. 1A, the prong 16 of a plug is shown prior to insertion into a receptacle 10. The prong 16 may be a ground prong of a standard plug (e.g., an IEC 320 plug, a NEMA 5-15, or the like) and may be various sizes and shapes. Further, the receptacle 10 may be the ground receptacle or other receptacle(s), of a standard outlet (e.g., a NEMA standard cord cap, an IEC 320 cord cap, or the like) that is operative to receive a standard plug. The receptacle 10 also includes the clamping mechanism 12 that is coupled to a pivot 14. The clamping mechanism 12 includes an aperture that is sized to be slightly larger than the prong 16, such that the prong 16 may only pass through the aperture when the length of the clamping mechanism is substantially perpendicular to the length of the prong 16. That is, the design of the clamping mechanism 12 is such that a simple slide on and capture technique is utilized.

FIG. 1B illustrates the prong 16 when inserted into the receptacle 10. As shown, the prong 16 passes through the aperture in the clamping mechanism 12 and into the receptacle 10, such that the corresponding plug and outlet are in a mated position. The clamping mechanism 12 further may include a stop (not shown) to prevent the clamping mechanism 12 from pivoting during the insertion of the prong 16. In this regard, during insertion of the prong 16, the length of the clamping mechanism 12 will remain substantially perpendicular to the length of the prong 16, which permits the passage of the prong through the aperture of the clamping mechanism 12.

FIG. 1C illustrates the gripping function of the clamping mechanism 12 in reaction to a force on the prong 16 that tends to withdrawal the prong 16 from the receptacle 10. In reaction to a withdrawal of the prong 16, the clamping mechanism 12 angularly deflects (i.e., rotates) about the spring pivot 14, causing the aperture in the clamping mechanism 12 to grip the prongs 16. Thus, the very force that tends to withdraw the prong 16 from the receptacle acts to actuate the clamping mechanism 12 to engage the prong 16, thereby preventing the withdrawal of the prong 16, and maintaining the electrical connection of the mated assembly. The clamping mechanism 12 may be constructed of any suitable material, including a high strength dielectric with an imbedded metallic gripping tooth. An all-metallic clamping mechanism may also be used if the prong 16 is a ground prong. In this regard, an all-metallic clamping mechanism may be used, e.g., for other prongs, though modifications may be required to obtain approval by underwriting bodies.

Figure 1D:
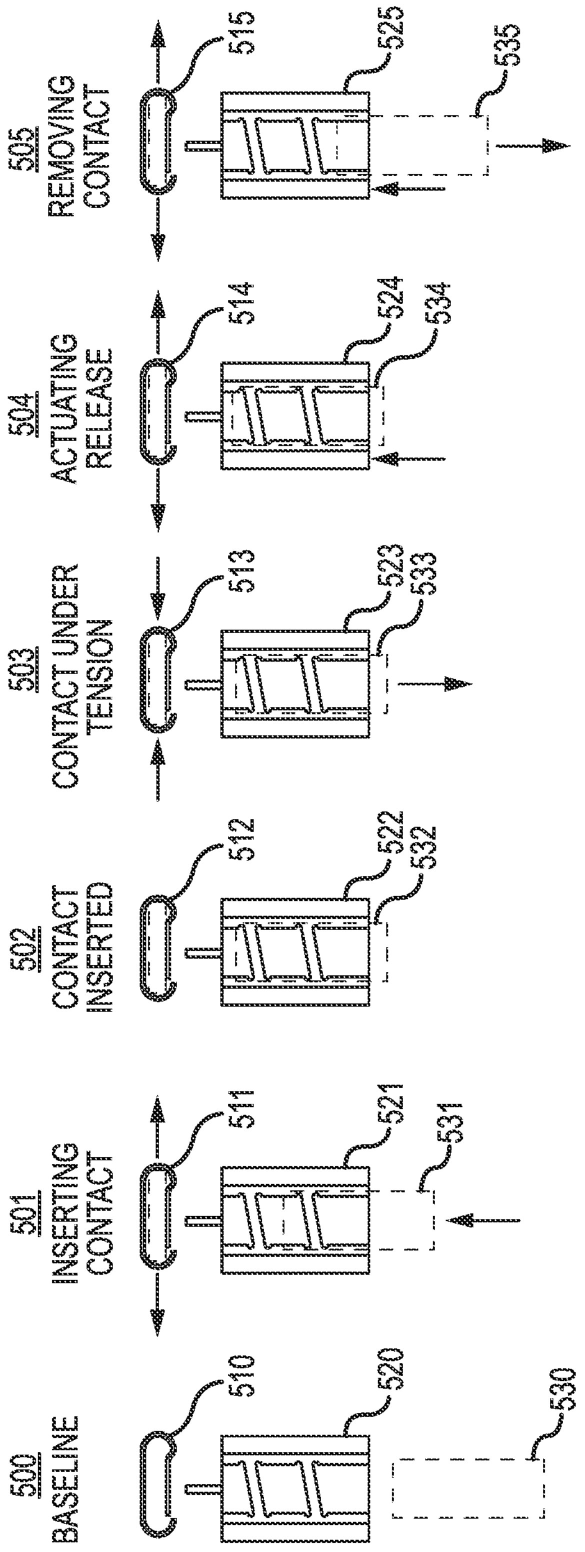
Figure 1E:
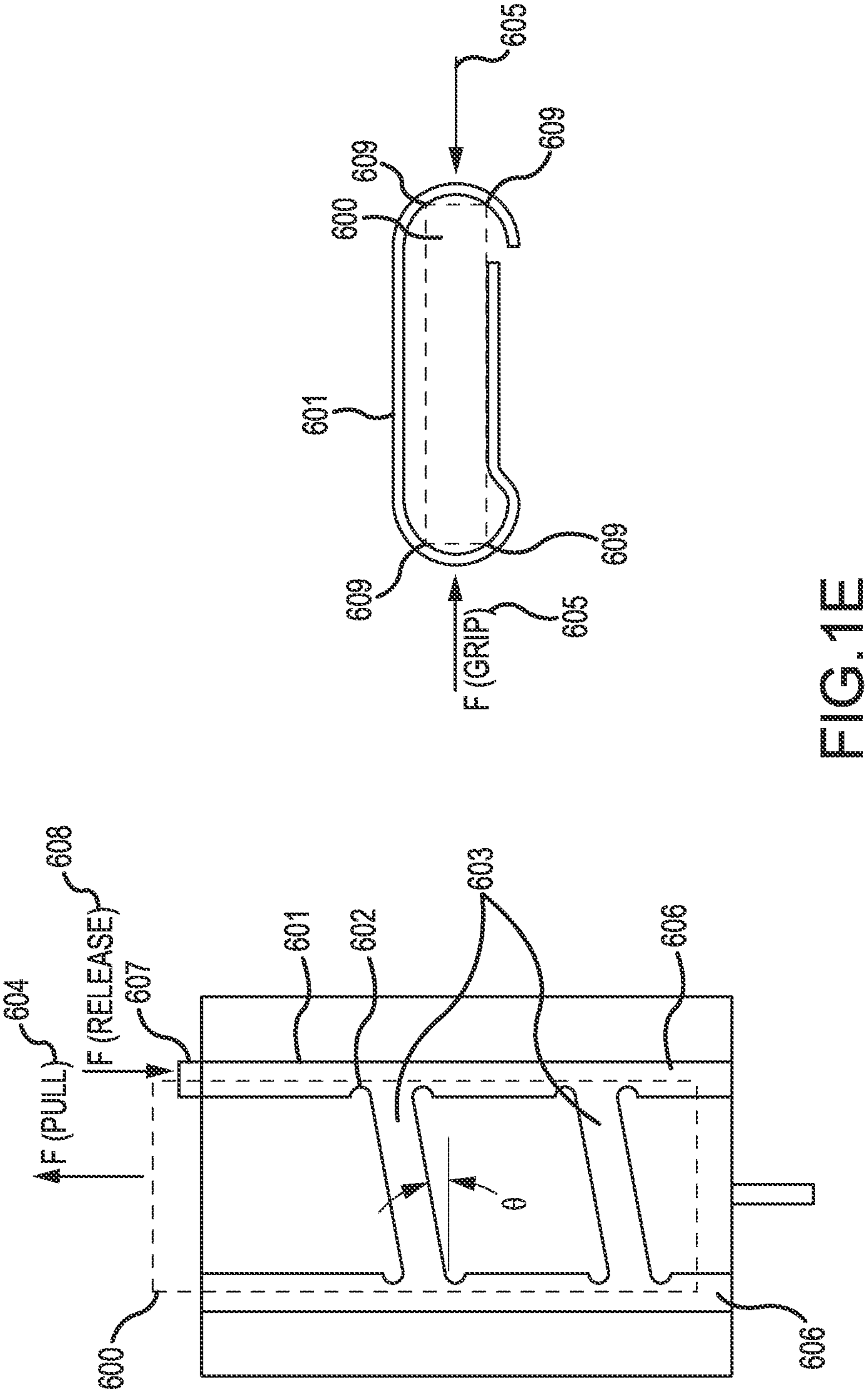
Figure 1F:
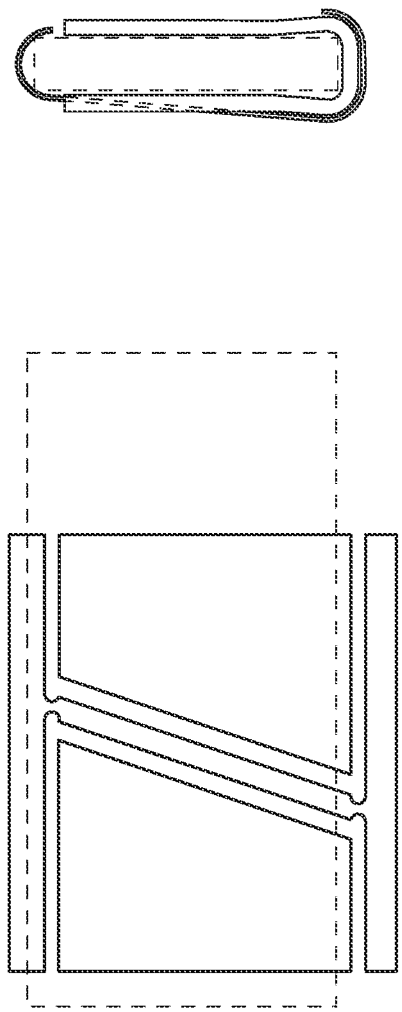

FIGS. 1D-1F & 1H-1J illustrate the operation of another embodiment of a clamping mechanism for securing a mated electrical connection that may be included in a locking receptacle of the present invention. In each of the illustrations 500-505 of FIG. 1D, the top row of figures represents the end-on views of the clamping mechanism and the bottom row represents side views of the clamping mechanism with an electrical contact prong in the states of: 1) disengagement 500, 2) being inserted 501, 3) fully inserted 502, 4) fully inserted under tension 503, 5) being released 504 and 6) during contact removal 505. The example clamping mechanism as shown in FIG. 1E has two channels 606 that grip the sides of the contact and cross-link springs 603 connecting the channels. It should be noted that the clamping mechanism can act as both the electrical contact and clamping mechanism together or can be only a clamping mechanism that is integrated with a separate electrical contact. FIGS. 1H-1J shows the clamping mechanism acting as both the electrical contact and clamping mechanism and FIG. 1F shows a clamping mechanism that is suitable for use with a separate electrical contact. Details of FIG. 1H include the gripping channels 902, the cross-link springs 901, the integrated electrical conductor crimp 903, the release shaft 904 and the release shaft contact nub 905. Possible instantiations can be made of one suitable material or several materials (for example steel and copper) to optimize the functionality of the clamping mechanism, electrical and mechanical properties, ease of manufacture and cost. The materials can be joined together or secured to function together by any suitable means such as mechanical interlock, fasteners, gluing, etc. as is needed to optimize their function and minimize their cost.

A possible example of this would be a clamping mechanism that is also an electrical contact made of annealed brass or phosphor bronze or other suitable material. Due to the expansion characteristics of the chosen materials, the expansion associated with heating of the retainer contact (receptacle) and more specifically the expansion of the cross-link springs, from any resistance in the connection of it to the inserted electrical prong (Note that the prong could be different shapes, it could be a pin for example), will result in progressive tightening of the grip function. Even if the receptacle is not "locked" to the prong upon initial insertion, e.g., no extraction force is applied to tighten the gripping mechanism, and the only bearing force applied to the contact surfaces is the force of the cross-link spring action, when current is applied, the resistance at the junction of the socket and prong will result in some degree of heating. If the resistance is high enough, say the prong is under-sized, or damaged and not uniformly in contact with the channels, the temperature of the assembly will start to rise. In addition, the electrical connection between the channels, that is the channel that is connected directly to the incoming wire and the opposing channel connected via the cross-link springs, can be manipulated in cross section to have additional heating at higher current levels such that more heating is occurring in the cross-link springs than elsewhere. In any case, heating of the cross-link springs will result in expansion. Since the heat sinking is largely via the inserted prong, and subsequently the wire of the associated connection, the temperature of the cross-link spring will be higher than the prong temperature average. Hence slightly less expansion of the prong will be present. At some point the differential will allow the natural tendency of the spring loaded and racked socket receptacle to overcome the molecular lock (static friction) between the channels and the edges of the prong. The channels will move slightly with regards to the prong and a new engagement will be established. At this point, the electrical resistance will drop due to the newly established, and slightly tighter connection between the channels and the prong, and the whole thing will start cooling. Now, the cross-link springs will shorten, and the force exerted on the bearing points between the channels and the prong will increase dramatically because the tangential force, similar to the force applied when pull-out force is applied, and the electrical connection will be re-established much more effectively. This in turn will reduce the resistance further and effectively "lock" the receptacle to the prong, and guarantee superior electrical connection, even with imperfect mating surfaces. It is a re-generative condition that is responsive to poor connections and tends to self-heal a poor electrical connection.

FIG. 1E shows the mechanical properties of the clamping mechanism. An electrical contact 600 (or other plug structure) is inserted into the clamping mechanism 601. The dimensions of the clamping mechanism are set so that the contact will spread the clamping mechanism open. In this regard, the forward end of the clamping mechanism (the end that is first contacted by the electrical contact) may be flanged outwardly to capture the contact and facilitate spreading of the clamping mechanism. This spreading action is shown in FIG. 1D 511. The transverse cross-link springs 603 act to resist the spreading open of the clamping mechanism. This ensures that the edges of the electrical contact 600 are biased to touch the channels at defined contact points 609. Differently shaped electrical contacts and/or clamping mechanisms would have different contact points and/or surfaces. In the illustrated embodiment, the contact points/surfaces where clamping occurs are primarily or exclusively on the top and bottom surfaces of the prong, rather than on the side surfaces where electrical connections are typically made. This may be desirable to avoid concerns about any potential degradation of the electrical contact surfaces thought it is noted that such degradation is unlikely given that the clamping forces are spread over a substantial length (and potentially width of the contact. Once the electrical contact prong 600 has been inserted into the clamping mechanism 601, any pulling force F(pull) 604 that acts to remove the prong 600 from the clamping mechanism 601 will result in a clamping force F (grip) 605 being exerted on the sides of the prong 600. The clamping force is generated by the action of the transverse cross-link link springs pulling on the channels 606 on each side of the clamping mechanism such that the channels are urged towards one another. The relationship of the forces will be generally F(grip)=F(pull)/tangent (angle theta). Thus, the clamping force F(grip) will increase faster than the force F(pull) that is acting to remove the prong 600 from the clamping mechanism 601. Therefore, the grip of the clamping mechanism 601 on the prong 600 will become more secure as the force trying to extract the prong 600 increases. Once the gripping mechanism has been actuated by a pull force 604, friction will tend to keep the gripping mechanism tightly engaged. To release the gripping mechanism, the release rod 607 is pushed, generating a force F(release) 608. This force will decrease the angle theta and urge the channels away from one another, rapidly decreasing the gripping force F(grip) 605 and allowing the prong 600 to be easily removed from the gripping mechanism 601. The release force 608 needed to effect release can be very small.

In one possible embodiment, associated with a standard NEMA C-13 outlet, the transverse cross-link spring may be formed from copper or a copper alloy and have a thickness of about 50/1000-75/1000 of an inch. In such a case, the curve 602 may be generally circular in shape with a radius of curvature of about 75/1000 of an inch. The curve 602 may extend into the cross-link spring 603 so that a narrowed neck, from radius-to-radius, is formed in the cross-link spring 603. Such a curve 602, in addition to affecting the operational properties of the gripping mechanism as may be desired, avoids sharp corners that could become starting points for cracks or accelerate metal fatigue. The neck also helps to better define the pivot point of the cross-link spring 603 in relation to the channels as may be desired. It will be appreciated that specific operational characteristics, such as (without limitation) the amount of any slight movement allowed before locking, the total amount and location of clamping forces exerted on the prong, the force level (if any) where the clamping mechanism will release, and the durability of the clamping mechanism for frequent cycling, may be application specific and can be varied as desired. Many other configuration changes and construction techniques are possible to change these operational characteristics. For example, the cross-link spring (or a portion thereof) may be twisted (e.g., at a 90 degree angle to the plane of stamping of the material) to affect the pivot point and flexing properties of the spring as may be desired.

The choice of material, thickness and geometry and shaping of the apparatus affect the operational properties of the gripping mechanism 601. The transverse cross-link springs can have their spring constant affected by all of these variables. For example, the radius, location, and shape of the curve 602 and the thickness of the neck of the transverse cross-link spring 603 can be varied to achieve differing values of spring constants. This can be desirable to optimize the pre-tension gripping force exerted by the spring on a contact inserted into the retention mechanism or the range of contact sizes the gripping mechanism will function with. Note: The pre-tension gripping force is defined as the gripping force exerted on the contact 600 by the action of the transverse cross-link springs 603 before any pull force 604 is placed on the contact.

Figure 1G:
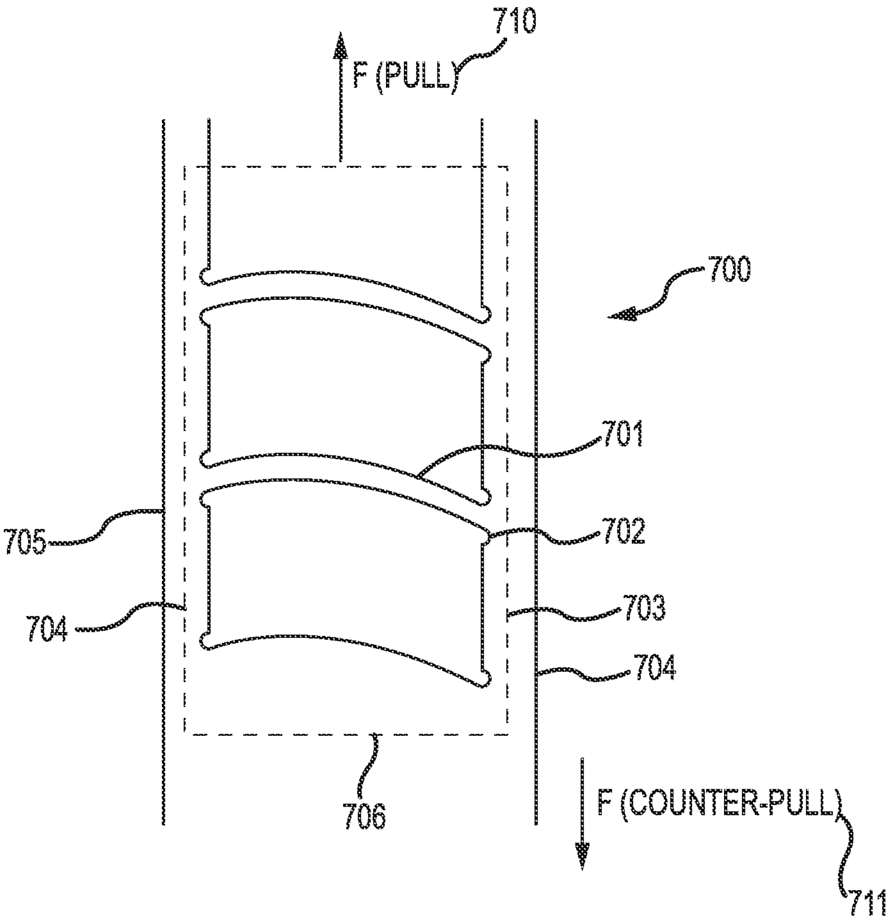
FIG. 1G illustrate the operation of another embodiment of a clamping mechanism in accordance with the present invention.

Referring to FIG. 1G another possible instantiation is shown. In this instantiation, the operation of the mechanism is similar to the operation described in (1-D through 1F). As tension is applied to the assembly between Force Pull 710 on the prong 706 and the Counter-Force Pull 711, bearing forces at the contact points (703,707) of the channels (704, 705) and the inserted contact prong 706 (note that the prong could have different shapes, it might be a pin for example) increase exponentially, resulting in immediate capture of the prong by the channels. As F Pull 710 increases, the tension in the cross-link springs 701 continue to increase as well. The cross-link springs are crescent shaped in this instantiation as opposed to the straight springs described in FIGS. 1D-1F & 1H-1J. The crescent shape allows the cross-link springs to now have two actions. First, they have a spring action at the connection point to the channels (704, 705) and, secondly, they have a spring action along the long axis of the cross-link spring (701). The addition of the spring action along the long axis allows the cross-link spring to have a predictable ability to lengthen or stretch. As F Pull 710 continues to increase, the tension in the cross-link springs 701 continue to increase to a point where the cross-link spring begins to stretch along its long axis. At this point, the relationship between the F Pull 710 applied and the resulting grip forces at the contact points (703,707) of the channels (704, 705) and the inserted contact prong 706 ceases to increase. Now, increasing Force Pull 710 results in overcoming the friction at the contact points 703,704, and the contact pin 706 will move in relationship to the channels (704, 705) and hence the gripping mechanism 700. If Force Pull 710 is maintained, the contact prong 706 will become extracted from the channels (704, 705) completely. This condition allows the assembly 700 to have a predictable point in tensile relationships where a plug and receptacle can be separated without damage to either principal component, the prong, or the gripping mechanism (which can be a gripping mechanism that is also an electrical contact or a separate gripping mechanism with integrated electrical contact as noted earlier).

Referring again to FIG. 1D, the prong 530 of a plug is shown prior to insertion into a receptacle with an electrical contact represented by 510. The prong 530 may be a ground prong or other prong of a standard plug (e.g., an IEC 320 plug, a NEMA 5-15, or the like) and may be various sizes and shapes. Further, the receptacle containing the electrical contact 510 may be the ground receptacle or other receptacle (s), of a standard outlet (e.g., a NEMA standard cord cap, an IEC 320 cord cap, or the like) that is operative to receive a standard plug. The receptacle includes the clamping mechanism 520 and may utilize more than one clamping mechanisms in one receptacle. The design of the clamping mechanism 520 is such that a simple slide on and capture technique is utilized.

Other clamping mechanisms are possible in accordance with the present invention. For example, a wire mesh, formed and dimensioned so as to receive a contact, prong or other plug structure (collectively, "contact") therein, may be utilized to provide the clamping mechanism. The wire mesh is dimensioned to frictionally engage at least one surface of the contact when plugged in. When a force is subsequently exerted tending to withdraw the contact from the receptacle, the wire mesh is stretched and concomitantly contracted in cross-section so as to clamp on the contact. A Kellem-style release mechanism may be employed to relax the weave of the mesh so that the contact is released. Such a gripping mechanism may be useful, for example, in gripping a cylindrical contact.

Figure 2A:
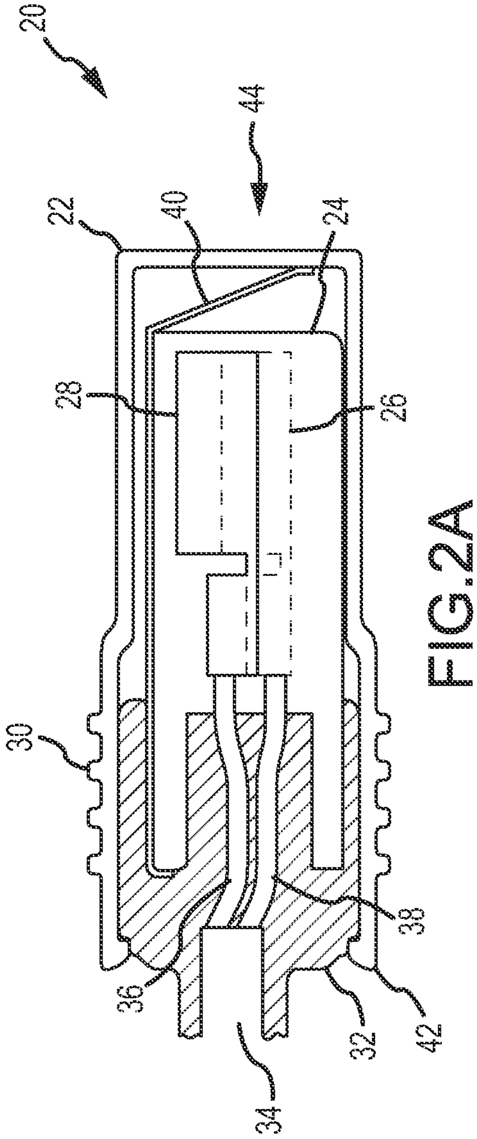
FIGS. 2A-2B illustrate an embodiment of a locking electrical receptacle in accordance with the present invention, using the clamping mechanism described in FIGS. 1A-1C.
Figure 2B:
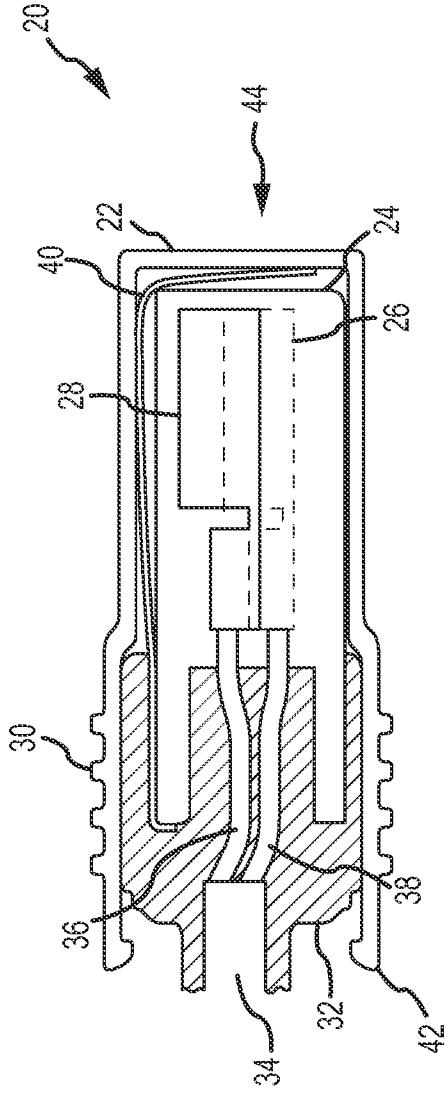
Figure 2C:
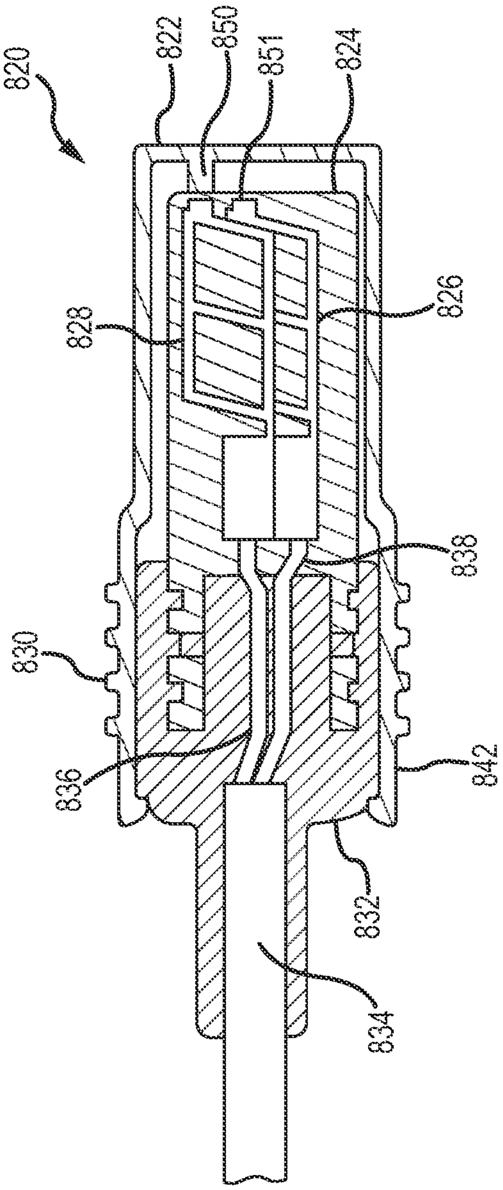
FIG. 2C illustrates an embodiment of a locking electrical receptacle in accordance with the present invention, using the clamping mechanism described in FIG. 1D-1F, 1H-1J or 1G.

FIG. 2C illustrates a cross section of one possible embodiment of a locking electrical receptacle 820. The receptacle 820 is an IEC type 320 cord cap receptacle that includes one or more gripping mechanisms 828. The receptacle 820 includes an inner contact carrier module 824 that contains a gripping mechanism and electrical contacts 826 and 828. Attached to the gripping mechanism and electrical contact sockets are wires 836 and 838 that extend out of the receptacle 820 though a cord 834. The carrier module 824 may be attached to a cord strain relief 832 that functions to prevent the cord from separating from the cord cap or otherwise resulting in damage to the assembly when a force is applied to the cord 834. FIG. 2C demonstrates one possible release mechanism actuation method. Specifically, the receptacle 820 is formed in telescoping fashion with a shell 822 that slides on the carrier module 824 and strain relief 832. A protrusion 850 on shell 822 engages a release 851 of mechanism 828 such that sliding the shell 822 engages the mechanism 828 to its release configuration. The clamping mechanisms described in FIGS. 1D-1J can be combined many of the other release mechanisms described in the incorporated filings.

FIGS. 2A-2B illustrate a cross section of one embodiment of a locking electrical receptacle 20. The receptacle 20 is an IEC type 320 cord cap receptacle that includes a locking mechanism. The receptacle 20 includes an inner contact carrier module 24 that houses contact sockets 26 and 28. Attached to the contact sockets are wires 36 and 38 that extend out of the receptacle 20 though a cord 34. The carrier module 24 may be attached to a cord strain relief 32 that functions to prevent the cord from separating from the cord cap or otherwise resulting in damage to the assembly when a force is applied to the cord 34. A spring prong retainer 40 is disposed adjacent to a surface of the carrier module 24 and extends across a prong-receiving portion 44 of the receptacle 20. One end of the spring prong retainer 40 is bent around the end of the inner contact carrier module 24, which secures it in the assembly (underneath the over-molded material 32).

Alternatively, the spring prong retainer 40 may be secured to the inner contact carrier module 24 by a screw or other fastener, and/or embedded in the module 24. A section of the spring prong retainer 40 that is embedded in the module 24 or alternatively secured in the cord cap via over molded material may be configured (e.g., by punching a hole in the embedded section and/or serrating the edges or otherwise shaping it) to enhance the anchoring strength in the embedded section. The other end of the spring prong retainer 40 is in contact with a telescopic lock release grip 22. Similar to the clamping mechanism 12 shown in FIGS. 1A-1C, the spring prong retainer 40 includes an aperture sized to permit the passage of the ground prong of a plug into the socket 26. The aperture in the spring prong retainer 40 may be sized to be slightly larger than one prong (e.g., the ground prong) in a standard plug such that the aperture may function as the clamping mechanism for the locking receptacle 20. It can be appreciated that prongs with different cross-section shapes, for example round prongs, can use the retention mechanism described herein, with a suitable modification of the aperture shape and geometry of the spring prong retainer. Such modifications may be specific to the various shapes of the cross section of various prong types. Such variations will function in substantially the same manner as the retention mechanism described herein. The spring prong retainer 40 may further be shaped and constructed, as will be discussed in more detail below, to inhibit contact with other prongs and provide a desired release tension. Moreover, the retainer 40 may be retained within a recessed channel formed in the module 24 to further inhibit transiting or side-to-side displacement of the retainer 40. The operation of the clamping feature of the spring prong retainer 40 is discussed in detail below.

FIG. 2A illustrates the locking receptacle 20 when there is little or no strain on the cord 34. As shown, the portion of the spring prong retainer 40 disposed in the prong-receiving portion 44 of the receptacle 20 is not in a substantially vertical position. Similar to the operation of the clamping mechanism 12 shown in FIGS. 1A-1C, the apertures of the spring prong retainer 40 in this configuration will allow the prongs of a plug to pass freely into the socket 26 when the prong is inserted. This is due to the unrestricted change of position of the spring prong retainer 40 to the substantially vertical position as the prongs of a plug acts upon it.

FIG. 2B illustrates the locking receptacle 20 when a force is applied to the cord 34 of the receptacle 20 in the opposite direction of the grip release handle 30. This is the "release position" of the receptacle 20 and is shown without the mating prongs for clarity of operation. Actions that initiate this position are illustrated in FIGS. 3A and 3B.

Figure 3A:
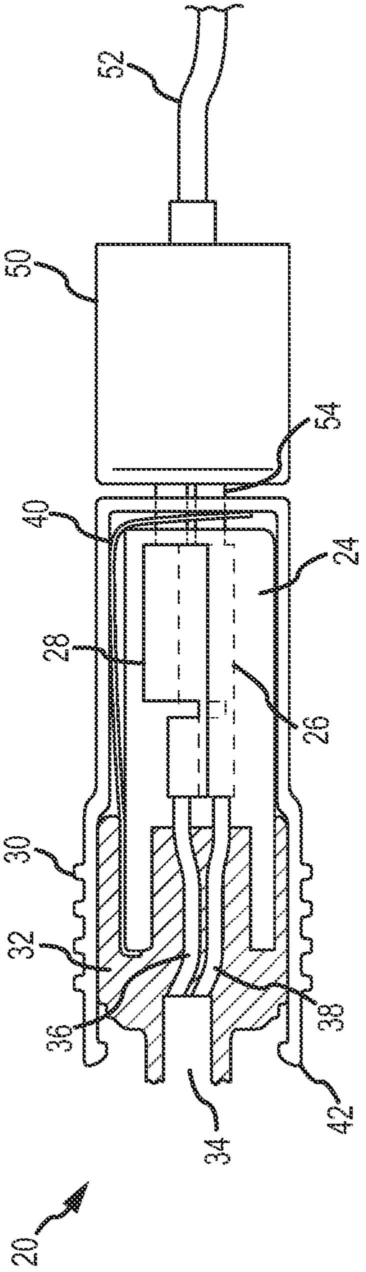
FIGS. 3A-3B illustrate an application for the locking electrical receptacle shown in FIGS. 2A-2B.

FIG. 3A illustrates the operation of the locking electrical receptacle 20 shown in FIGS. 2A-2B. When a prong 54 of a plug 50 first enters the receptacle 20 via an aperture in the lock release grip 22, it encounters the spring prong retainer 40, which is not in the perpendicular orientation at that time. Upon additional insertion, the spring prong retainer 40 is deflected into the perpendicular position by the force applied to it by the prong 54. The prong 54 then passes through the aperture in the spring prong retainer 40 and into the contact socket 26, making the electrical connection as required. Upon release of the insertion force, and when no axial strain is applied to the mated plug 50 and receptacle 20, the spring prong retainer 40 is only partially displaced from the perpendicular axis. It is noted that there is little separation between the forward-most surface of the plug 50 and the end of the receptacle of carrier module 24 adjacent the plug 50 in this connected configuration, i.e., the prong extends to substantially the conventional extent into the receptacle.

Figure 3B:
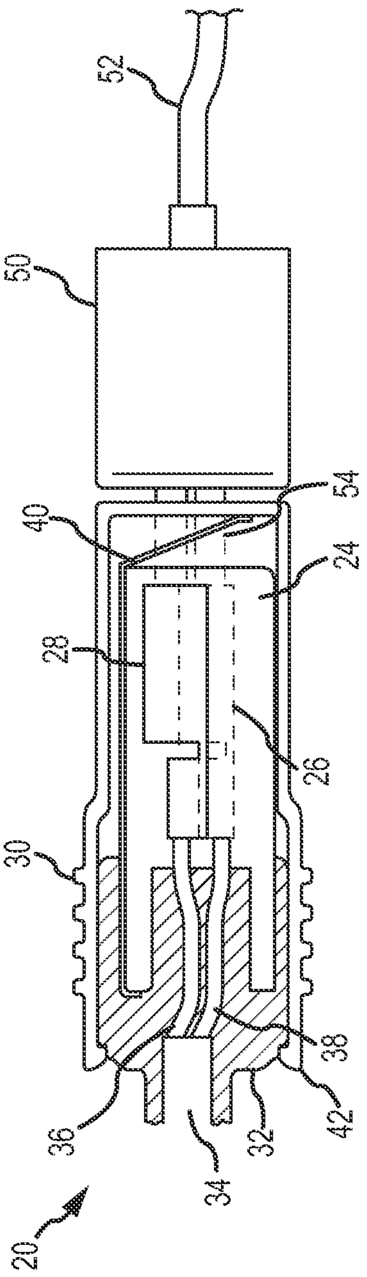

FIG. 3B illustrates in an exaggerated manner the condition of applying axial tension to the cord 34 of the receptacle 20. A slight retraction motion pulls on the spring prong retainer 40, thereby increasing the angle of grip and subsequent tightening of the offset angle of the spring prong retainer 40 and prong 54. The receptacle 20 and the plug 50 are then fully locked in this condition. Upon application of axial tension between the release grip handle 30 and the plug 50, the position of the spring prong retainer 40 is returned to the near-perpendicular position as illustrated in FIG. 3A, thereby releasing the spring prong retainer 40 from the prong 54. Upon release, the receptacle 20 is easily separated from the plug 50. Because the release grip handle 30 is mounted to slide in telescoping fashion with respect to the carrier module 24 and can be gripped for prong release from the top or sides, the locking mechanism can be easily released even in crowded or space limited environments such as in data centers.

Figure 13A:
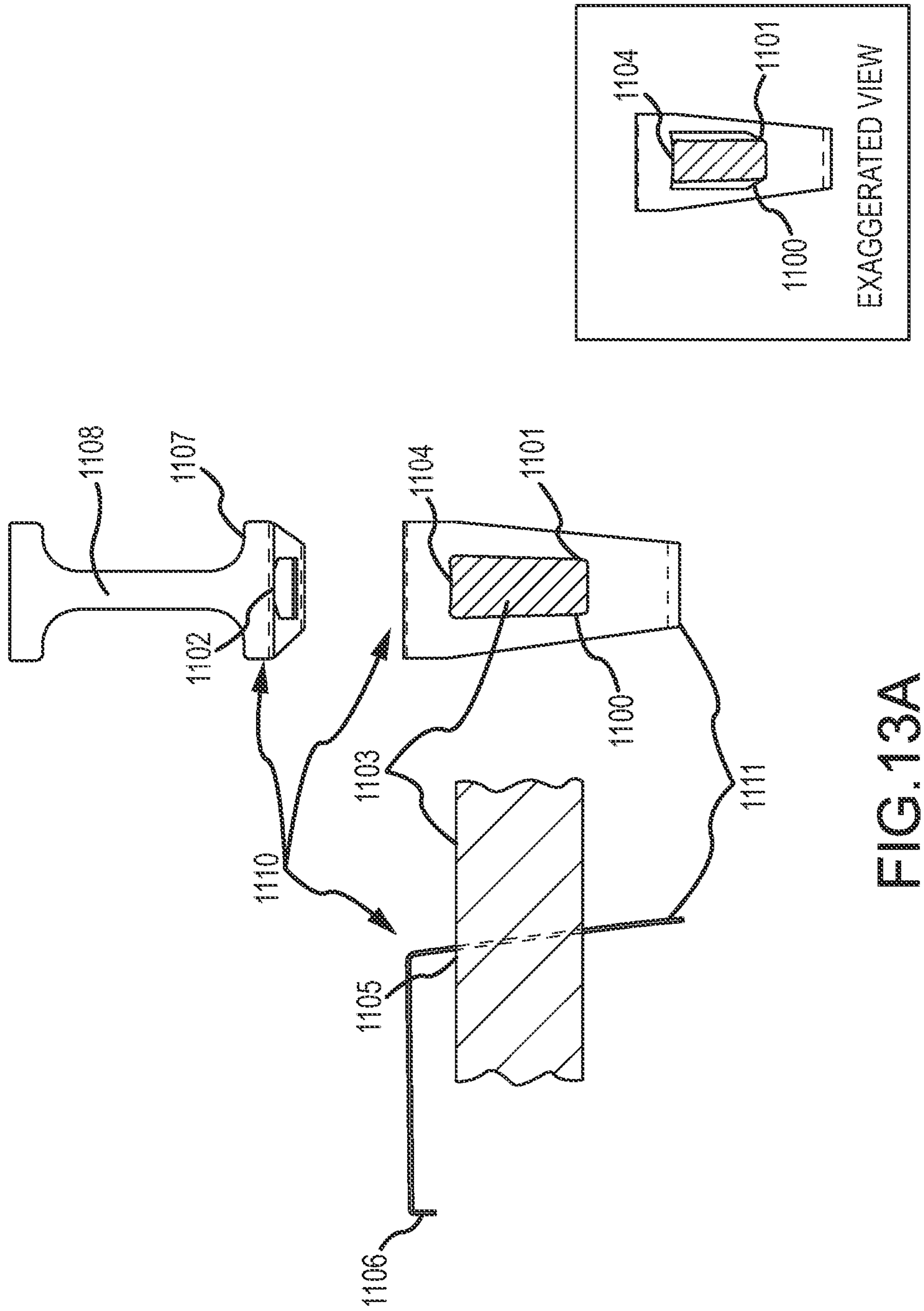
FIGS. 13A-15B show an alternative embodiment of a locking spring prong retainer electrical receptacles and spring prong retainers in accordance with the present invention.
Figure 13B:
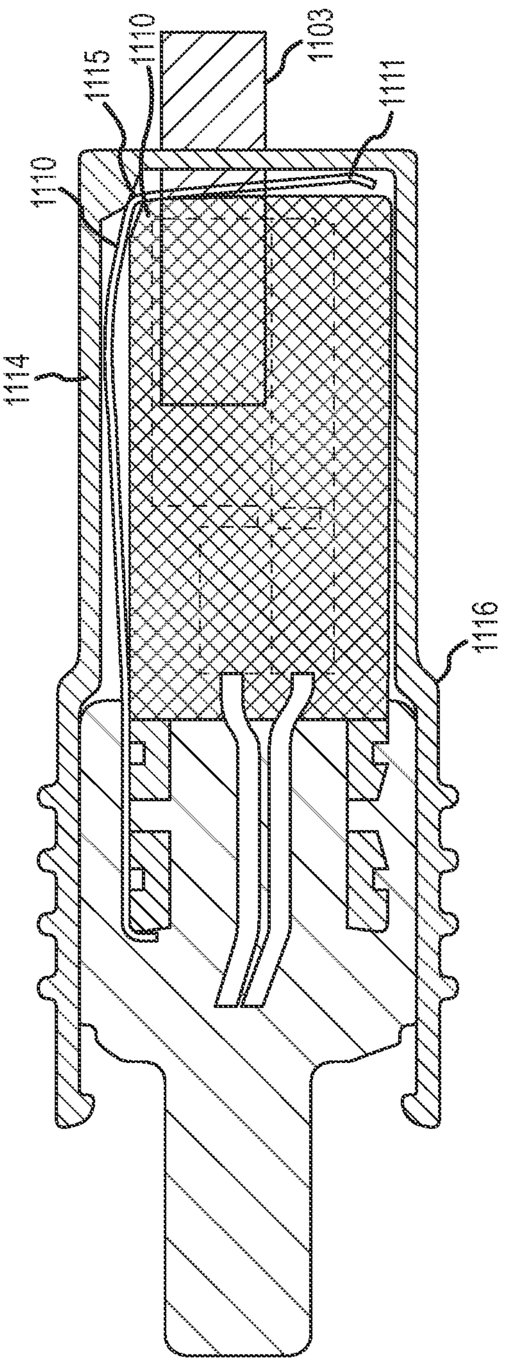
Figure 13C:
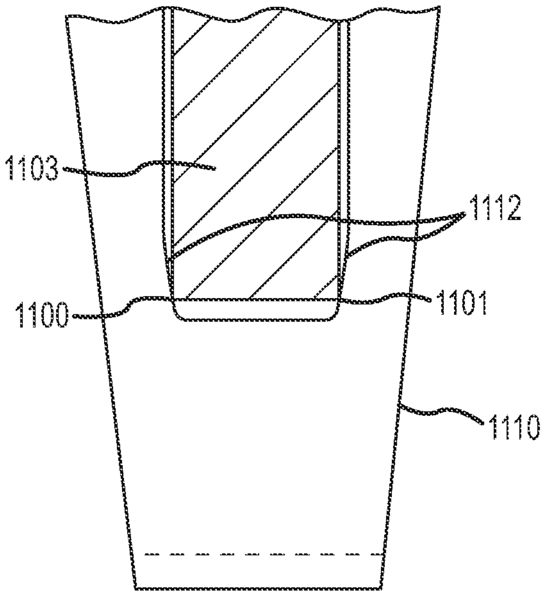

FIGS. 13A-13C illustrate an alternative spring prong retainer. In the embodiment described above and illustrated by FIGS. 1A through 3B, the retention gripping points are along the flat, or semi-flat surfaces of the narrow axis of the prong. The apertures are rectangular in shape and the top and bottom of the rectangle comprise the contact locations on the prong. Forces applied to those contact points are limited to the relationship of the precision of the prong dimensions to the hole dimensions. In the embodiment of FIG. 13A, the aperture has a rectangular top and a bottom half that narrows down or tapers. This design of aperture contacts the prong at three locations 1100, 1101, 1104 (see FIG. 13A—Exaggerated View), on the top of the prong and on each of the sides at the bottom.

A significant increase in the gripping force is possible due to the amplification of the pull torque via not only the angular displacement of the spring prong, but also the wedging effect at the two adjacent contact points 1100, 1101 at each corner of the narrow axis of the mating prong 1103. As pull force is exerted on the hook tab 1106 of the spring retainer 1110, an initial action occurs as described for the spring prong retainer in FIGS. 1A thru 1C. After the initial contact is made at points 1100, 1101, 1104 during the attempt to withdraw the mating prong 1103, the forces applied to the mating prong 1103 are amplified by the inclined planes of the bottom of the slot 1100 1001. The tension force formed in the early stage of gripping by the axial displacement of the spring prong retainer 1110 about the fulcrum point 1105 is amplified greatly to apply a compressive force at the contact points of the mating prong 1103 and the spring prong retainer bottom contact points 1100 and 1101. This force is multiplied by about 10 to 1 due to the tension amplification of the spring prong retainer 1110 about the fulcrum 1105. A total force amplification of about 80 times can be achieved by this method. It should be appreciated that by adjusting the angles of the inclined planes 1100 and 1101, and the geometry of metal 1104 forming the fulcrum 1105, that various amplifications of force can be achieved. It should also be appreciated that by varying the amplification force, the spring prong retainer can be tuned to optimally engage with a variety of mating prong materials and finishes.

Due to this amplification, and the relatively small contact area between the spring prong retainer, inclined planes 1112 (FIG. 13C) 1110, 1101 and the mating prong 1103, forces at least as high as 30,000 pounds psi (30 Kpsi) are possible, thus ensuring positive gripping of the mating prong 1103. It should be appreciated that use of this alternate method of mating prong capture is also more tolerant of manufacturing variances in the prongs.

FIG. 13B illustrates the release methodology for this alternate spring prong retainer. It is similar to that of the spring prong retainer previously described. As release force is applied to the end of the spring prong retainer 1111 by the face of the outer shell 1116, the surface of the spring prong retainer 1110 becomes more perpendicular to the mating prong 1103. In turn, the point of contact at the fulcrum 1105 is disengaged and the mating prong would normally be free to be extracted, as described for spring prong retainer 40 of previous embodiments. However, at this point the lower contact points (illustrated in FIG. 13A) 1100, 1101 have the mating prong 1103 captured between them, and likely a small deflection of the metal of the mating prong 1103 has occurred at those points. The mating prong 1103 is therefore probably not yet released. As the outer shell 1116 compresses the face of the spring prong retainer 1110, the molded-in ramp in the outer shell 115 begins to push the spring prong retainer down and in turn pushes the lower contact points 1100 and 1101 (illustrated in FIG. 13A) down off of the mating prong 1103. Eventually the entire assembly is disengaged from the mating prong 1103.

It should be appreciated that the shape of the spring prong retainer (illustrated in FIG. 13A) contributes to the disengagement characteristics as well. The shoulders of the spring prong retainer 1107 are placed such that, upon force being applied to the spring prong retainer to release, the shoulders contact the interior surface of the outer shell 1116. Continued rotation of the face of the spring prong retainer closer to perpendicular to the mating prong 1103 results in the entire face of the spring prong retainer 1111 to be forced down. This action, in conjunction with the action of the ramp cast into the outer shell 1115 results in positive down force on the spring prong retainer disengaging the lower contact points 1100 and 1101 (illustrated in FIG. 13A) from the mating prong 1103.

FIGS. 14A-15B illustrate an alternate capture mechanism. FIG. 14C illustrates the principal mechanical components of the capture mechanism. A saddle and strain relief component 1401 is placed into the plastic connector carrier of the injection molded receptacle. A capture toggle 1402 is inserted into the two holes at the end of the saddle 1401. The opposite end of the saddle and strain relief component 1401 is the crimp ring that clamps around the cord end just beyond the start of the outer jacket or other suitable location depending on the design of the cord. It will be appreciated that if, e.g., for ease of manufacturing, it is designed to make the strain relief and clamping mechanism from different materials, such as metals of different properties, than the carrier or other cord attachment mechanism, this can easily be done, by separating the attachment method to the cord, such as a crimp ring from the strain relief piece and then connecting them mechanically. It should be appreciated that the strain relief mechanism described herein can be used with the two additional retention mechanisms described earlier.

Figure 14A:
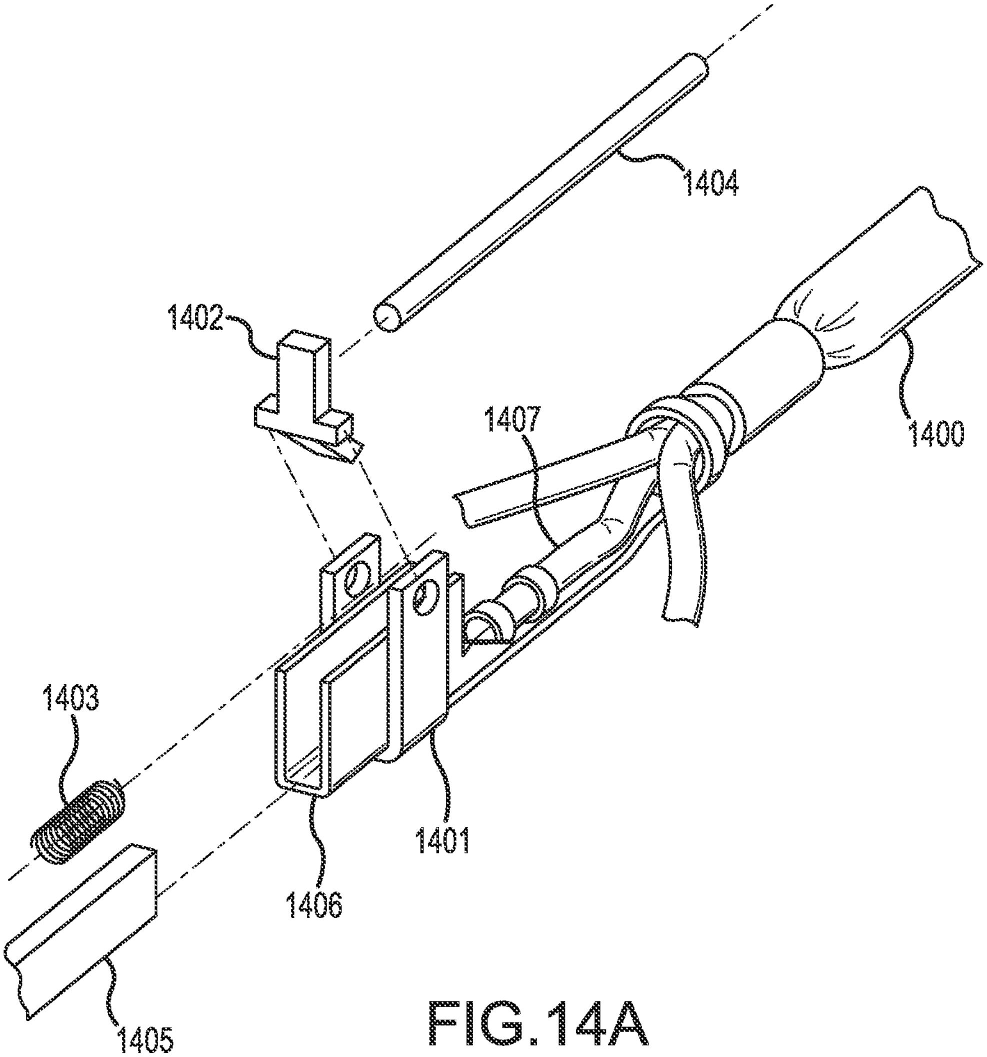

FIG. 14A illustrates the assembly of the saddle 1401 and the cord assembly 1400, 1407. The cord assembly includes the main cord 1400, an electrical interface terminal 1406, and the interior conductor 1407 of the aforementioned cord that connects to the terminal 1406. The terminal 1406 rests in the closed end of the saddle and the strain relief component 1401 and the two components are aligned along the long axis by relief ways in the outer contact carrier (not shown). If desired or needed, the terminal 1406 can be mechanically attached or bonded to the saddle and strain relief component 1401 for ease of assembly, greater strength, or other purposes. The capture toggle 1402 is placed during manufacture in the saddle between the two holes in the saddle 1401. The pre-load spring 1403 will press upon the capture toggle 1402 while the release actuation rod 1404 rests against the opposite side of the toggle.

Figure 14B:
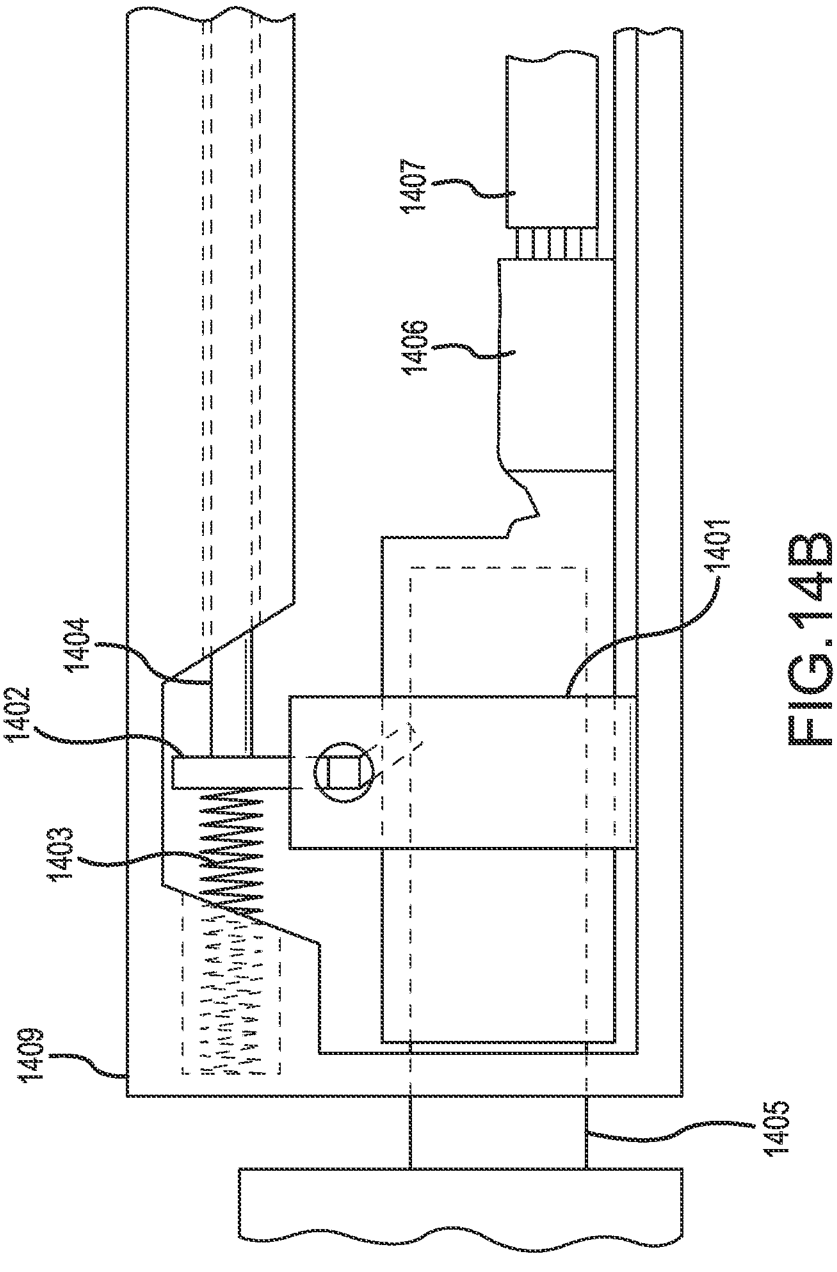
Figure 15A:
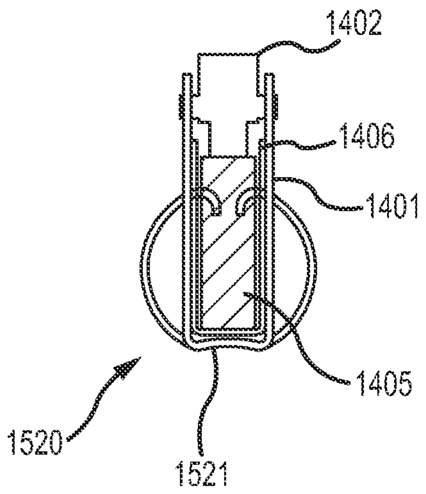

FIG. 14B shows a side view of this assembly. The outer contact component carrier 1409 houses and contains each of the components and prevents injection molding plastic from entering the interior of the carrier during the final outer over-mold injection process. FIG. 14B also helps understand the basic operation of the capture assembly. When the prong of the inserted plug 1405 is inserted into the receptacle, it enters into the plastic carrier 1409, then into the terminal 1406, and eventually passes under the toggle 1402 until it is fully inserted and is in the position shown. If tension is applied to the power cord in attempt to extract it from the mated plug, the force is transmitted from the cord to the prong 1405 and hence to the toggle 1402 (via the strain relief component and saddle 1401) which is pressed against the top of the prong 1405 by the pressure of the saddle 1401 on the bottom of the prong 1405, transmitted through the electrical terminal 1406. The toggle is pre-loaded against the top of the inserted prong of the plug connector 1405 by the spring 1403. As can be appreciated the shape of the toggle where it presses down on the prong can be shaped to control the application of the clamping force to the prong, for example, the toggle can have a groove to control the force on the prong so as not to twist it. This can also be done for the base of the saddle and mating terminal if desired or necessary. A suitably shaped insert between the saddle/strain relief 1401 and a terminal shaped to match the insert could accomplish this function. As the force applied to the cord 1407 causes minute movement along the major axis of the assembly, the mating prong also begins to attempt to retract and the toggle begins to rotate in such a manner as to force down the top of the inserted mating prong of the plug connector 1405, squeezing it tighter into the terminal 1406, and hence the terminal is squeezed into the saddle 1401. The friction between the terminal 1406, the mating prong of the plug connector 1405 and the saddle 1401 increases rapidly to a point where the movement is ceased. The pressing down of the mating prong 1405 onto the electrical terminal 1406 also improves the quality of the electrical connection. The prong of the plug connector 1405 is now functionally locked to the saddle and strain relief component 1401, and hence the cord 1407. FIG. 15A illustrates from an end-on view the relationship of all of the components involved in the locking of the components together. The prong of the inserted plug 1405 is located in the terminal 1406, which is sandwiched between the prong 1405 and the saddle 1401.

FIG. 14B illustrates the mechanism to release the connection of the toggle 1402 and the prong of the plug connector 1405. The opposite end of the release rod 1404 can extend through the entirety of the receptacle and protrude out the back of the connector or assembly where it is user accessible. The release rod 1404 can also be actuated by other means such as is shown in FIG. 14D. A telescopic section of the cord cap 1412 which includes a mechanical linkage 1408 can push the release rod 1404 against the toggle 1402 when the telescoping section 1412 is pulled back by the user to separate the plug assembly from the receptacle assembly (line 1413 indicates the fully inserted depth of the front face of the plug). In this regard, the range of motion of the telescoping section 1412 is controlled by elements 1410 and 1411. Pressure on the opposite end of the rod 1404 transmits to the back of the toggle 1402 and compresses the spring 1403 slightly. This action rotates the bottom of the toggle 1402 up and away from the prong of the inserted plug connector 1405 and reduces or eliminates the contacting force between the toggle 1402 and the mating prong 1405 allowing the mating prong to move in the retraction direction. The receptacle can then be separated from the plug. The system can be designed so that the spring 1403 functions to return the telescopic section 1412 to the locked configuration when the user releases the section 1412.

FIG. 15A illustrates the end-on view of the principal components of the inserted prong of the plug connector 1405 and the locking components of the receptacle in cross section. As mentioned previously, the toggle 1402 has been rotated into a position such that it is pressing on the prong of the inserted plug connector 1405. The prong 1405 is in turn pressing on the terminal 1406 and in turn the terminal 1406 is pressing on the bottom of the saddle 1401. It should be appreciated that as axial tension on the cord is increased the downward force exerted by the toggle 1402 will also increase. With suitable angles selected, and suitable dimensions of the components, the force amplification can be about 10 to 1. In other words, 10 pounds of strain force on the cord will result in about 100 lbs. of force exerted on the prong.

It also should be appreciated that the bottom of the saddle and strain relief component 1401 can be manufactured with a crown shape as shown. This crown shape allows the bottom of the saddle and strain relief component 1401 to act like a leaf spring when pressed down by the prong. The spring in the bottom of the saddle allows a very controllable and predictable force to be applied to the prong 1405 by the combination of the toggle pressing down on the prong and the spring resisting that force as transmitted by the prong and terminal. The maximum clamping force of the toggle on the prong is controlled by the resistance and travel of the spring. This feature can be used as follows. When strain is put on the cord to pull apart the connection, the toggle increases its force on the prong and eventually a point will be reached where the spring in (or under as described in alternative embodiments discussed below) the bottom of the saddle and strain relief component 1401 starts to flatten out. This action allows the distance from the base of the saddle and strain relief component 1401 and the tip of the toggle 1402 to increase, allowing the toggle 1402 to rotate. As the tension on the cord continues to increase, a point will be reached where the distance between saddle and strain relief component 1401 and the toggle 1402 is great enough that the toggle 1402 will rotate and be perpendicular to the prong. At this point the tab on the toggle 1402 can no longer add any additional pressure to the prong 1405, and the prong 1405 will move under the tension applied to the cord 1407 which separates the plug and receptacle. It should also be appreciated that the tension at which the release occurs can be reliably predicted to occur and can be varied by the strength and travel of the spring. The design is somewhat tolerant of manufacturing variances of both the inserted connector prong and the mechanical components of the locking mechanism. It should also be appreciated that the tension at which the mated connection releases under strain can be reliably pre-set.

Figure 15B:
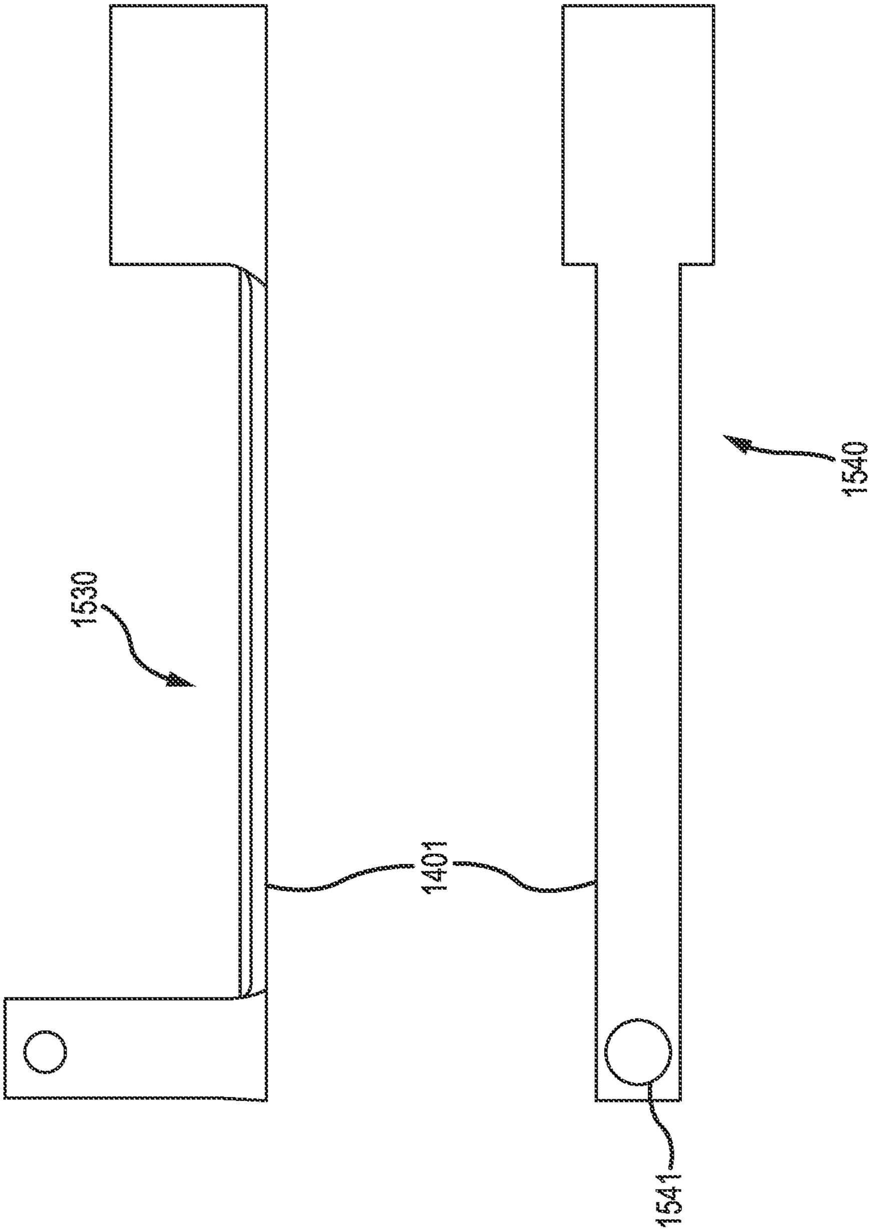

In this design, FIG. 15A illustrates the end-on view of the saddle and strain relief component 1401 with the cord crimp end away from the viewer. The crown spring depicted in the front 1521 view has the function of controlling the release point of the connected assembly under strain conditions. In FIG. 15B the crown spring is shown with a hole 1541 that is used to modify the strength and travel of the crown spring. However, other means such as the thickness or type or temper, etc., of the material used can be selected to control the spring function. Observing that the location of the hole 1541 is located directly under the saddle section of the saddle and strain relief component 1401, it should be appreciated that the strength of the crown spring action is modified. The absence of a hole will allow maximum resistance to compression of the spring crown, and a large hole will introduce significant reduction in spring strength. By reducing the spring strength, the release point of the mated connector components is subsequently reduced. Hence, the retention capacity of the locking receptacle can reliably set to specific release tensions. It will be appreciated that this design further promotes ease and lower cost of manufacture. The die that stamps the strain relief can have an insert that can be changed to vary the size of the hole 1541 in the leaf spring for various values of release tension. Other means of setting the strength and travel of the spring can be used, for example the thickness and shape of the material or other means. Also, other means that use a uniform or variable strength spring of a suitable type (hairpin, leaf, elastomer, etc.) to press on the bottom of the saddle 1401 directly below the toggle 1402 can be used. The saddle in this case would not need to incorporate a spring, the spring would be separate from the saddle. This would permit the addition of a factory and/or end user spring force adjustment mechanism, such as a screw. This mechanism would control the strength and travel of the spring pressing on the saddle and hence the release tension of the gripping mechanism as was described earlier. The range of adjustment could be controlled to meet any needed requirement. It can be appreciated that being able to reliably set the release tension is extremely useful—it allows a locking cord to be made that does not require a separate release mechanism. The release is done by the locking mechanism at the desired tension level.

Figure 14C:
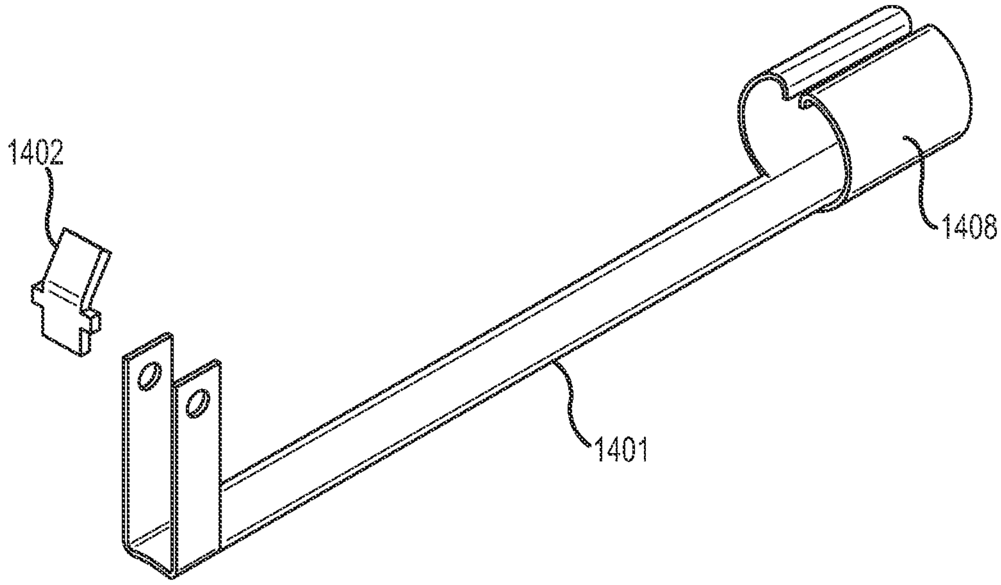
Figure 14D:
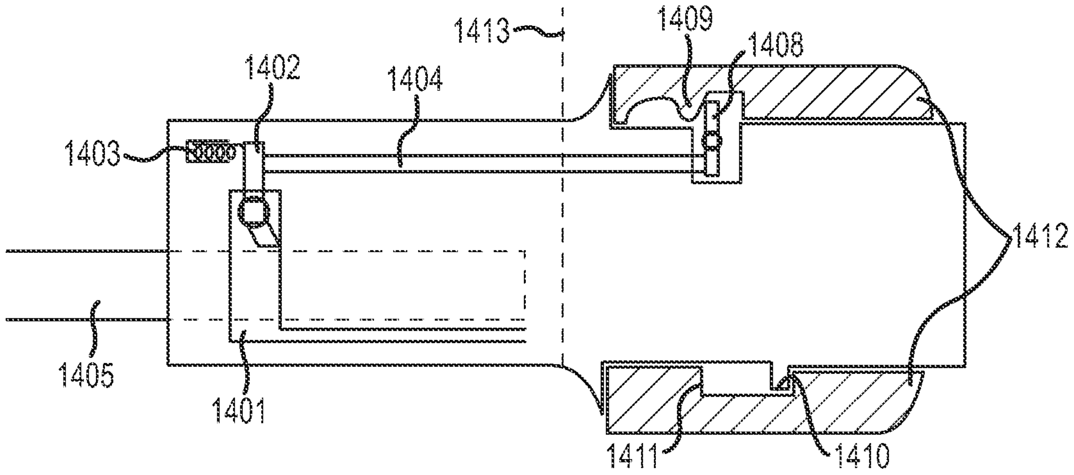

FIG. 14C depicts an orthogonal view of the saddle and strain relief component 1401. The grip ring 1408 at the end of the saddle and strain relief component 1401 is shown as an integral part of the saddle and strain relief component 1401. This ring can also be a separate compression ring that is inserted over the end of the saddle and strain relief component 1401, where the end of the saddle and strain relief component 1402 can be shaped appropriately to be sandwiched between said compression ring and the end of the attached cord. The alternate method of attaching the saddle and strain relief component 1401 to the cord is mentioned due to the potential difficulties in compound heat treatment along the length of the saddle and strain relief component 1401. The saddle end of the saddle and strain relief component 1401 will generally be heat treated, while the crimp ring end must remain malleable. Although it is possible to manufacture the saddle and strain relief component 1401 with these characteristics, it may be more economical to manufacture an alternately shaped saddle and strain relief component 1401 and assemble it to the cord with a separate compression ring. It can be appreciated that the retention mechanism described will work well with other shapes of prongs than those illustrated, which are flat blade type prongs. For example, the retention mechanism will work well with round prongs such as used in NEMA 5-15 and other plugs. Only minor changes are needed such as shaping the end of the toggle where it contacts the round prong to have a suitable matching shape and thickness to optimize how the force is applied to the material of the prong. This is desirable, since many round prongs are formed of tubular, not solid material and therefore can be deformed or crushed by too much force applied to too small an area of the material they are made of Similarly, the bottom of the saddle and/or the electrical contact could be shaped to spread the clamping force more evenly on to the round prong and/or an insert between the saddle and the terminal could be used for this purpose. Although the embodiment of FIGS. 14A-15B has been illustrated and described in relation to a conventional cord cap, it will be appreciated that similar structure can be incorporated into other types of receptacle devices including, for example, the structure described in PCT Application PCT/US2008/57140 entitled, "Automatic Transfer Switch Module," which is incorporated herein by reference.

By utilizing a clamping mechanism (e.g., the spring prong retainer 40) that captures the ground prong of the plug 50 only, the safety of the receptacle 20 may be greatly improved. In this regard, the effect of the application of various electrical potentials to clamping mechanism of the assembly is avoided, which may simplify the manufacturing of the receptacle, as well as improve its overall safety.

Figure 4A:
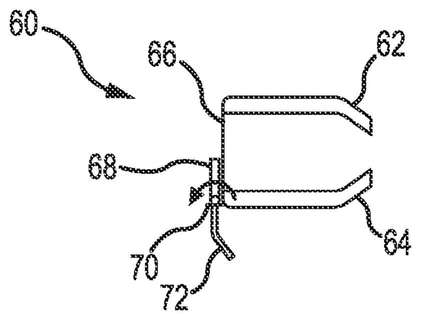
FIGS. 4A-4C illustrate an apparatus for providing a locking feature for a standard receptacle in accordance with the present invention.
Figure 4B:
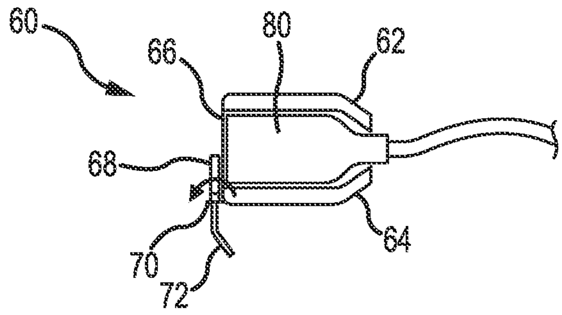
Figure 4C:
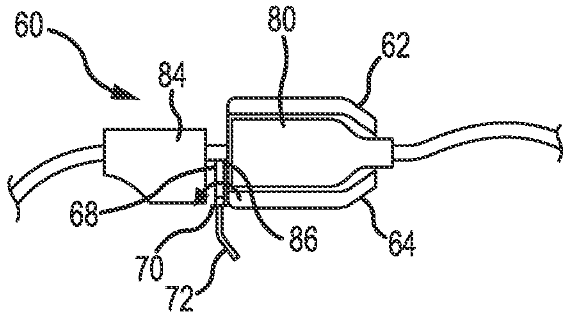

FIGS. 4A-4C illustrate a locking device 60 for providing a locking feature for a standard cord-cap receptacle. As shown in FIG. 4A, the locking device 60 includes a top holding member 62 and a bottom holding member 64 for positioning the locking device 60 onto a standard receptacle. The locking device 60 also includes a portion 66 that couples the holding member 62, 64 in relation to each other to provide a secure attachment to a receptacle. The locking device 60 also includes a clamping mechanism 68 that is coupled to a pivot 70. The operation of the clamping mechanism 68 is similar to that of the clamping mechanism 12 illustrated in FIGS. 1A-1C. It can be appreciated that the other clamping mechanisms described earlier could also be employed. As described earlier some of these eliminate the need to provide a separate release and could optionally provide a factory and/or user adjustable release tension feature. The locking device 60 may also include a release mechanism 72 that is operative to enable a user to disengage the clamping mechanism 68 when it is desired to remove a receptacle from a plug.

FIG. 4B illustrates the locking device 60 positioned onto a standard receptacle 80. To facilitate the installation of the locking device 60, the holding members 62 and 64 may be made of an elastic material such that a user may bend them outward and position the device 60 onto the receptacle 80. For example, the holding members 62, 64 may be made of plastic. Further, as shown, the holding members 62, 64 are shaped such that once installed onto the receptacle 80, the device 60 is not easily removed without a user deforming the holding members 62, 64. That is, the holding members 62, 64 may be shaped to closely fit onto standard receptacle, such that normal movements will not disengage the device 60 from the plug 80.

FIG. 4C illustrates the operation of the locking device 60 when the receptacle 80 is mated with a standard plug 84. The ground prong 86 of the plug 84 passes through an aperture in the clamping mechanism 68 and into the receptacle 80. If a withdrawing force tending to break the mated connection is applied to either the cord of the standard plug 84 or the cord of the receptacle 80, the clamping mechanism 68 will rotate, causing it to grip the ground to prong of the standard plug 84, thereby maintaining the electrical connection. If the user desires to break the connection, the user may engage to release element 72, which is operative to maintain the clamping mechanism 68 in a substantially perpendicular position relative to the ground prong 86, thereby permitting the prong 86 of the standard plug 84 to be withdrawn from the receptacle 80. It should be appreciated that although one particular embodiment of a locking device 60 has been illustrated, there may be a variety of ways to implement a locking device that may be retrofitted to a standard receptacle that uses the techniques of the present invention.

Figure 5:
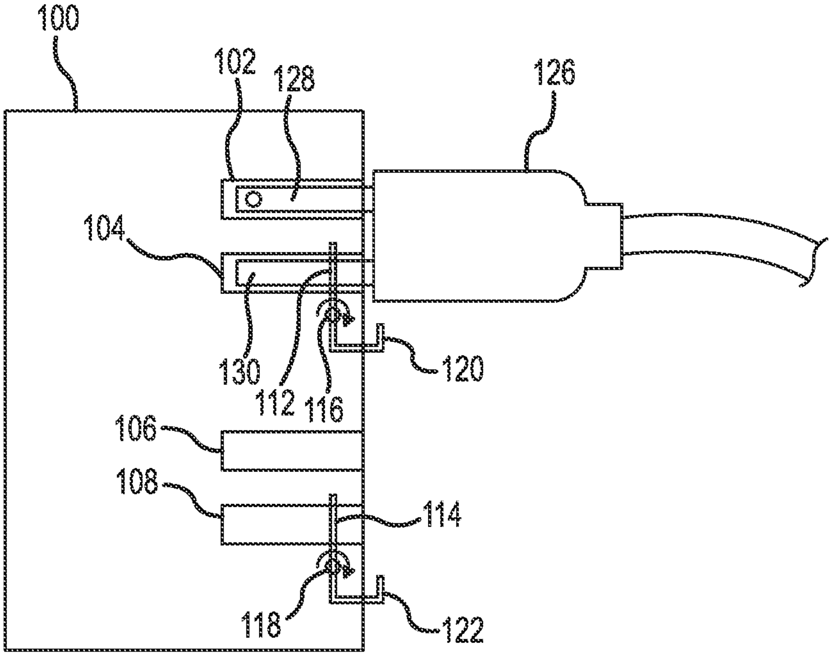
FIG. 5 illustrates an embodiment of a standard duplex locking receptacle in accordance with the present invention.

FIG. 5 illustrates an embodiment of a standard duplex locking receptacle 100. In this embodiment, clamping mechanisms 112 and 114 are integrated into the receptacle 100. The top portion of the receptacle 100 includes sockets 102, 104 for receiving the prongs 128, 130, respectively, of a standard plug 126. Similarly, the bottom portion of the receptacle 100 includes sockets 106, 108 for receiving a second standard plug. The clamping mechanisms 112, 114 are each pivotable about the pivots 116, 118 respectively. Further the receptacle 100 also includes release elements 120, 122 that are operative to permit a user to break the connection when desired. The operation of the clamping mechanism 112, 114 is similar to that in previously described embodiments. That is, in response to a force tending to withdraw the plug 126 from the receptacle 100, the clamping mechanism 112 rotates in the direction of the plug 126, and engages the ground prong 130, preventing the mated connection from being broken. If a user desires to intentionally removed the plug 126 from the receptacle 100, the user may activate the release mechanism 120 and withdraw the plug 126. It can be appreciated that the other clamping mechanisms described earlier could be employed in a standard duplex locking receptacle. As discussed earlier, some of these eliminate the need to provide a separate release mechanism and could optionally provide a factory and/or user adjustable release tension feature.

Figure 6A:
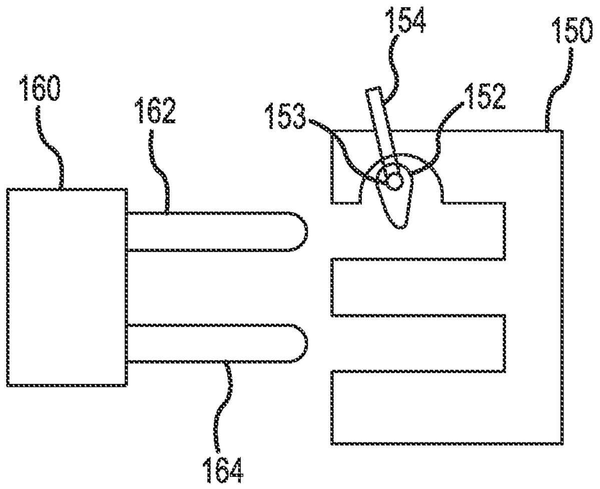
FIGS. 6A-6B illustrate an embodiment of a locking receptacle that includes a cam lock in accordance with the present invention.
Figure 6B:
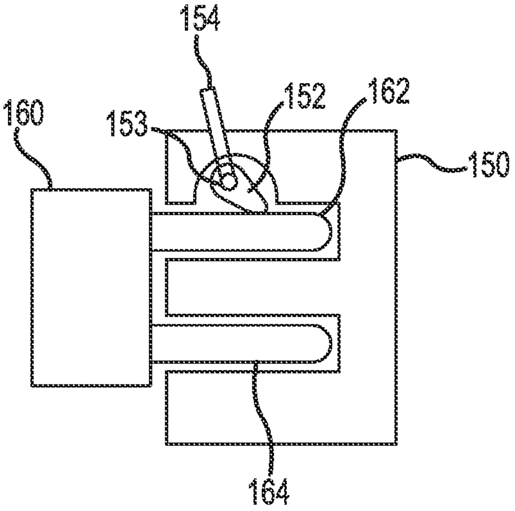

FIGS. 6A-6B illustrate side views of a receptacle 150 that includes a cam lock 152 for locking the prong 162 of a plug 160 to preserve a mated connection between the receptacle 150 and the plug 160. FIG. 6A illustrates the receptacle prior to the insertion of the plug 160, and the cam lock 152 may hang freely from a pivot 153. In this regard, an end of the cam lock 152 is positioned in the opening of the receptacle 150 that is adapted for receiving the prong 162 of the plug 160.

FIG. 6B illustrates the mated connection of the plug 160 and the receptacle 150. As shown, in the mated position the prong 162 has deflected the cam lock 152 about the pivot 153, causing the cam lock 152 to be angled away from the plug 160 and abutted with the prong 162. Thus, when an axial strain is applied to the plug 160 or the receptacle 150, the friction between the cam lock 152 and the prong 162 will tend to force the cam lock 152 downward toward the prong 162, which functions to retain the plug 160 in its mated position. If a user desires to intentionally remove the plug 160 from the receptacle 150, they may press the actuating mechanism 154, which may be operable to rotate the cam lock 152 out of the way of the prong 162, thereby enabling the user to freely withdraw the plug 160 from the receptacle 150. It should be appreciated that the cam lock 152 and the actuating mechanism may be constructed from any suitable materials. In one embodiment, the cam lock 152 is constructed out of metal, and the actuating mechanism 154 is constructed from an insulating material, such as plastic.

FIGS. 7A-7D illustrate a device 170 that may be used to secure a mated connection between a plug and a receptacle. As shown, the device 170 includes a top surface 173, a bottom surface 175, and a front surface 171. The three surfaces 171, 173, 175 are generally sized and oriented to fit around the exterior of a standard receptacle 178 at the end of a cord (i.e., a cord cap). The top and bottom surfaces 173 and 175 each include hooks 174 and 176, respectively, that are used for securing the device 170 to the receptacle 178 (shown in FIG. 7D). The operation of the hooks 174 and 176 is described herein in reference to FIG. 7D, which shows a side view of the device 170 when it is installed around the exterior of the receptacle 178. The hooks 174, 176 may be bent inward towards each other, and wrapped around an end 179 of the receptacle 178 to secure the device 170 to the receptacle 178. The other end of the receptacle 178 (i.e., the end with the openings 181 for receiving the prongs of a plug) may be abutted with the face surface 171 of the device 170.

Figure 7A:
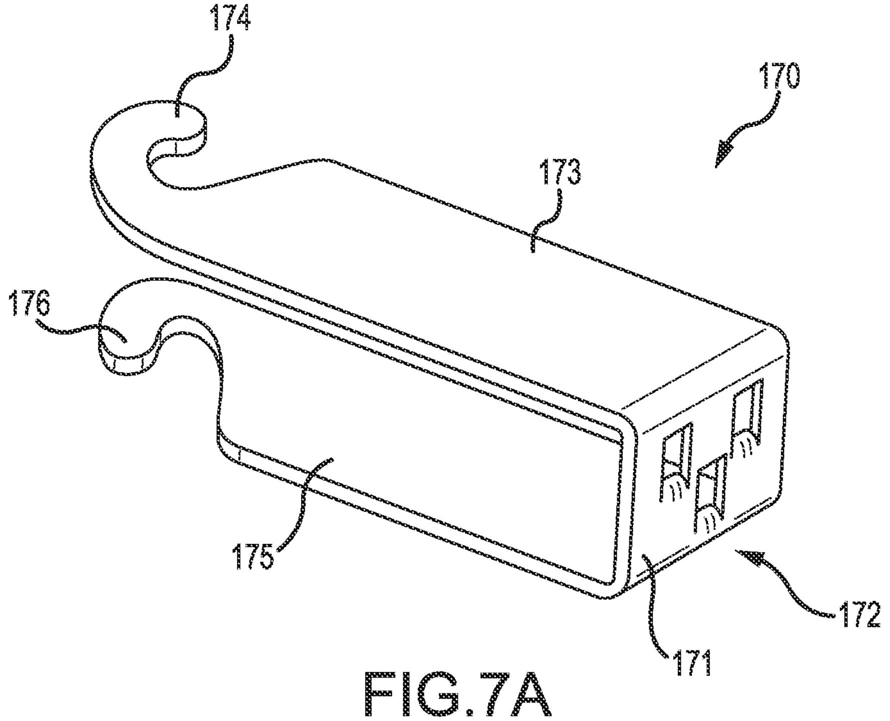
FIGS. 7A-7D illustrate an embodiment of a device for locking a mating assembly of a plug and receptacle in accordance with the present invention.
Figure 7B:
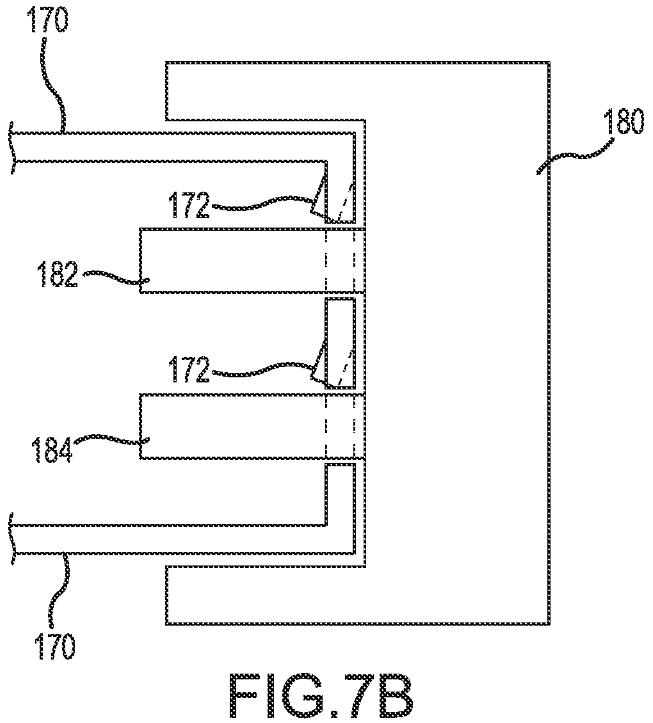
Figure 7C:
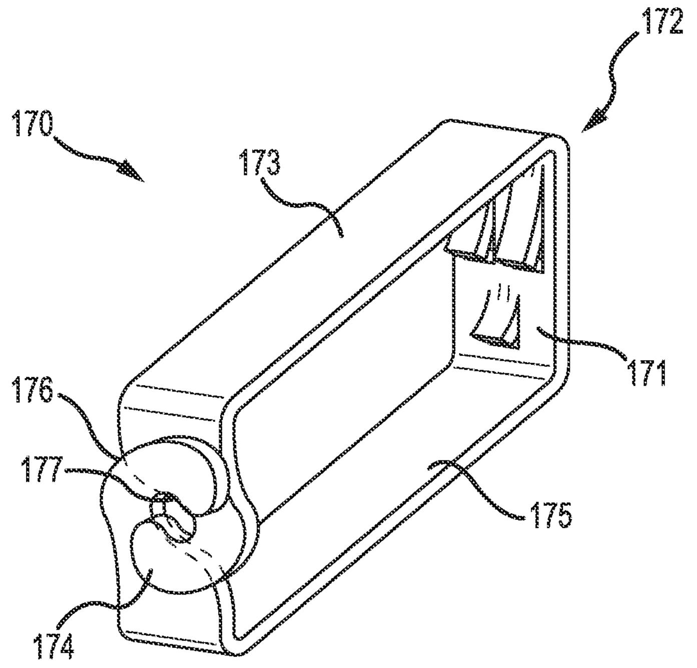
Figure 7D:
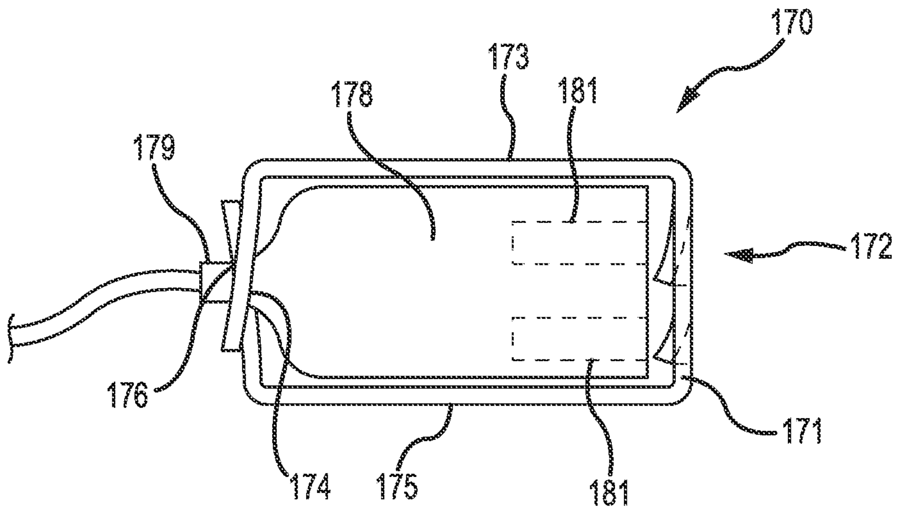

The device further includes tabs 172 that are used to securing the prongs of a plug-in place. The operation of the tabs 172 is best shown in FIG. 7B, which illustrates the device 170 when installed over the prongs 182, 184 of a plug 180. The plug 180 may be any plug that includes prongs, including typical plugs that are disposed in the back of electrical data processing equipment. As shown, when the device 170 is installed by sliding it axially toward the plug 180, the tabs 172 deflect slightly toward the ends of the prongs 182, 184. In this regard, if an axial force that tends to withdraw the device 170 from the plug 180 is applied, the tabs 172 will apply a downward force against the prongs 182, 184. Since the openings in the device 170 are only slightly larger than the prongs 182, 184, this downward force retains the prongs 182, 184 in their position relative to the device 170. Further, because the device 170 may be secured to a standard receptacle as illustrated in FIG. 7C, the tabs 172 prevent the connection between the receptacle 178 and the plug 180 from being broken. The device 170 may be constructed of any suitable non-conductive material. In one embodiment, the device 170 is constructed from a semi-rigid plastic. In this regard, the device 170 may be a single use device wherein a user must forcefully withdraw the installed device 170 from the prongs 182, 184 of the plug 180, thereby deforming the plastic and/or breaking the tabs 172. It should be appreciated that if a user desired to unplug the receptacle 178, they may simply unwrap the hooks 174, 176 from the end 179 and separate the mated connection, leaving the device 170 installed on a plug.

Figure 8A:
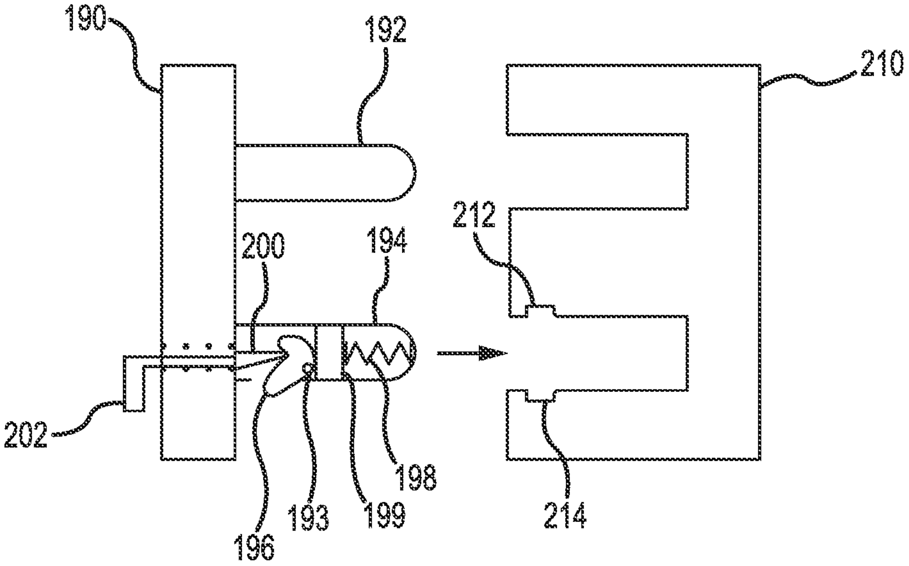
FIGS. 8A-8C illustrate an embodiment of plug that includes a toggle locking mechanism in accordance with the present invention.

FIG. 8A illustrates a plug 190 that includes a locking mechanism prior to insertion into a receptacle 210. As shown in a simplified manner, the receptacle 210 includes recesses 212 and 214. Most standard receptacles include a recess or shoulder inside the openings that are adapted to receive the prongs of a plug. This recess may be present due to manufacturing requirements, such as the molding process used to manufacture the receptacles. Further, the need to include various components (e.g., electrical connections, screws, etc.) in the receptacles may cause the need for the small recesses. If the recesses are not already present, they could be designed into the receptacle.

The plug 190 uses the recess 214 to assist in creating a locking mechanism. As shown, a hollow prong 194 (e.g., the ground prong) of the plug 190 includes a toggle 196 that is attached via a pivot to the 193 inner portion of the prong 194. A spring 198, piston 199, and an actuating mechanism 200 function together to enable the toggle 196 to be oriented in a lock configuration (shown in FIG. 8B), and a release configuration (shown in FIG. 8C). In one embodiment, the spring 198 acts to bias the tab 198 in the release position, which may be a substantially aligned with horizontal position inside the prong 194. Furthermore, the actuating mechanism 200 may be operable to rotate the toggle 196 into the unlock position (shown in FIG. 8C) where the toggle 196 retracts into the prong 194 at an angle substantially parallel to the body of the prong 190. A user may control the actuating mechanism 200 through a control switch 202, which may be positioned on the front of the plug 190.

Figure 8B:
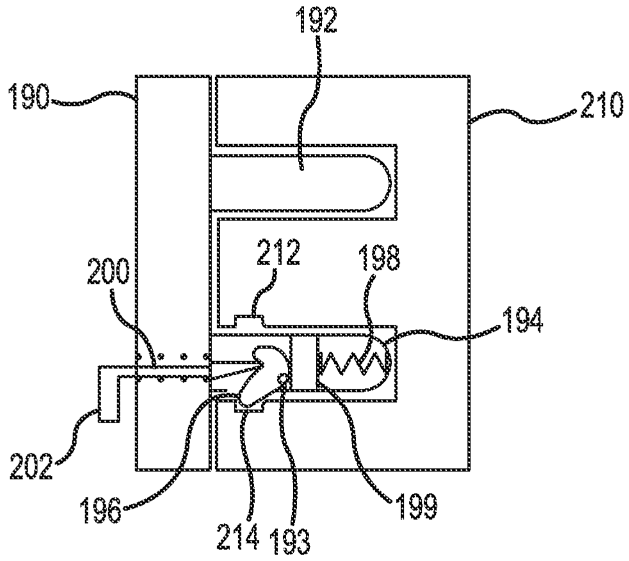
Figure 8C:
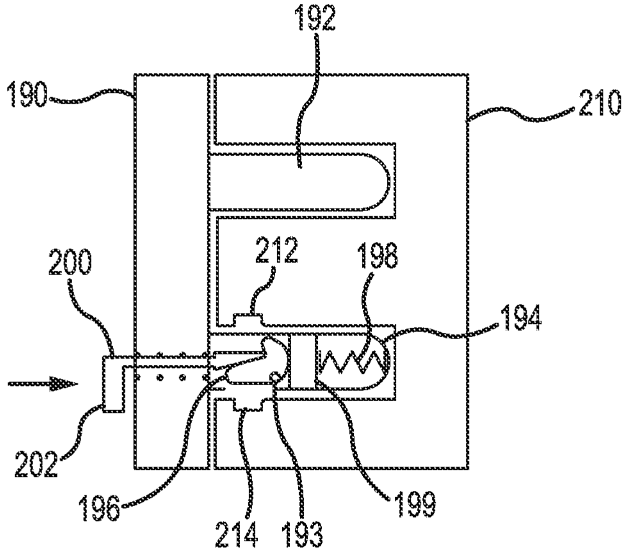

FIG. 8B illustrates the plug 190 when in a mated position with the receptacle 210. As shown, the tab 196 has been placed in the lock position by the pressure asserted by the spring 198 and piston 199. In this configuration, the tab 196 will resist any axial force that tends to withdraw the plug 190 from the receptacle 210. This is the case because the recess 214 acts as a stop for the tab 196. Therefore, the plug 190 may be securely fastened onto the receptacle 210. FIG. 8C illustrates when a user desires to remove the plug 190 from the receptacle 210, they may depress the control switch 202 on the front of the plug 190, which causes the actuating mechanism 200 and the spring 198 to rotate the tab 196 into the release position.

Figure 9A:
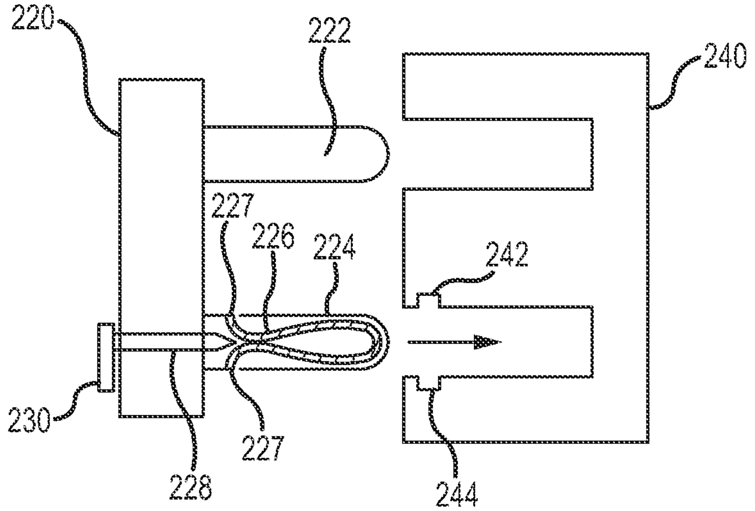
FIGS. 9A-9B illustrate another embodiment of a plug that includes a divergent spring tip locking mechanism in accordance with the present invention.
Figure 9B:
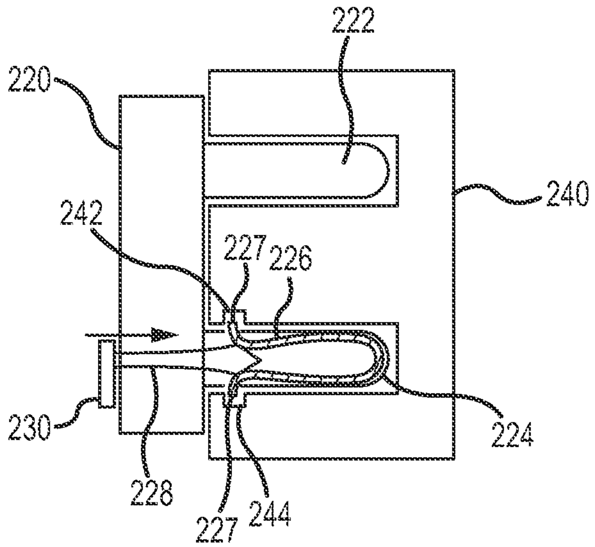

FIGS. 9A-9B illustrate another embodiment of a plug 220 that includes a divergent spring tip locking mechanism prior to insertion into a receptacle 240. Similar to the plug 190 shown in FIGS. 8A-8B, the plug 220 may be adapted to work with the standard receptacle 240 that includes recesses 242 and 244. The plug 220 may include a hairpin spring 226 that is disposed inside a hollow prong 224 (e.g., the ground prong). In a release position, the ends 227 of the spring 226 are disposed inside of the prong 224 and adjacent to openings in the prong 224. The plug 220 may further include an actuating mechanism 228, couple to a control switch 230 on the front of the plug 220, for biasing the spring 226 into a lock position, where the ends 227 of the spring 226 protrude outside of openings in the prong 224 (see FIG. 9B).

FIG. 9B illustrates the plug 220 when installed into the standard plug 240. As shown, the actuating mechanism 228 has been moved axially toward the spring 226 into the standard receptacle 240, causing the ends 227 to spread apart and out of the openings in the prong 224. The openings of the prong 224 are aligned with the recesses 242 and 244 such that the ends of the spring 226 are disposed in the recesses 242 and 244 when in the lock position. Thus, as can be appreciated, when an axial force that tends to withdraw the plug 220 from the receptacle 240 is applied, the ends 227 of the spring 226 are pressed against the recesses 242 and 244, which prohibits the prong 224 from being removed from the receptacle 240. When a user desires to remove the plug 220 from the receptacle 240, they may operate the control switch 230 which causes the actuating mechanism to axially withdraw from the spring 226. In turn, this causes the ends 227 of the spring 226 to recede back into the prong 224, such that the user may then easily remove the plug 220 from the receptacle 240.

Figure 10B:
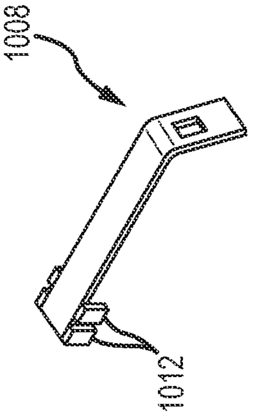
FIGS. 10A-10B illustrate a further embodiment of an end cap incorporating a locking mechanism in accordance with the present invention.
Figure 10A:
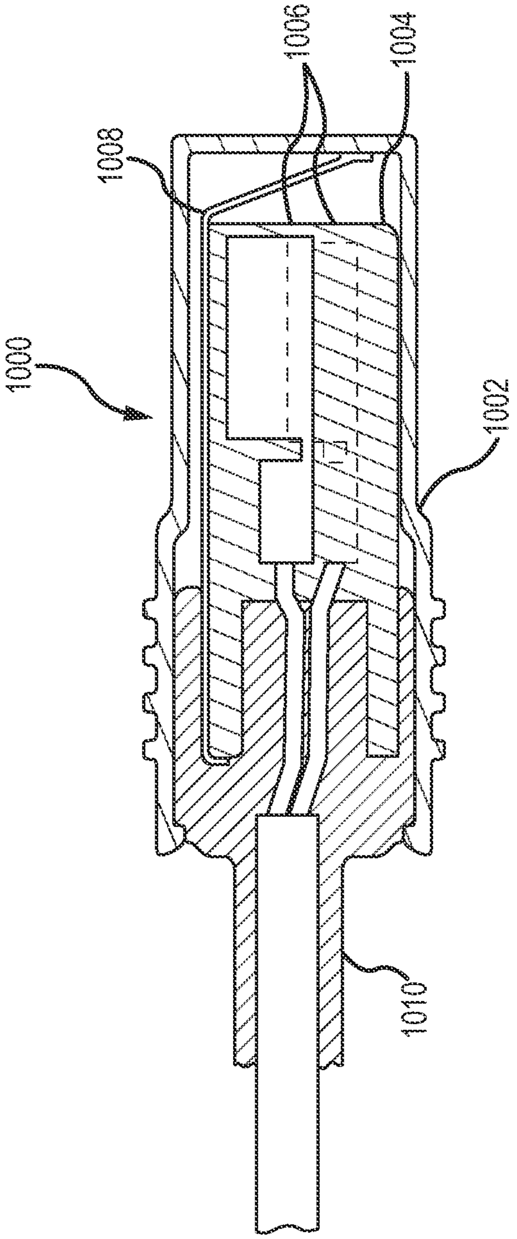

FIGS. 10A and 10B show a locking electrical receptacle 1000 according to a further embodiment of the present invention. The receptacle 1000 is generally similar in construction to the structure of FIGS. 2A-2B. In this regard, the illustrated receptacle 1000 includes an end cap formed from an outer lock release grip 1002 that is slidably mounted on an inner contact carrier module 1004. The inner contact carrier module carries a number of sockets or receptacles generally identified by reference numeral 1006. The illustrated receptacle 1000 further includes cord strain relief 1010 and spring prong retainer 1008.

FIG. 10B shows a perspective view of the spring prong retainer 1008. As shown, the retainer 1008 includes a number of gripping tabs 1012 for gripping the contact carrier module 1004. In this regard, the gripping tabs 1012 may be embedded within the molded contact carrier module 1004 so as to more firmly secure the retainer 1008 to the carrier module 1004. Alternatively, the tabs 1012 may be pressed into the carrier module 1004 or attached to the module 1004 by an adhesive or the like. In this manner, the tabs 1012 assist in securing the spring prong retainer 1008 to the contact carrier module 1004 and maintaining the relative positioning between the spring prong retainer 1008 and the contact carrier module 1004. It will be appreciated from this discussion below that this relative positioning is important in assuring proper functioning of the locking mechanism and controlling the release tension. The locking electrical receptacle of 1000 otherwise functions as described above in connection with FIGS. 2A-3B.

Figure 11B:
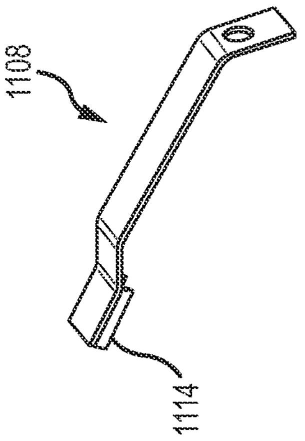
FIGS. 11A-11B illustrates an alternative shaping of a spring prong retainer in accordance with the present invention that enables improved cord retention and increased overall strength.
Figure 11A:
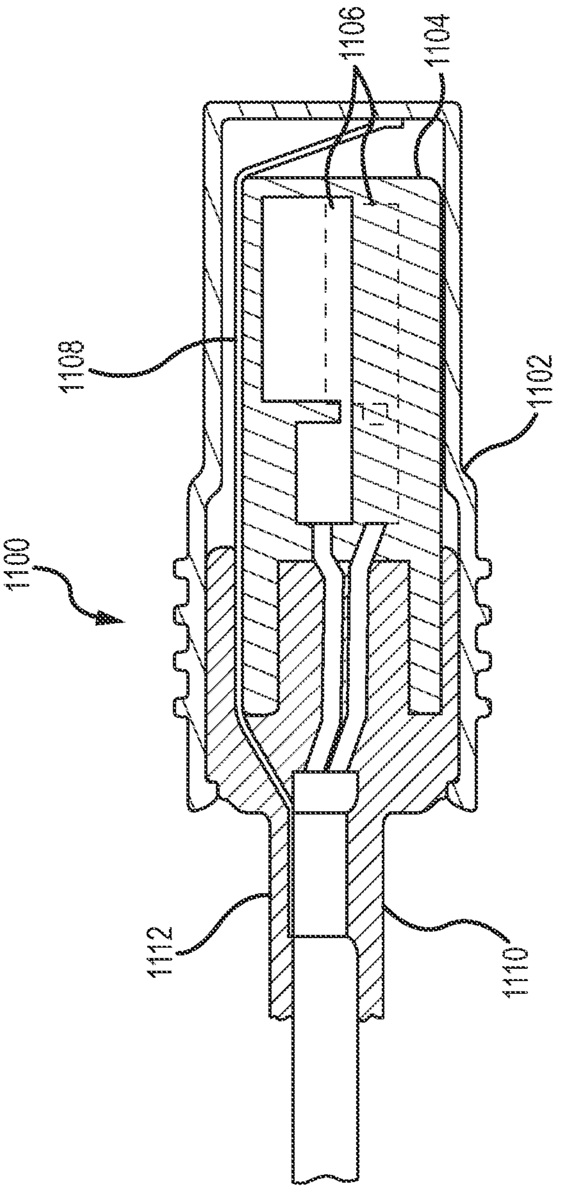

FIGS. 11A and 11B show a further embodiment of a locking electrical receptacle 1100. Again, the receptacle 1100 is generally similar to the structure described above in connection with FIGS. 2A and 2B and includes an outer lock release grip 1102, and inner contact carrier module 1104 including a number of receptacles 1106, and a cord strain relief structure 1110. The illustrated embodiment further includes a spring prong retainer 1108 incorporating strain relief structure. It will be appreciated that the locking mechanism of the present invention can result in significant strain forces being applied to the end cap in the case where large tension forces are applied to a plug against the locking mechanism. Such forces could result in damage to the end cap and potential hazards associated with exposed wires if such forces are not accounted for in the end cap design.

Accordingly, in the illustrated embodiment, the spring prong retainer 1108 includes strain relief structure for transmitting such strain forces directly to the power cord. Specifically, the illustrated spring prong retainer 1108 is lengthened and includes a cord grip structure 1114 at a rear end thereof. The cord attachment grip structure 1114 attaches to the power cord or is otherwise connected with a crimping band 1112 that can be secured to the power cord via crimping and/or welding, etc. or the like. In this manner, strain forces associated with operation of the spring prong retainer 1108 to grip prongs of a plug are transmitted directly to the power cord.

Various characteristics of the locking electrical receptacle of the present invention can be varied to control the release stress of the locking electrical receptacle. In this regard, the geometry, thickness, material qualities and detail shaping of the gripping component can be used to control the release tension of the locking mechanism. As an example, increasing the thickness and/or stiffness of the material of the gripping component increases the release tension of the locking mechanism.

Figure 12:
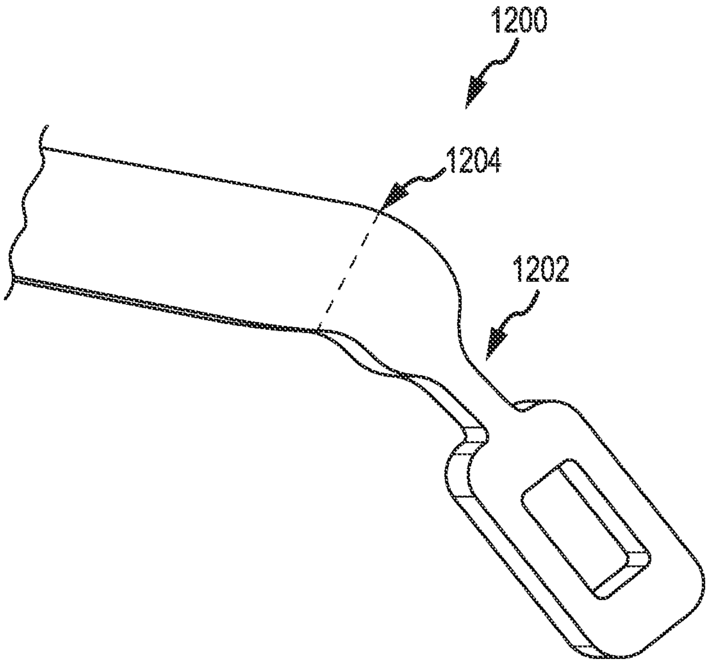
FIG. 12 is a perspective view of an alternative embodiment of a spring prong retainer in accordance with the present invention.

The geometry of these spring prong retainers may also be varied to provide improved safety and performance. FIG. 12 shows on example in this regard. The illustrated spring prong retainer 1200, which may be incorporated into, for example, the embodiments of FIG. 2A-2B, 10A-10B, or 11A-11B, includes a narrowed neck portion on 1202 between the flex point 1204 of the spring prong retainer and the prong engagement opening. This neck portion may provide a number of desirable functions. For example, the neck portion 1202 may be positioned to provide greater clearance between the spring prong retainer 1200 and the other prongs of plug. In addition, the narrow portion 1202 may be designed to provide a defined breakpoint in the case of structural failure. That is, in the event breakage occurs due to stress or material fatigue, the neck portion 1202 provides a safe failure point that will not result in electrical hazards or failure of the electrical connection.

It can be appreciated that all of the retention mechanisms described herein that can have their release tension changed by varying their design parameters, can have a release tension that is coordinated with the receptacle design or a standard or specification so as to ensure that the cord cap or receptacle will not break resulting in a potentially hazardous exposure of wires. Thus, for example, it may be desired to provide a release stress of forty pounds based on an analysis of an end cap or receptacle structure, a regulatory requirement, or a design specification. The locking mechanism may be implemented by a way of a spring prong retainer as shown, for example, in FIGS. 2A-2B, 10A-10B and 11A-11B. Then, the material and thickness of the spring prong retainer as well as the specific geometry of the spring prong retainer may be selected so as to provide a release stress of 40 lbs. The locking mechanism with a release stress of 40 lbs. can also be implemented in the toggle and saddle mechanism as shown, for example in FIGS. 14A-14D and 15A-15B. The values of these various design parameters may be determined theoretically or empirically to provide the desired release point.

Figure 16A:
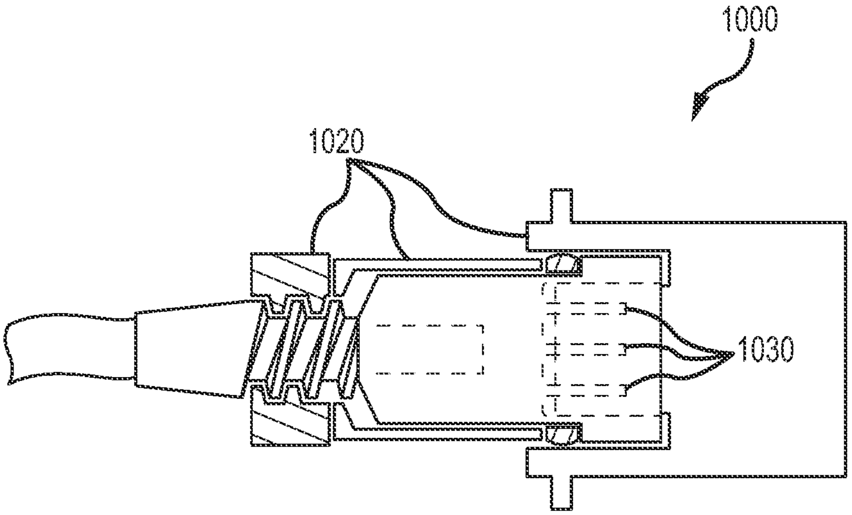
FIGS. 16A-18K illustrate the operation of several embodiments of retention mechanisms in accordance with the present invention.
Figure 16B:
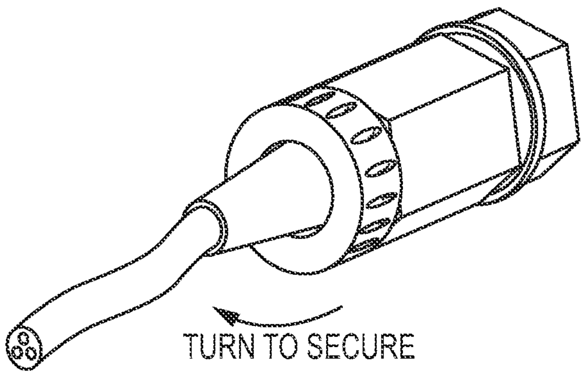
Figure 17A:
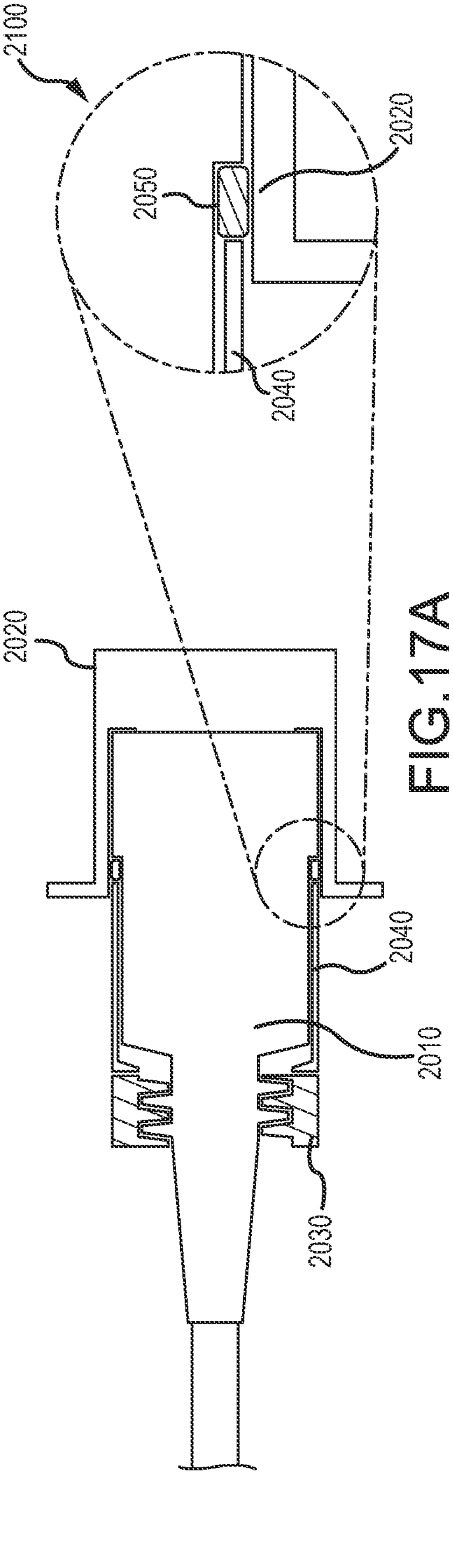

FIGS. 16A-16B illustrate an embodiment of a retention mechanism for securing a mated electrical connection that may be included in a secure connection of the present invention. In FIGS. 16A-16B, the top portion represents a top view of a mated plug and receptacle 100 and a retention mechanism 1020, while the bottom portion represents a perspective view. The electrical prongs 1030 may be two or more in number (e.g., an IEC 320 plug, a NEMA 5-15, or the like) and may be various sizes and shapes. Further, the plug and receptacle 1000 may be the plug and receptacle of a standard outlet (e.g., an IEC 320 cord cap, or the like). The plug also includes the retention mechanism 1020. The design of the secure retention mechanism 1020 is such that a simple slide in and then secure the connection technique is utilized. Referring next to FIG. 17A, the plug and receptacle are shown mated but prior to the connection being secured. This embodiment is one that the user must manually elect to secure, as described earlier.

Figure 17B:
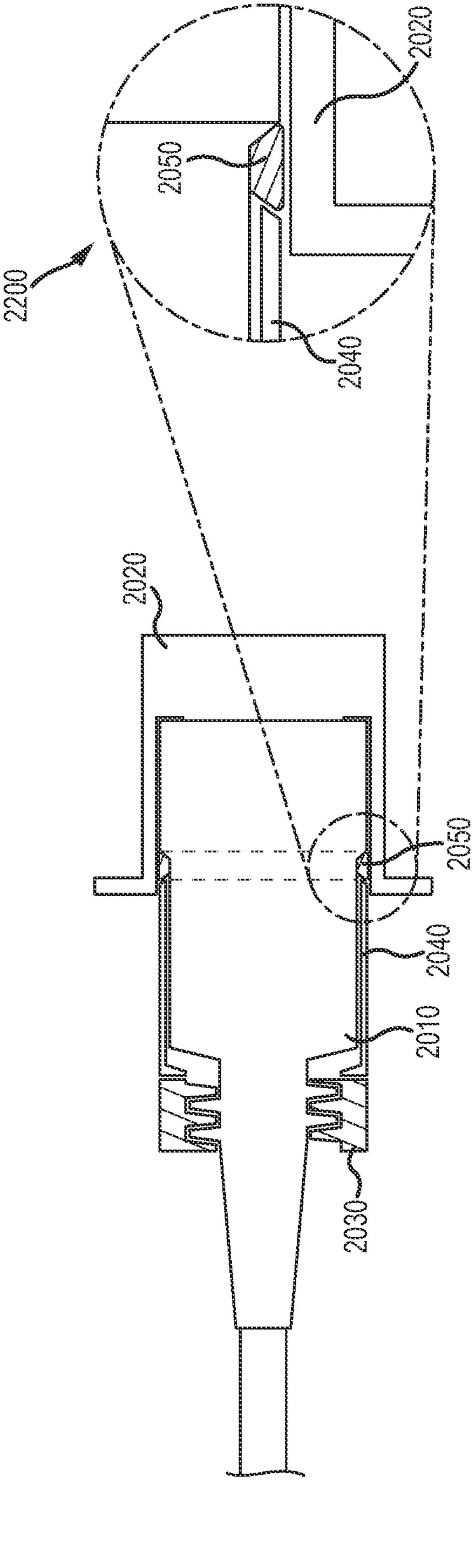

FIGS. 17A-17B illustrates the plug 2010 when inserted into the receptacle 2020. As shown, the plug and receptacle are in a mated, but not yet secured position. The manual actuation nut 2030 is twisted by the user to secure and release the connection. The nut can have an optional ratcheting mechanism as described earlier, this is not shown. The outer shell 2040 is pressed into the elastomer 2050 by the action of the nut 2030, when the nut is tightened. The outer shell will compress the elastomer when tightened and will be pushed back by the expansion of the elastomer when the nut is loosened. Optionally, the shell can be positively attached to the nut using an appropriate mechanism (such as a mushroom ended pin going through a semi-circular slot in the nut) to ensure that it is positively retracted when the nut is loosened. This is an optional construction that is not shown. The blow-up portions of the diagram, 2100 and 2200 show two different possible instantiations of this part of the mechanism. Detail 2030 shows the shape of the area of the mechanism where the elastomer is compressed as substantially rectangular. Detail 2040 shows the shape of the area of the mechanism where the elastomer is compressed in a shape that utilizes inclined ramps to compress the elastomer. As will be appreciated, the materials and detailed geometry of both 2100 and 2200 can be varied to optimize their function as described earlier.

Figure 18A:
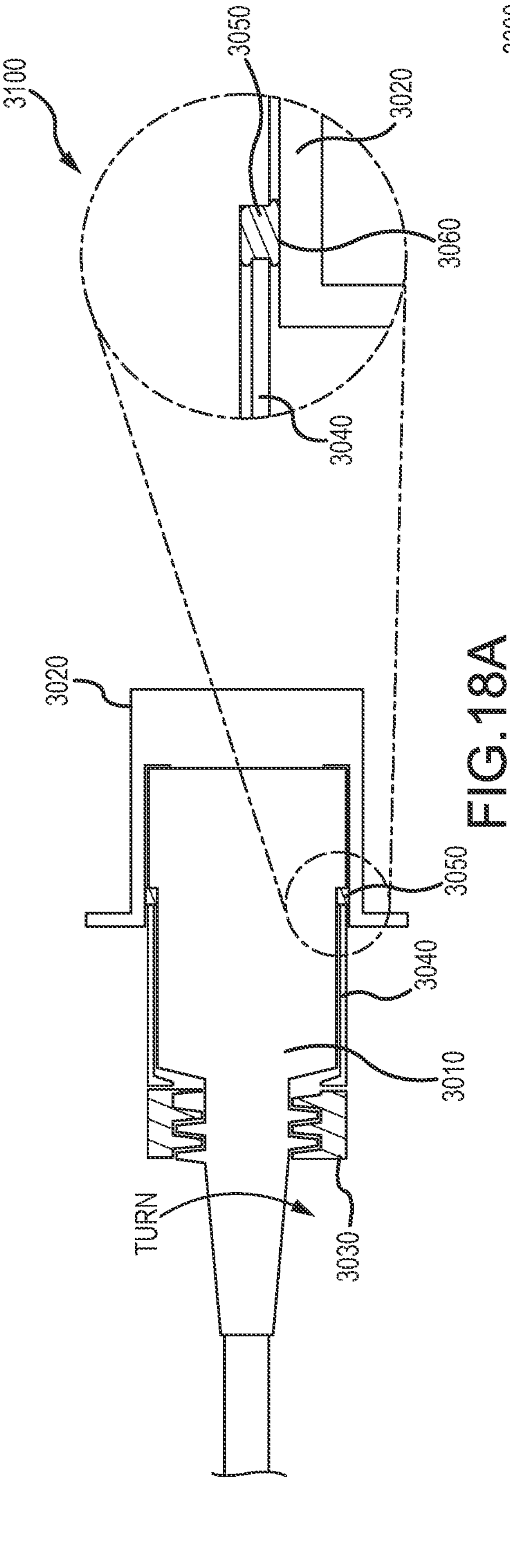
FIGS. 18AA-18TT show an in-line surge suppression circuit and cord caps in accordance with various international standards, all incorporating a compression component in accordance with the present invention.
Figure 18B:
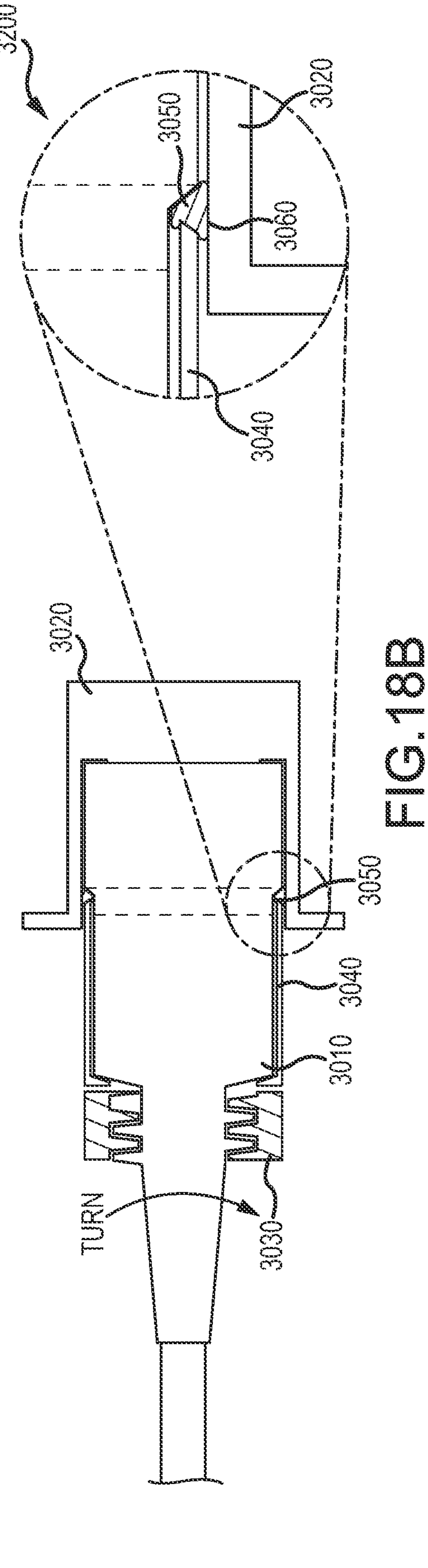
FIGS. 18L-18Z illustrate further embodiments of cord caps incorporating retention mechanisms and associated construction techniques in accordance with the present invention.

FIGS. 18A-18B illustrates the plug 3010 when inserted into the receptacle 3020. As shown, the plug and receptacle are in a mated and secured position. The manual actuation nut 3030 has been twisted by the user to secure the connection. The outer shell 304 is being pressed into the elastomer 3050 by the action of the nut 3030, which is tightened down. The outer shell is compressing the elastomer, which in turn is pressed tightly against the wall 3060 of the abutting receptacle 3020. This is shown in more detail in the blow-up portions of the diagram, 3100 and 3200. The outer shell 3040 will be pushed back by the expansion of the elastomer when the nut 3030 is loosened. Optionally, the outer shell 3040 can be positively attached to the nut using an appropriate mechanism (such as a mushroom ended pin going through a semi-circular slot in the nut) to ensure that it is positively retracted when the nut is loosened. This is an optional construction that is not shown. Detail 3100 shows the shape of the area of the mechanism where the elastomer is compressed as substantially rectangular. Detail 3200 shows the shape of the area of the mechanism where the elastomer is compressed in a form that utilizes inclined ramps to compress the elastomer. As will be appreciated, the materials and detailed geometry of both 3100 and 3200 can be varied to optimize their function as described earlier.

Figure 18C:
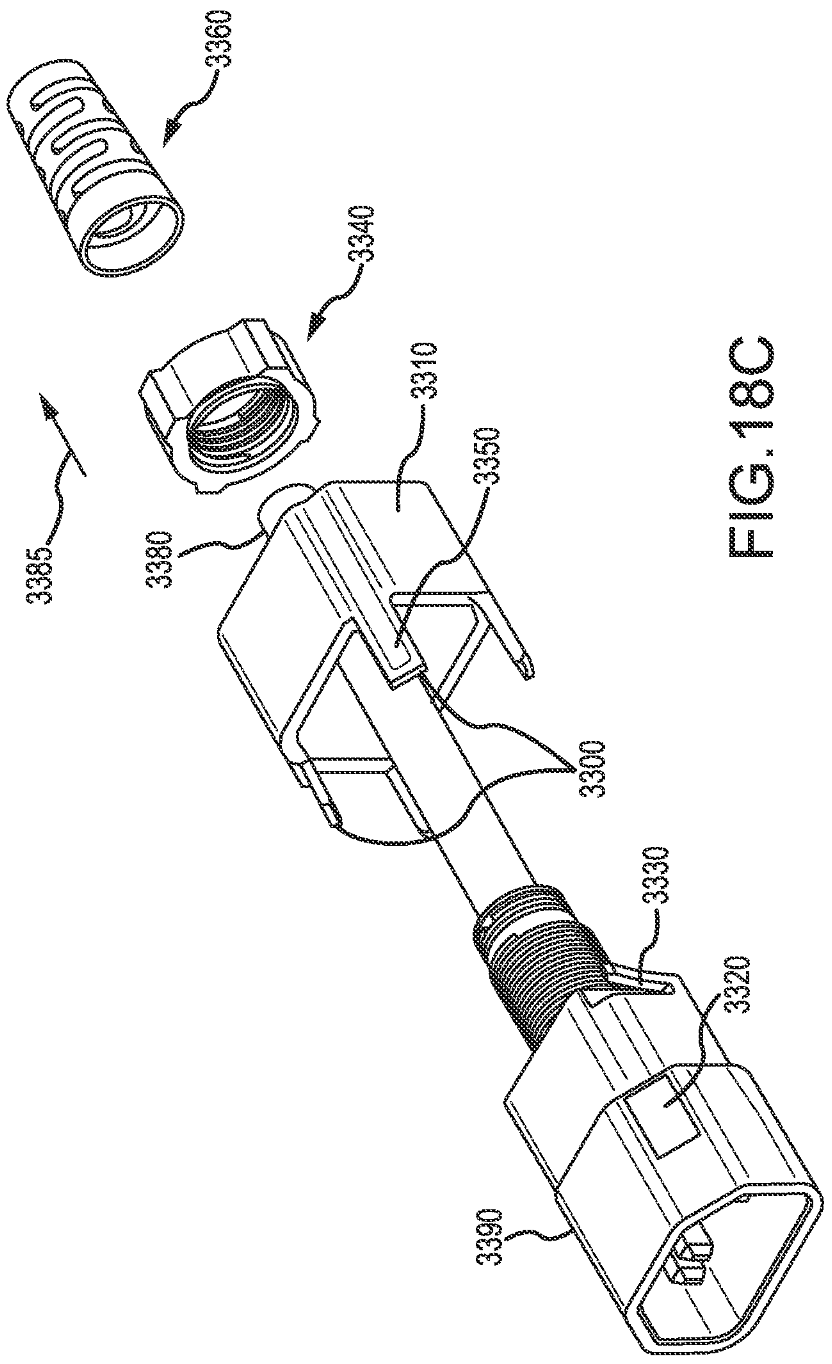
Figure 18D:
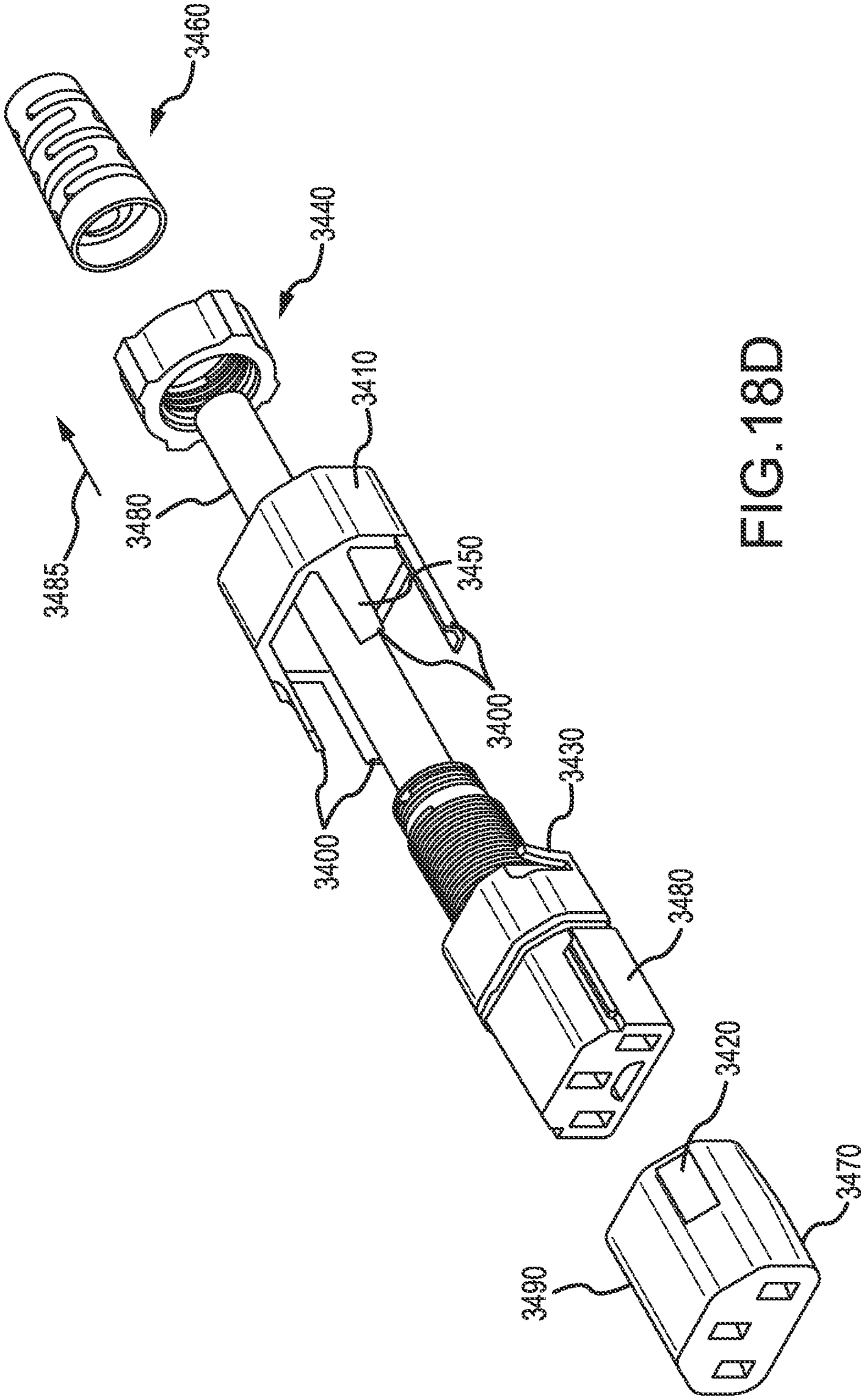

FIG. 18C illustrates a blowup of another possible instantiation of the invention. The tabs 3300 located on the outer shell 3310 are driven axially forward by the action of the nut 3340, when it is tightened down. The tabs 3300 push forward over ramps 3320 in the part of the assembly that is inserted into the matching receptacle. The example in FIG. 18C shown is a male C13, but the same concepts and mechanisms work with a female C13 as shown in FIG. 18D. The only substantial difference in construction between the male C13 shown in FIG. 18C and the female C13 shown in FIG. 18D is how the electrical contacts are located, in the female version a contact carrier 3480 (which is usually a safety agency approved part) is molded into the cord cap. The outer shell 3470 can be over-molded onto the contact carrier or made as a separate part that snaps over the contact carrier, which is the construction shown in FIG. 3D. Other construction methods are possible. The geometry, material, location, number and mechanical action of the tabs 3300, 3400 and ramps 3320, 3420 can be varied to ensure that the area of maximum pressure exerted by the ramps contacting the mated receptacle is located as desired. This can be important to maximize the retention force and ensure that the receptacle can withstand the force applied by the tabs 3300, 3400 without damage. The tabs 3300, 3400 can be one or more in number, and can be located to maximize the retention force of the mechanism. They may or may not be located to oppose each other, which can be used to ensure that the force applied to the receptacle maximizes the retention force. As shown, the tabs 3300, 3400 would tend to apply force to the receptacle such that the walls of the receptacle are stressed in tension, which can be desirable, depending on the material of the receptacle. The surface of the tabs 3350, 3450 that contacts the wall of the mated receptacle can be made of one or more materials with suitable mechanical and frictional characteristics. An example of a possible instantiation would be to make the outer shell 3310, 3410 of a harder, mechanically strong material and then coat or the tab surfaces 3350, 3450 with a high friction coefficient elastomer. This could be economically done via a coinjection ("sandwich") molding process, for example. As can appreciated, in reaction to a withdrawal force 3385,3485 applied to the cord 3380, 3480, the retention mechanism as shown in FIG. 18C, 18D will transmit the force via the cord 3380, 3480 to the end of the cord cap 3390, 3490. This will compress elastomer injection molded materials that are commonly used to make electrical cords, resulting in the end of the cord cap being moved slightly closer to the outer shell 3310, 3410 which moves the tabs 3300, 3400 farther up the ramps 3340, 3440 which presses the contact area of the tabs 3350, 3450 into closer and closer contact with the walls of the receptacle, causing the frictional interlock between the plug and the receptacle to increase. Thus, the very force 3385, 3485 that tends to withdraw the plug from the receptacle acts to engage the retention mechanism to frictionally interlock with the walls of the receptacle, thereby preventing the withdrawal of the plug, and maintaining the electrical connection of the mated assembly. The geometry, material, and mechanical action of the tabs 3300, 3400 and ramps 3320, 3420 can also be varied to provide a programmable release mechanism by limiting the force applied to the walls of the mated receptacle and thus the frictional interlock between the contact surfaces of the tabs 3350, 3450 and the walls of the mated receptacle. Limiting the frictional interlock limits the maximum force the secured connection can resist. Once that level of force is applied, the plug and receptacle will separate. As discussed earlier, the level of the maximum force can therefore be specified to prevent damage to the plug and receptacle and/or meet an applicable standard and as also discussed earlier a range of retention force values that can be adjusted by the user via the action of the nut 3340, 3440.

FIGS. 18E-18K illustrate another possible instantiation of the invention and represents an alternate locking method for an IEC-13 receptacle utilizing a novel retention mechanism. It is comprised primarily of three main components associated with the gripping of this connector to a mating type connector, e.g., IEC-14. It should be noted that this mechanism is not limited to the IEC series connectors but could be adapted to a variety of connector mating applications including those that utilize a shield barrier outer shell on the receptacle. In the case of such shield barrier receptacles, gripping can be accomplished by using the shield barrier as a frictional element against the wall of the mating receptacle and is independent of the electrical conduction methods utilized within the connectors themselves.

Figure 18E:
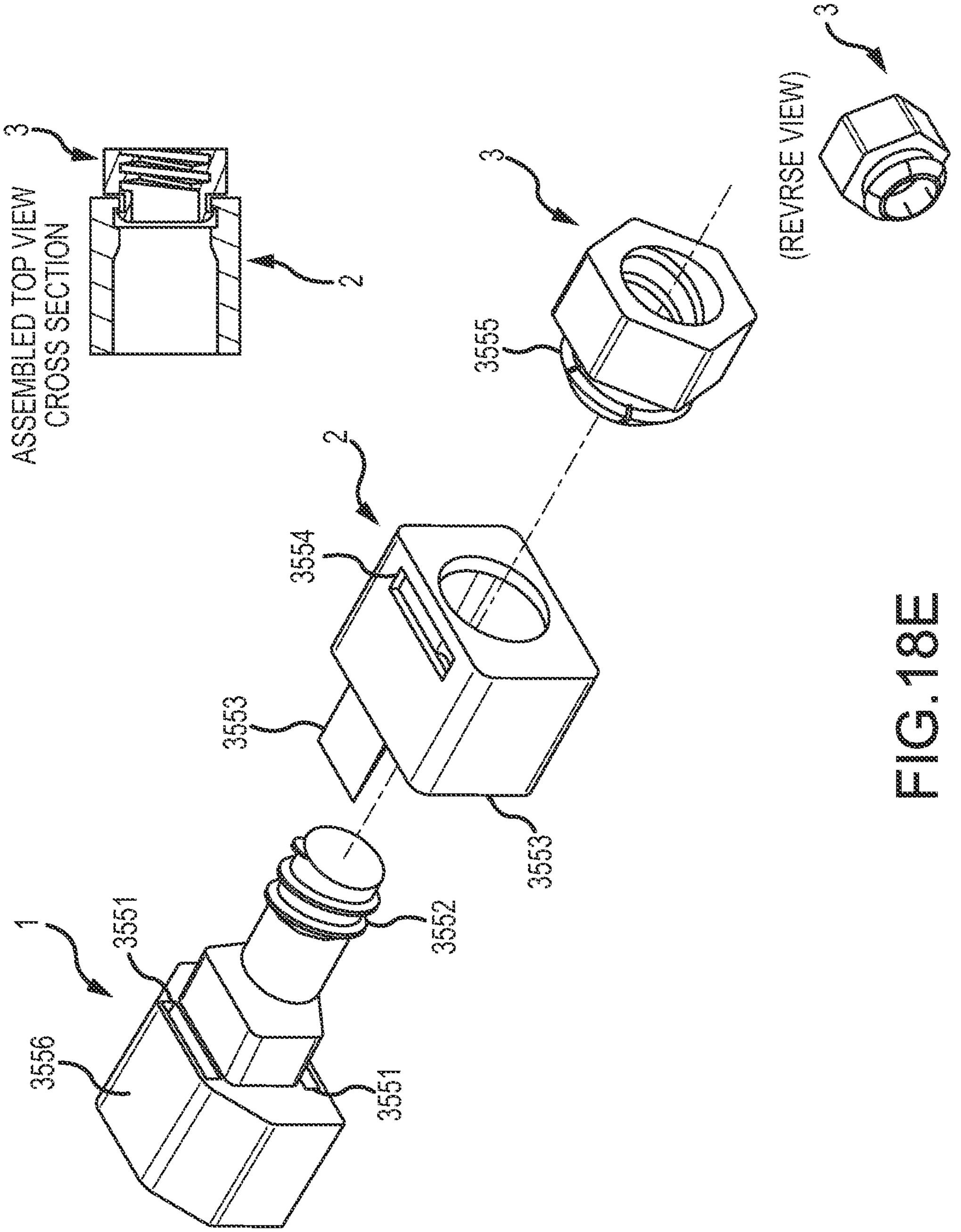

Observing FIG. 18E, the inner core of the connector 1 is comprised of a molded assembly that is very similar to traditional IEC-13 (or other standards) cord-cap receptacles (female end) with regards to dimensions and electrical interface components. It differs in that dielectric over-mold has two rectangular holes 3551 through the outer shell penetrating to the interior of the shell. In addition, a locking tab shuttle 2 made of a suitable material provides the locking tabs 3553 and structure for transferring force from a locking nut 3 into the interior of the shell area of the inner core 1 via holes 3551.

Figure 25:
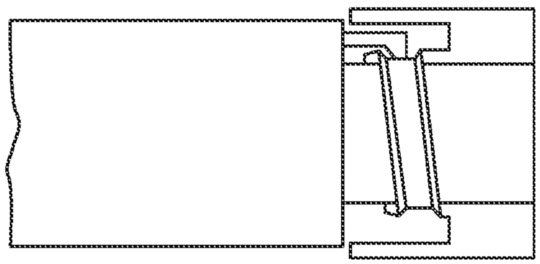
FIG. 25 illustrates an embodiment of a mechanism that ensures positive retraction of the outer shell when the locking nut is turned to the release position in accordance with the present invention.

The locking to a mating connecter is achieved by the tabs 3553 being driven by the nut and thereby wedged between the top and bottom outer surface of the mating connector, and the top and bottom inside surfaces of the inner core shell 1. When it is desired to release the connection, the nut 3 is loosened which withdraws the tabs 3353 by positive retraction. This is accomplished by the engagement collar 3555 on the nut 3 which turns in the slot 3554 in the locking tab shuttle 2 pulling out the tabs 3553. Other means can be used to attach the nut 3 to the locking tab shuttle 2, an example is shown in FIG. 25. This method of locking provides good gripping with a programmable release force. Careful selection of the shapes, geometry and materials used allow the maximum retention force to be limited to a desirable range of values. Additionally, the outer surfaces of the over-mold (for example the outer surfaces that are directly over the locking tabs 3553 can optionally be coated, textured, or otherwise designed to increase the frictional force between the outer shell 3551 and the mating wall of the receptacle. The ability to control the release force to a chosen range of values is a desirable to prevent excessive pulling force from possibly damaging the plug and cord cap in the mating connection. It can also be useful to satisfy certain agency approvals. In addition, this method is simple to manufacture and has a minimum of moving parts.

Figure 18F:
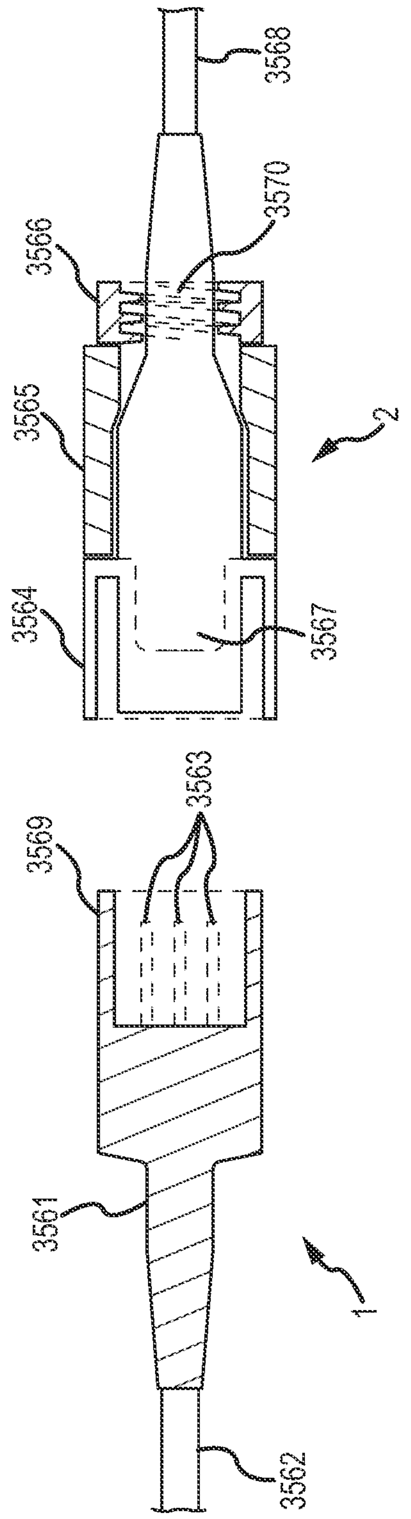

Referring to FIG. 18F, cross-sections of two primary parts are shown, a top view of the traditional cord-cap plug (male connector), 1 and a top view of the mating cord-cap connector (female receptacle) 2. The plug 1 is described as part of the description of the method of securing the electrical connection, but a key point is that the plug can be a standard un-modified plug. Only the mating receptacle 2 differs from traditional standards and is unique. This means that the invention is applicable to the very large installed population of standard plugs, such as are used in plug strips in data centers. IEC C14 plug strips are very popular for distribution of 200V+ electrical service worldwide. The traditional plug is comprised of three major components as shown in FIG. 18F, the over-mold dielectric 3561, a connecting cord containing the necessary electrical conductors 3562, and the electrical mating connector pins 3563. This example is of a traditional IEC-14 type plug but could be other types utilizing an outer pin dielectric barrier 3569. This outer pin barrier 3569 is generally concentric around the pins 3563 and will be the object of the gripping by the mating receptacle when applied.

The focus of this application is the receptacle assembly 2 which includes a core with an outer shell 3564, a shuttle 3565 which includes, as a part of it, locking tab 3567 one of which is shown. This is the top view so the outline of the tab can be observed, but two tabs exist, one on the top of the connector and one on the bottom, where each is an integral part of the molded shuttle components in the illustrated. The tabs shown are a preferred instantiation, but the methods described can work with other tab numbers, shapes, and locations. The core 3564 has also molded onto it some type of threads 3570 which engage with a locking nut 3566. This threaded nut works against the threads of the core 3564, to apply force to the movable shuttle 3565 and transmit axial force to the tabs 3567.

Figure 18G:
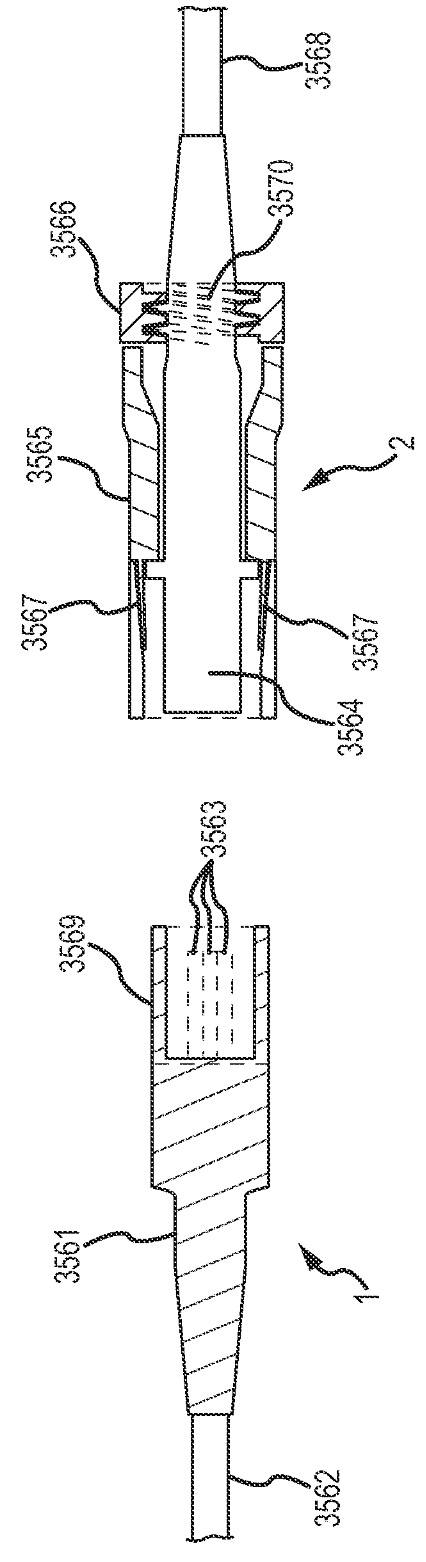
Figure 18H:
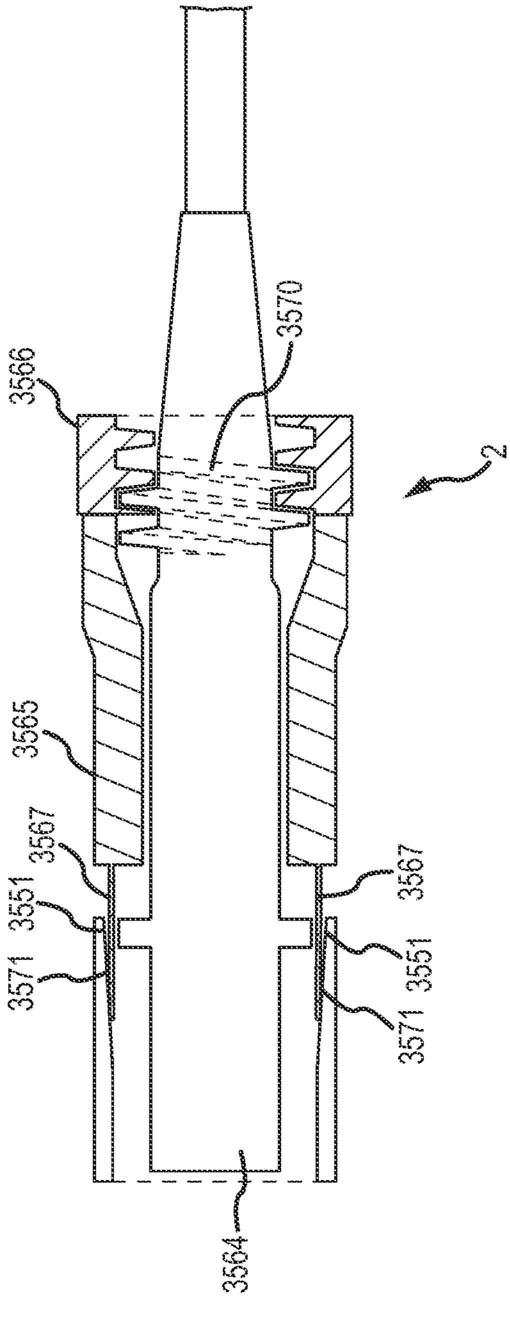

FIG. 18G represents a cross section side view of the aforementioned components in FIG. 18F. This view shows more clearly the relationship of the top and bottom locking tabs 3567, and that they are part of the shuttle 3565. In FIG. 18G, the receptacle assembly 2 is shown with the locking nut 3570 turned to the locked position, the shuttle 3565 pushed forward, and the locking tabs 3567 fully inserted into the shell and core 3564. FIG. 18H is an expanded cross section side view of the receptacle assembly 2. In this view it is more clearly shown the penetration of the tabs 3567 through the holes 3551 in the core and shell 3564. The holes 3551 have a tapered entrance 3571 into the cavity of the core and shell 3564 that causes the tabs 3567 to be pushed towards the centerline when the shuttle 3565 moves from right to left in this example. This example has the shuttle 3565, and hence the tabs 3567 shown in the release position. The tabs 3567 are substantially retracted from the cavity thus leaving the area in that cavity available for insertion of the mating plug's shell. For the purpose of describing the focus of this application, the non-applicable components of both the plug and receptacles will not be referenced further. Those components include the electrical components such as the pins and sockets, and the cords.

Figure 18I:
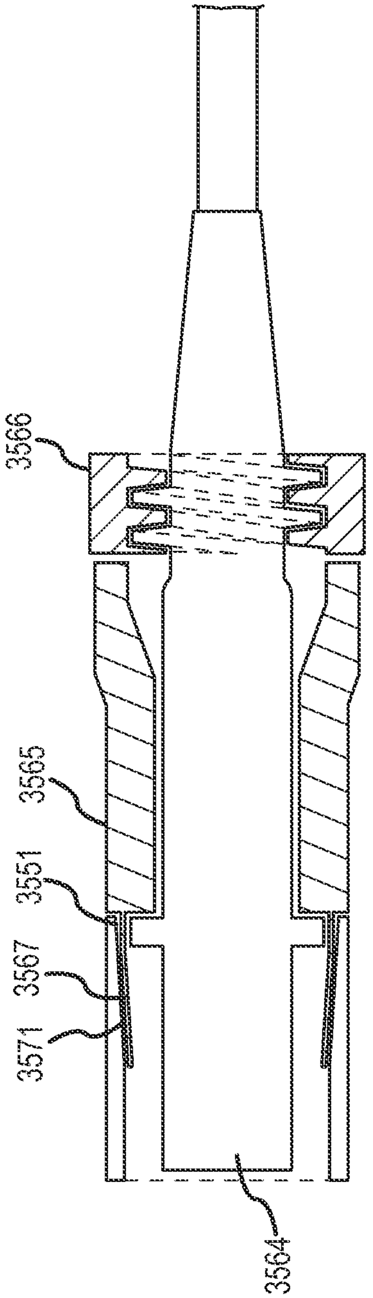
Figure 18J:
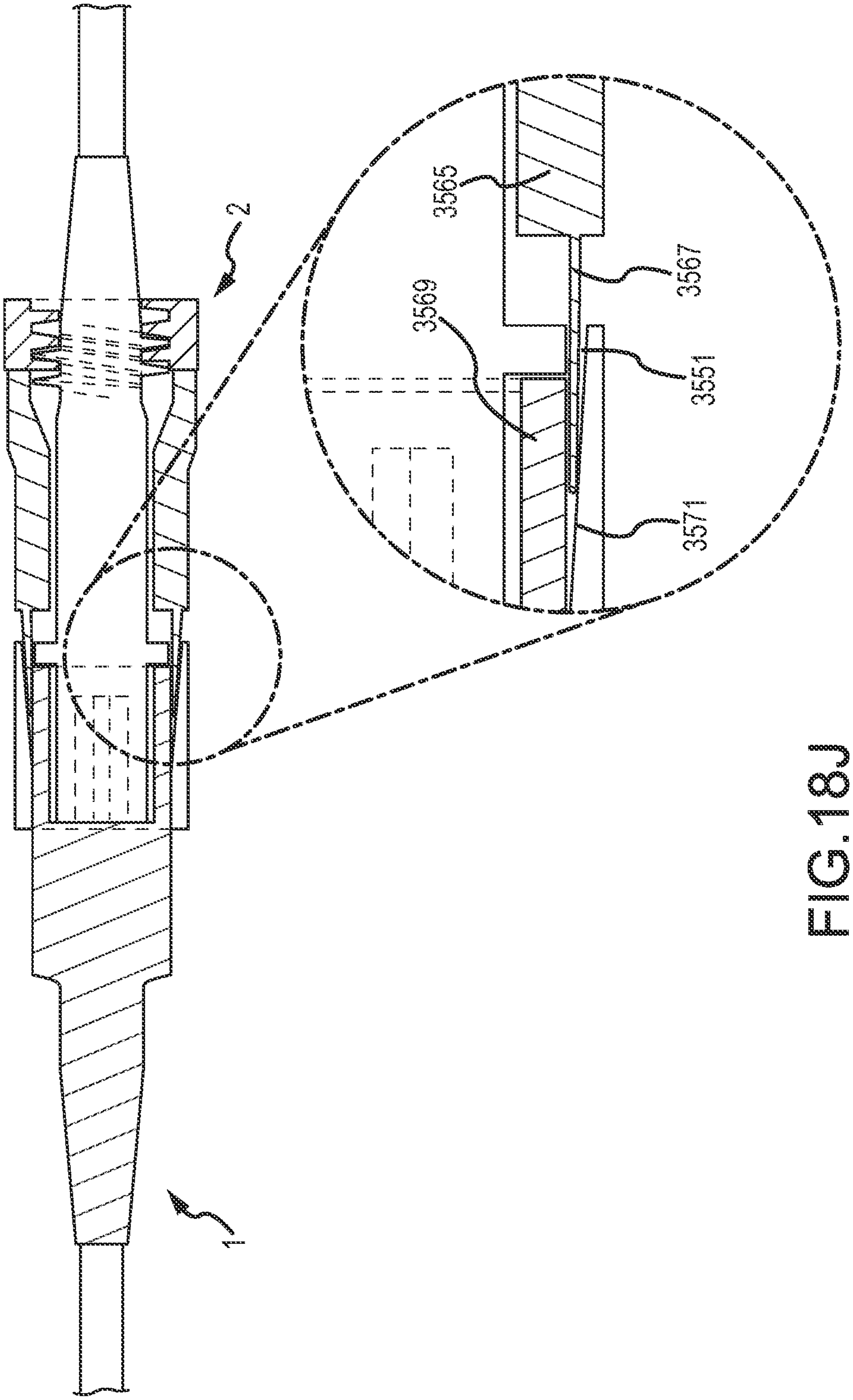

FIG. 18I shows the receptacle assembly of FIG. 18F with the locking nut 206 turned such that it applies axial force forward on the shuttle 3565, which in turn has pushed the tabs 3567 into the cavity of the core and shell 3564. It is important to note the relationship of the tabs 3567 and the tapered entrance 3571. The combination of the taper on the tabs 3567, and the tapered entrance 3571 have caused the tabs 3567 to bend inwards towards the centerline of the assembly. FIG. 18J represents the mating of an un-locked position receptacle 2 with a standard mating plug 1. A detailed blow up is shown in the lower right that more clearly shows the non-interference of the locking tabs 3551 with the mating plug barrier shell 3569. When the shuttle 3565 is retreated as shown, there is little or no contact between the tab 3551, the inner wall ramp of the core and shell 3571 and the outer surface of the mating plug's barrier shell 3569.

Figure 18K:
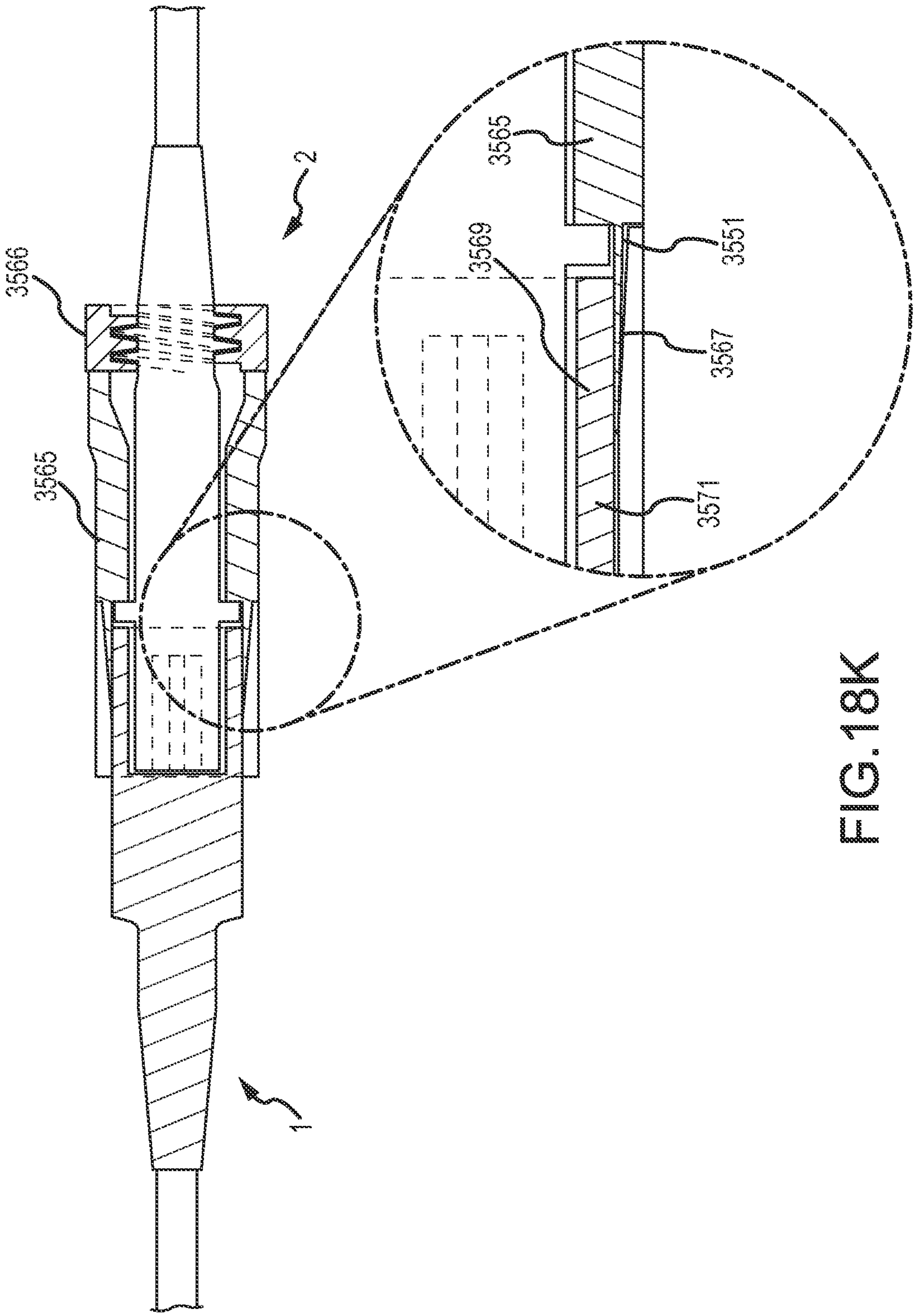

FIG. 18K shows the mated and locked condition of the plug 1 and receptacle 2 combination. The nut 3566 has been turned forcing the shuttle 3565 forward. The detailed blow up shown in the lower right more clearly shows the new relationship between the tabs 3567, and mating plug barrier shell 3569. When the shuttle 3565 is forced forward as shown, there is significant contact between the tab 3551, the inner wall ramp of the core and shell 3571 and the outer surface of the mating plug's barrier shell 3569. As the locking nut 3566 is further tightened, the radial forces between the tab 151, the inner wall ramp of the core and shell 3571 and the outer surface of the mating plug's barrier shell 3569 increase very rapidly due to the force amplification of the gradual taper of the tab 3567 and the inner wall ramp of the core and shell 3571. This same action is happening on the opposite side of the plug's barrier shell, and in the opposing direction on that side. These opposing forces help to maintain centering of the plug 1 in the receptacle 2.

Figure 18L:
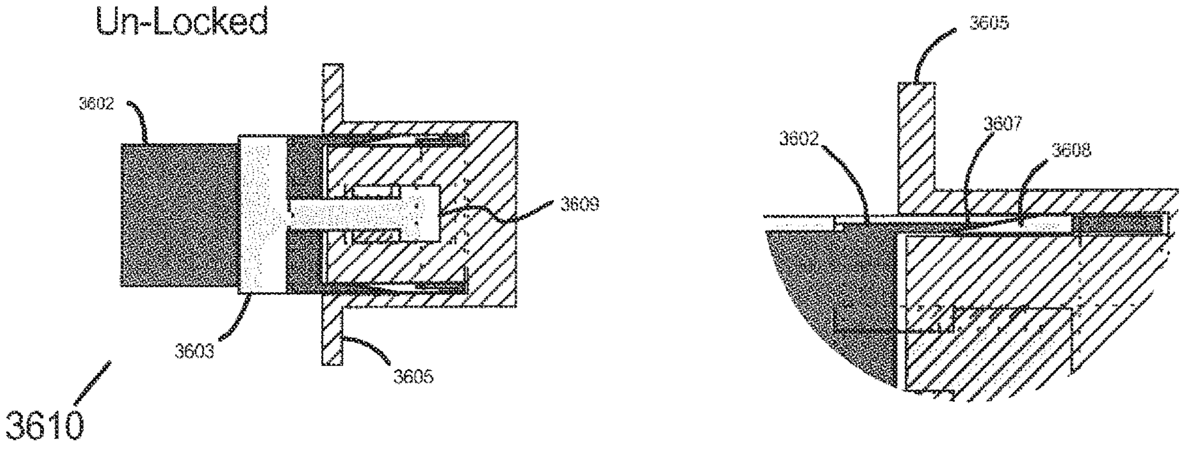
Figure 18L:
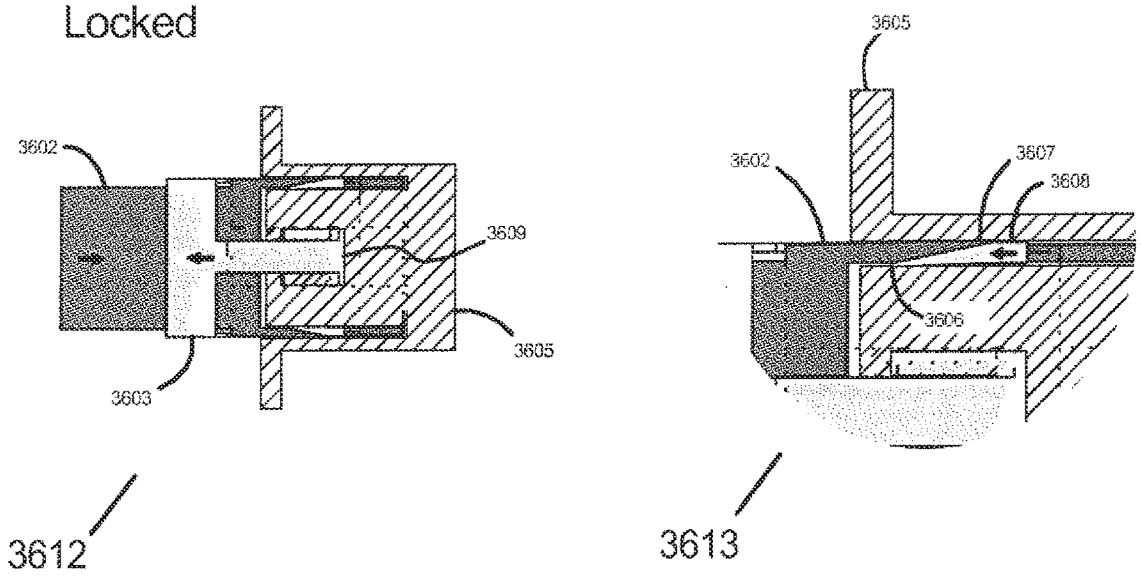
Figure 13M:
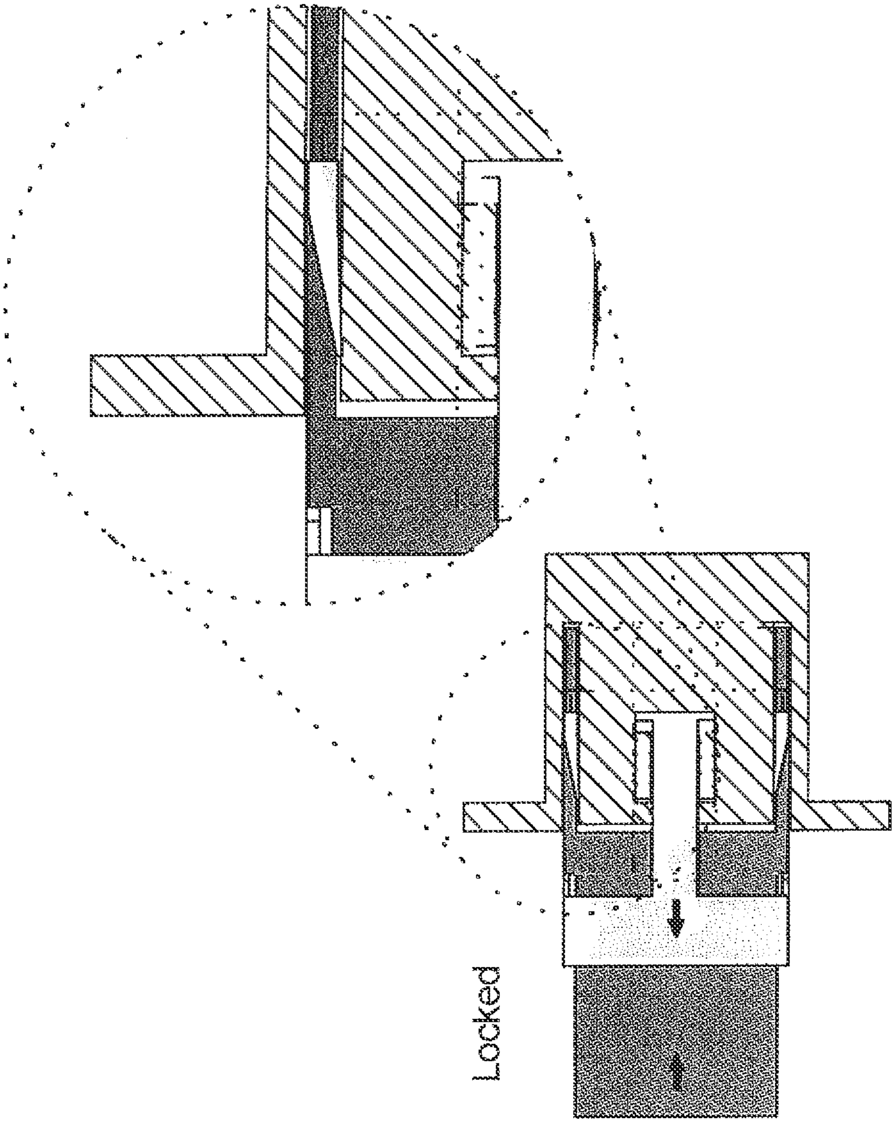
Figure 18N:
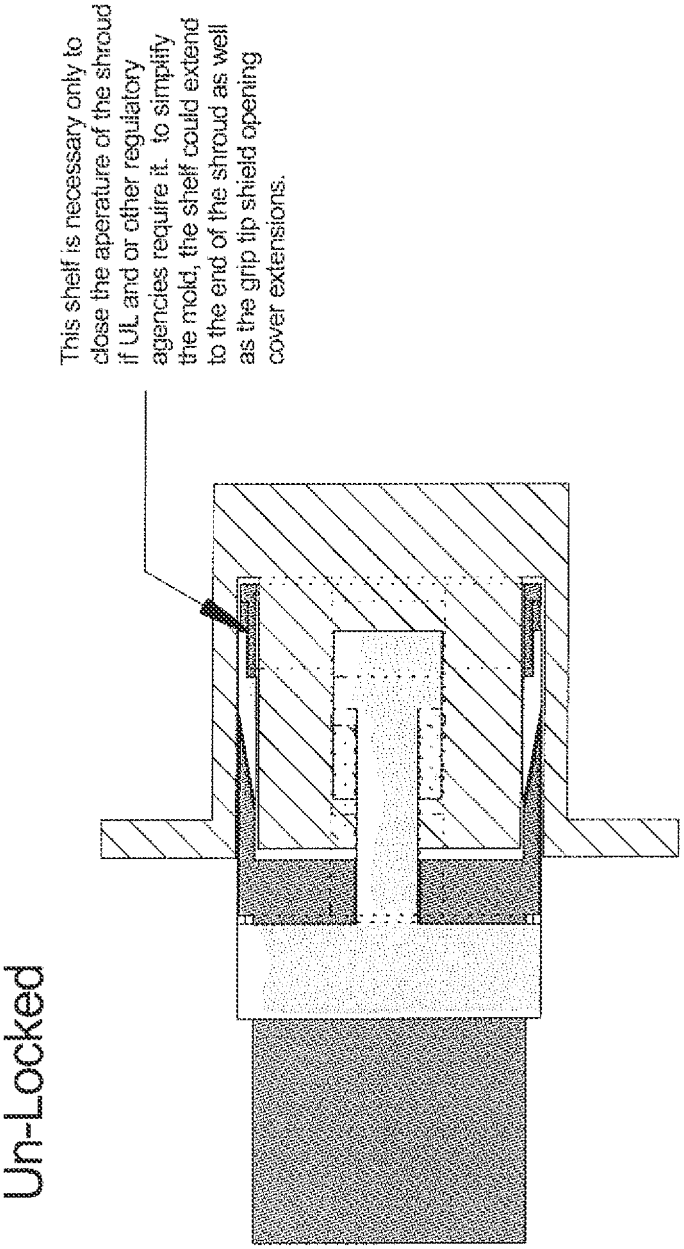
Figure 18O:
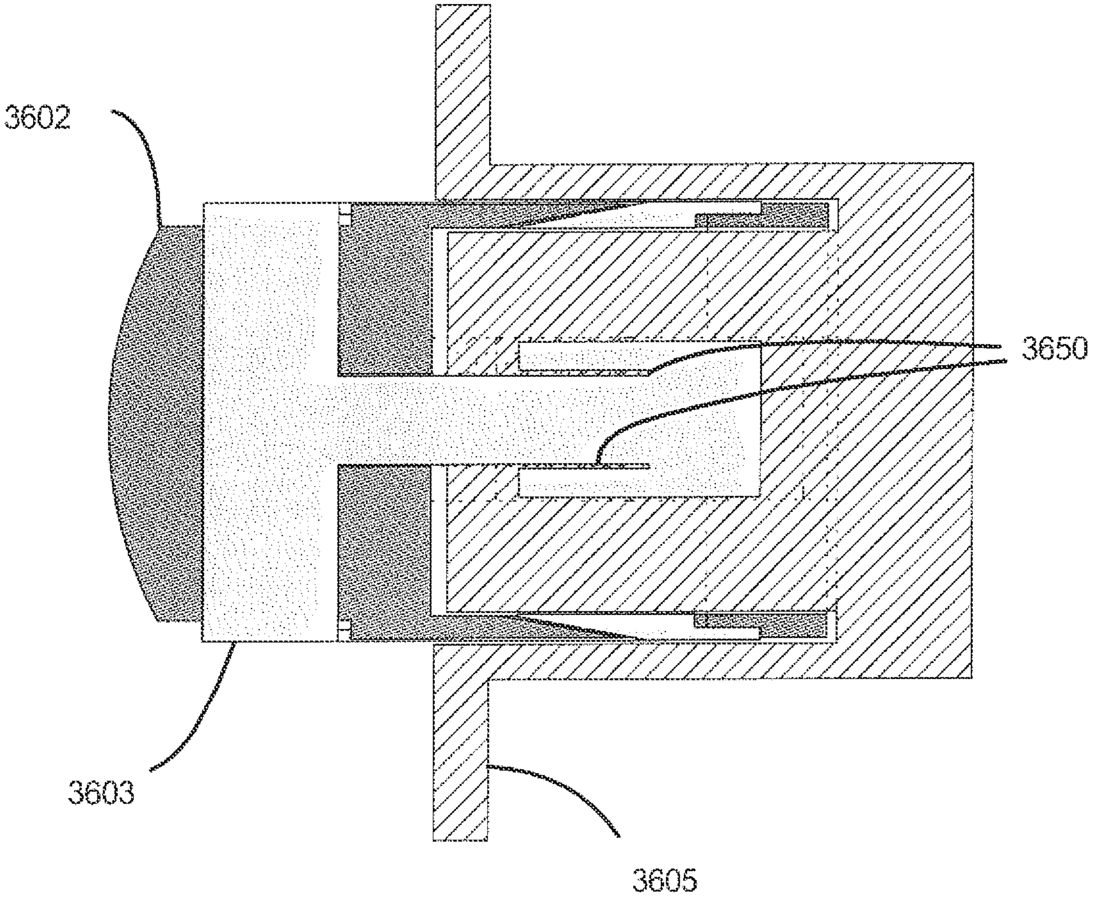
Figure 18P:
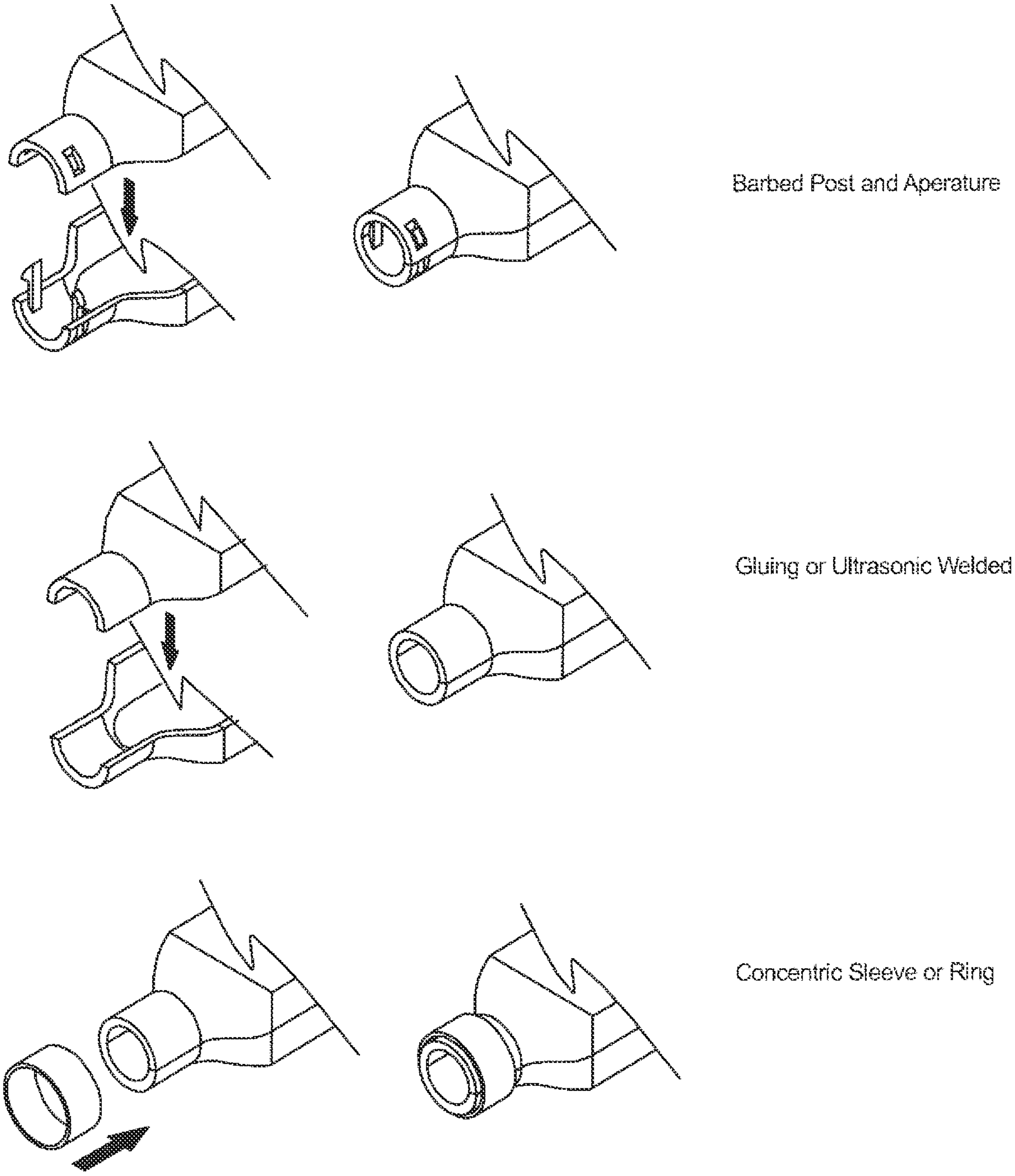
Figure 18Q:
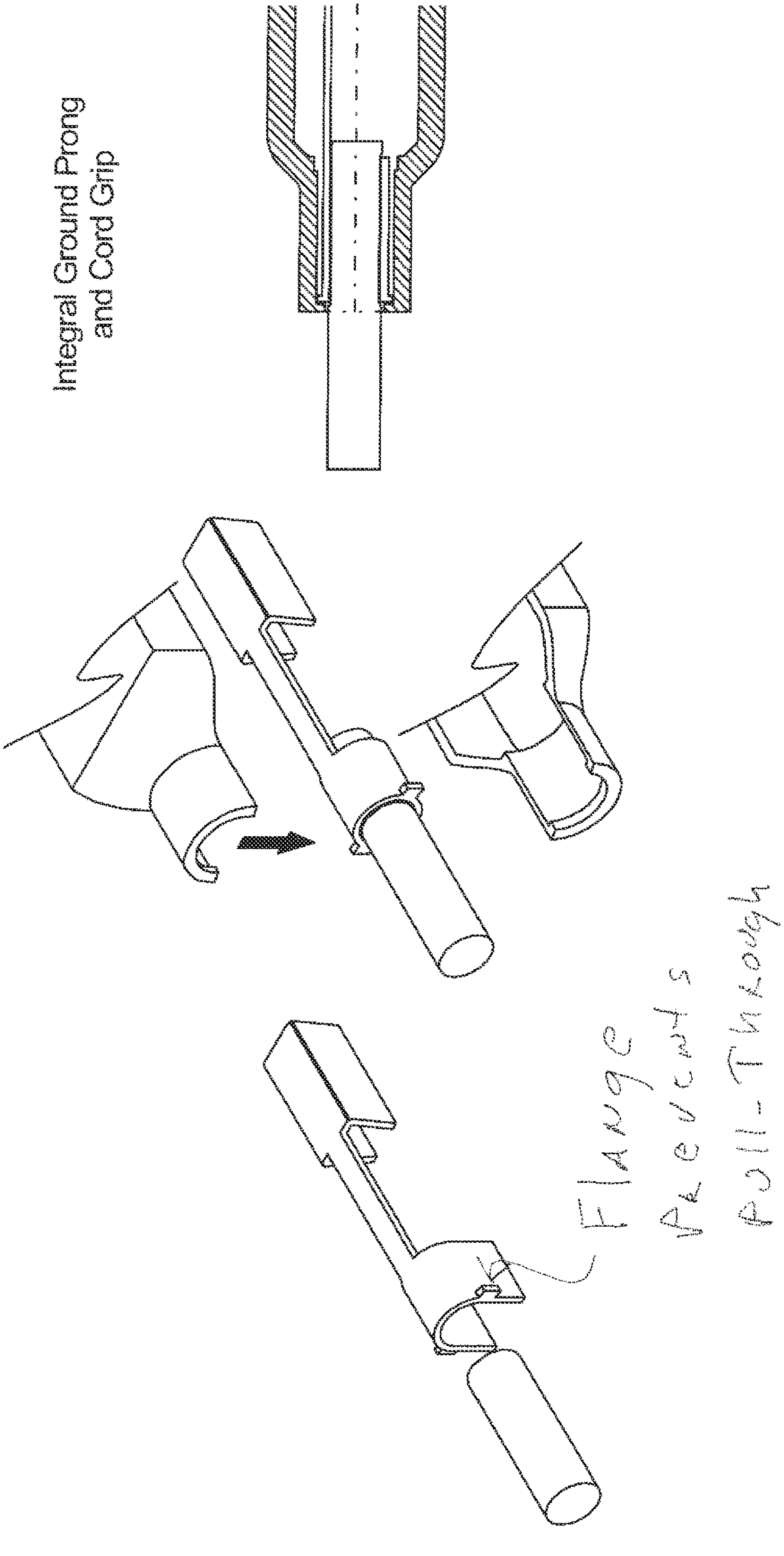
Figure 18R:
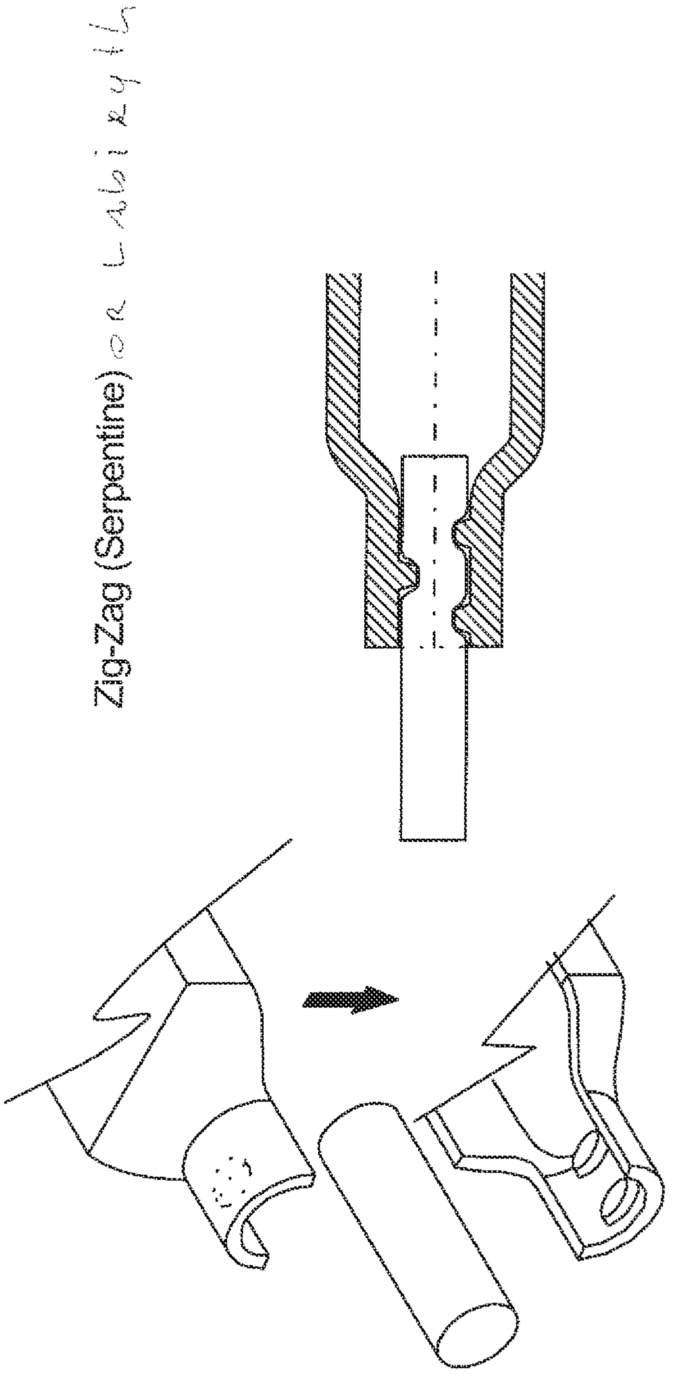
Figure 18S:
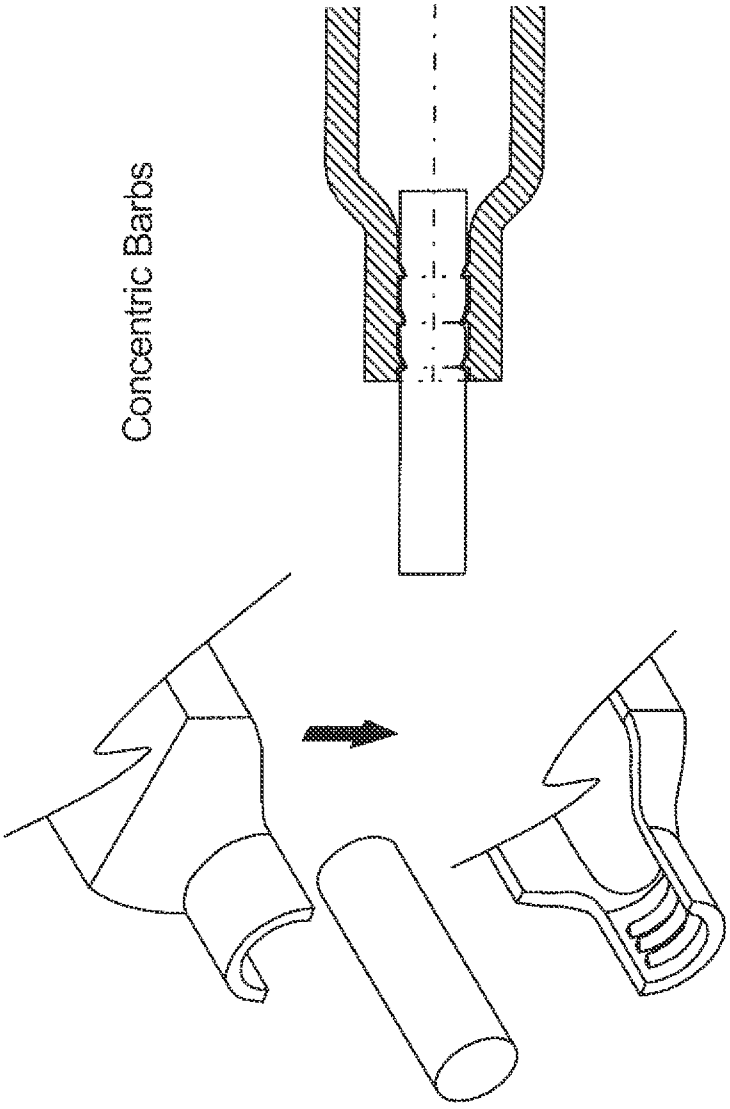
Figure 18T:
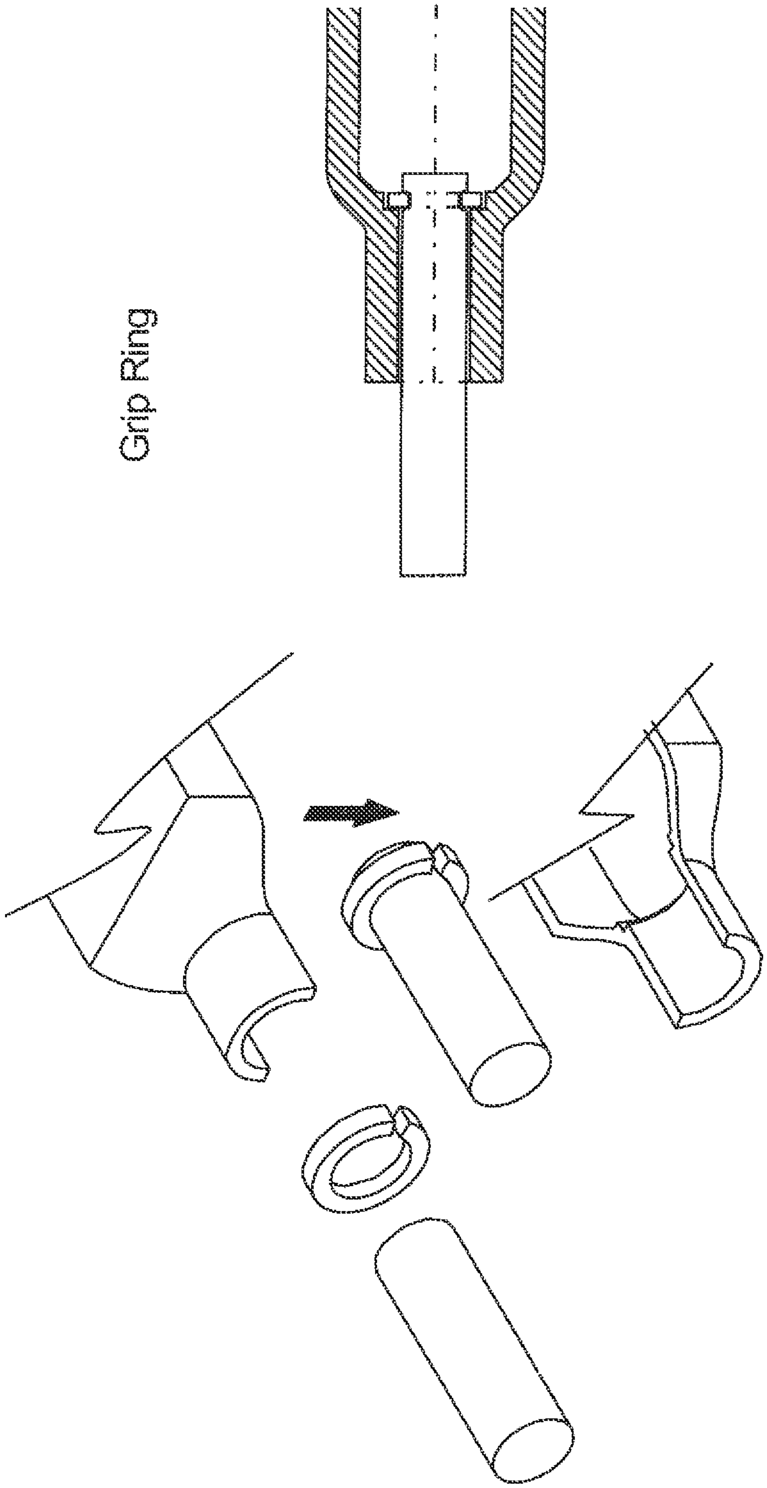
Figure 18U:
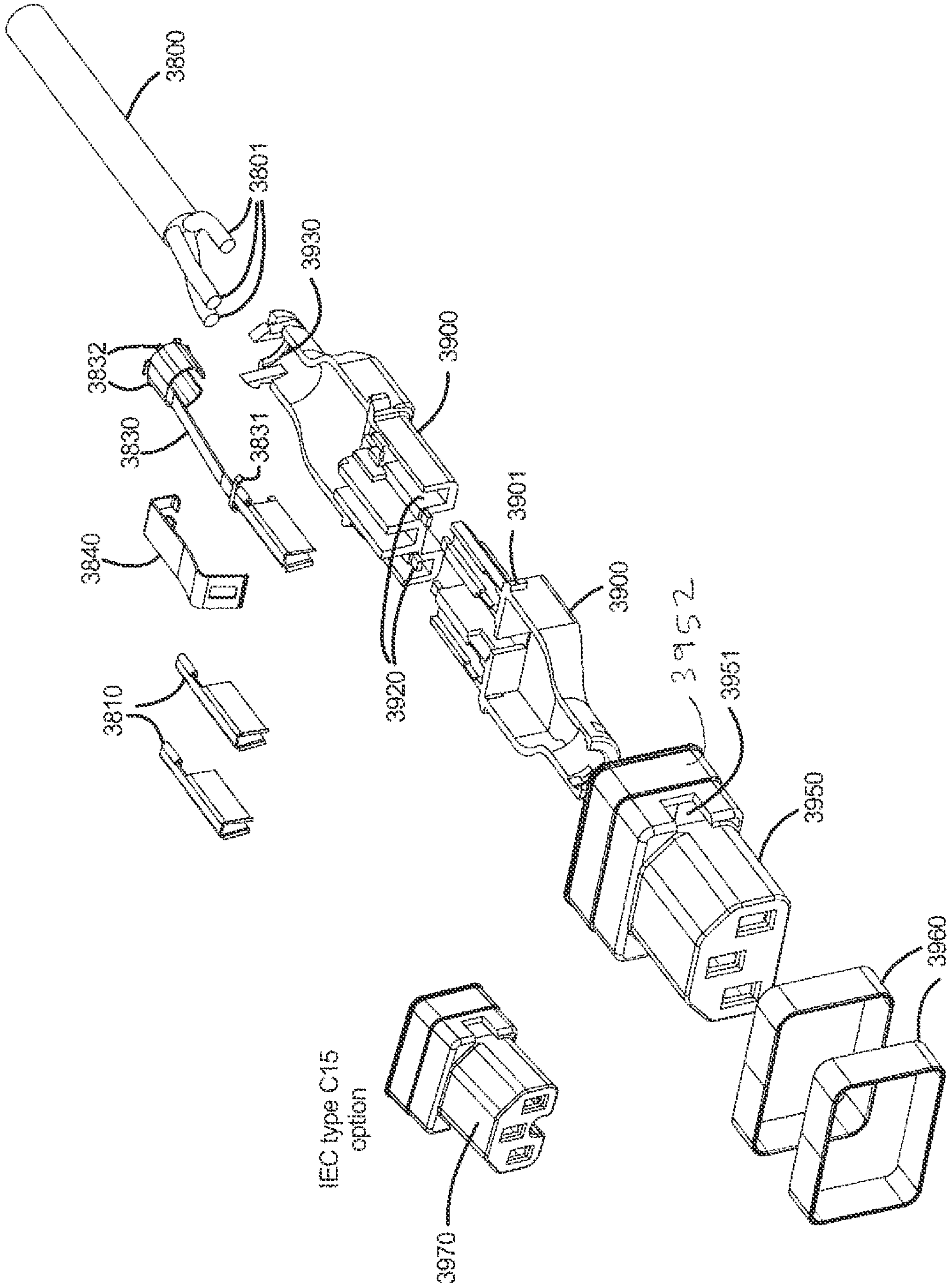
Figure 18V:
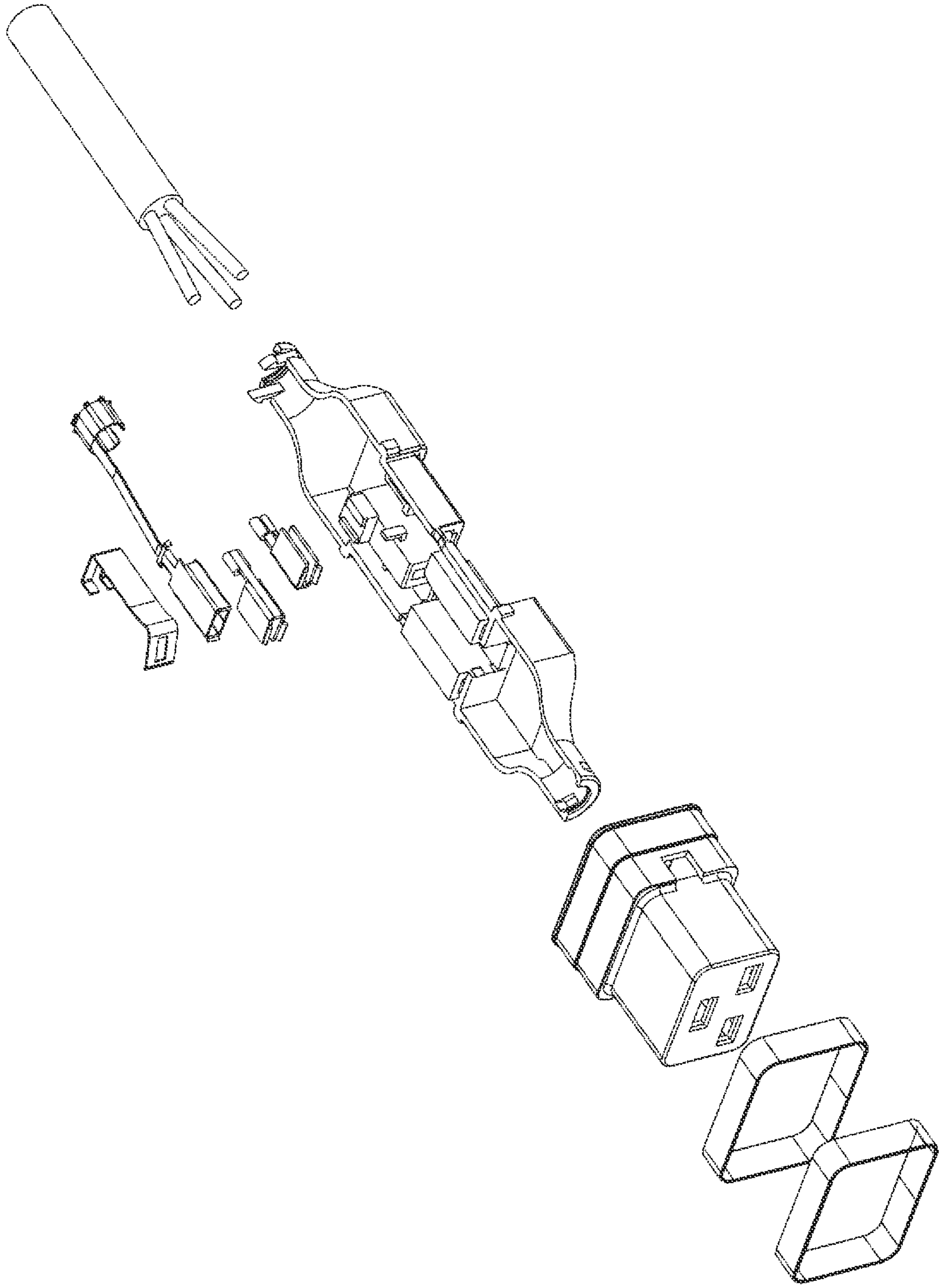
Figure 18W:
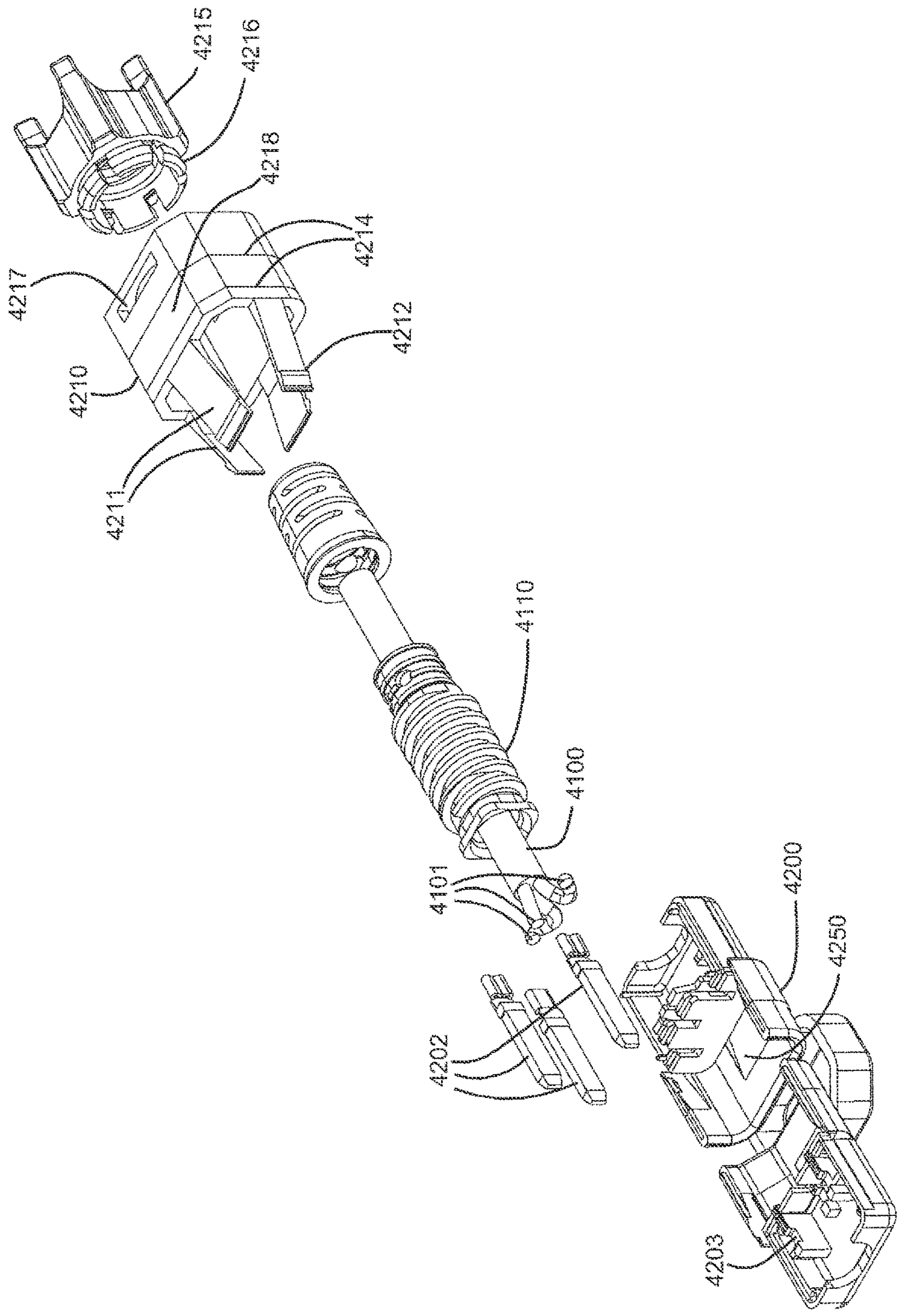
Figure 18X:
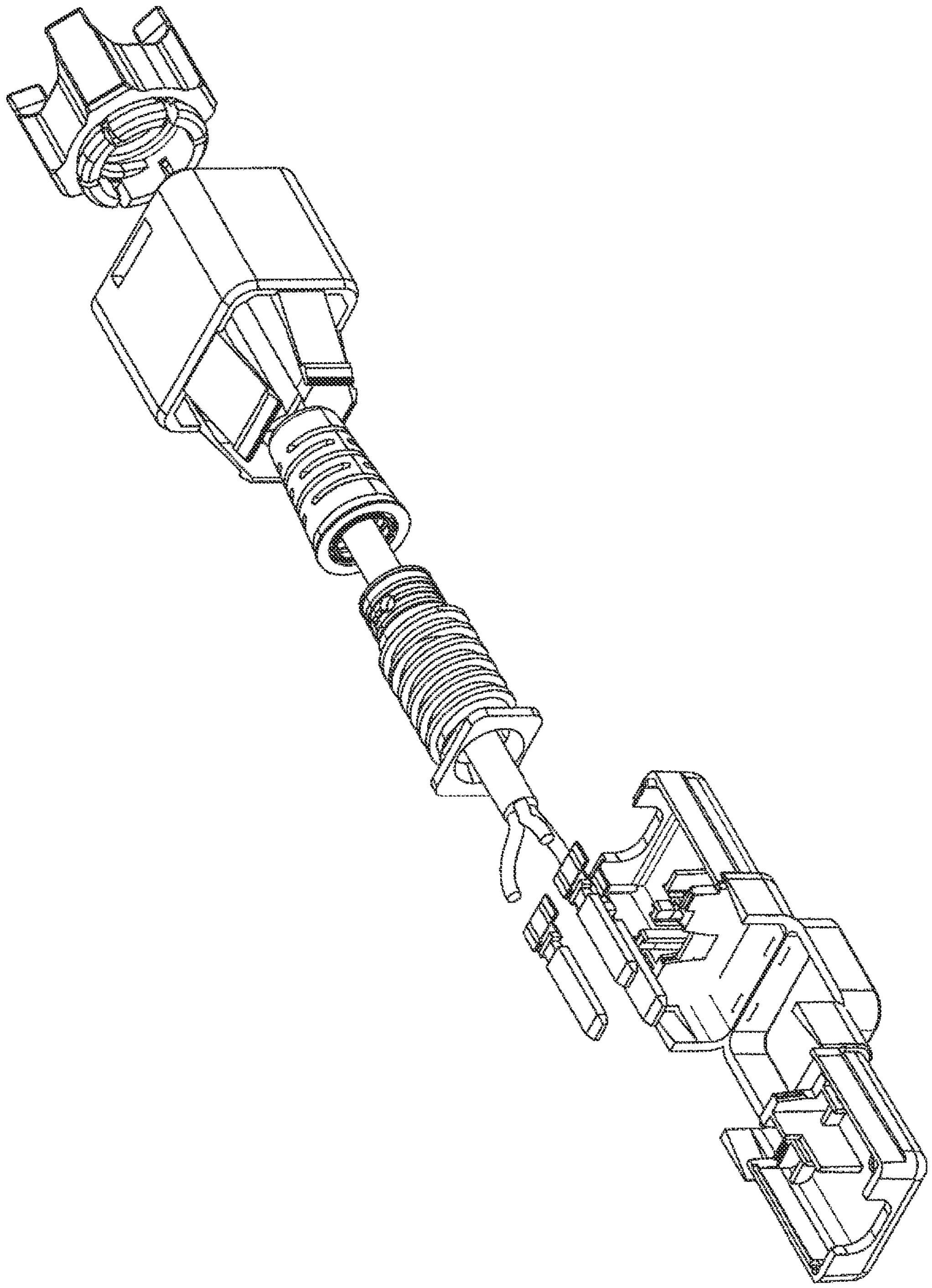
Figure 18Y:
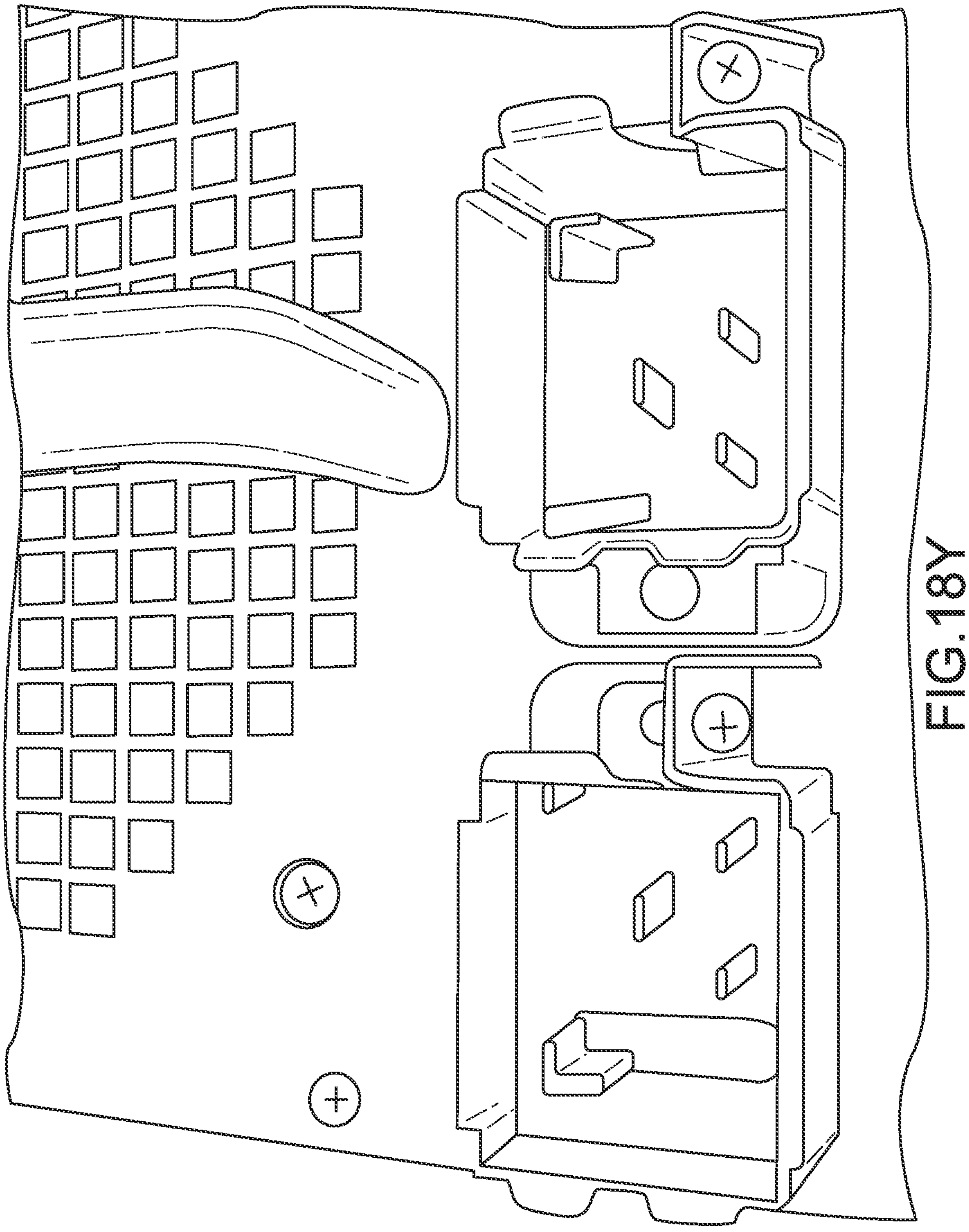
Figure 18Z:
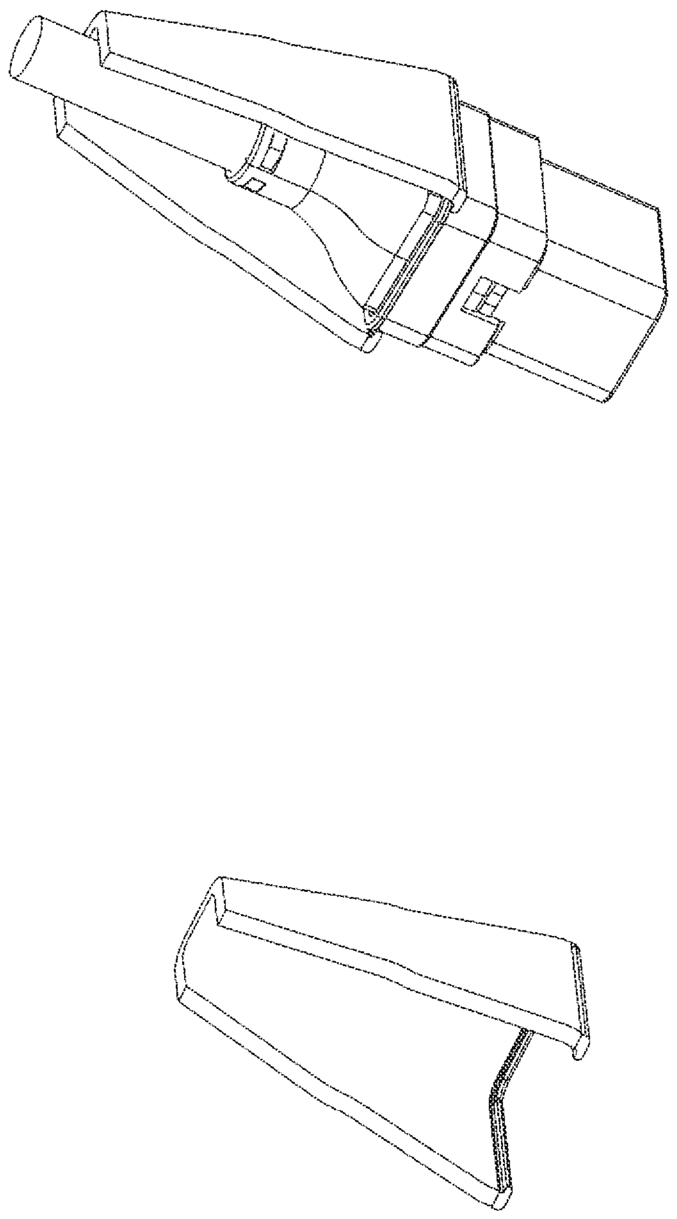
Figure 18A:
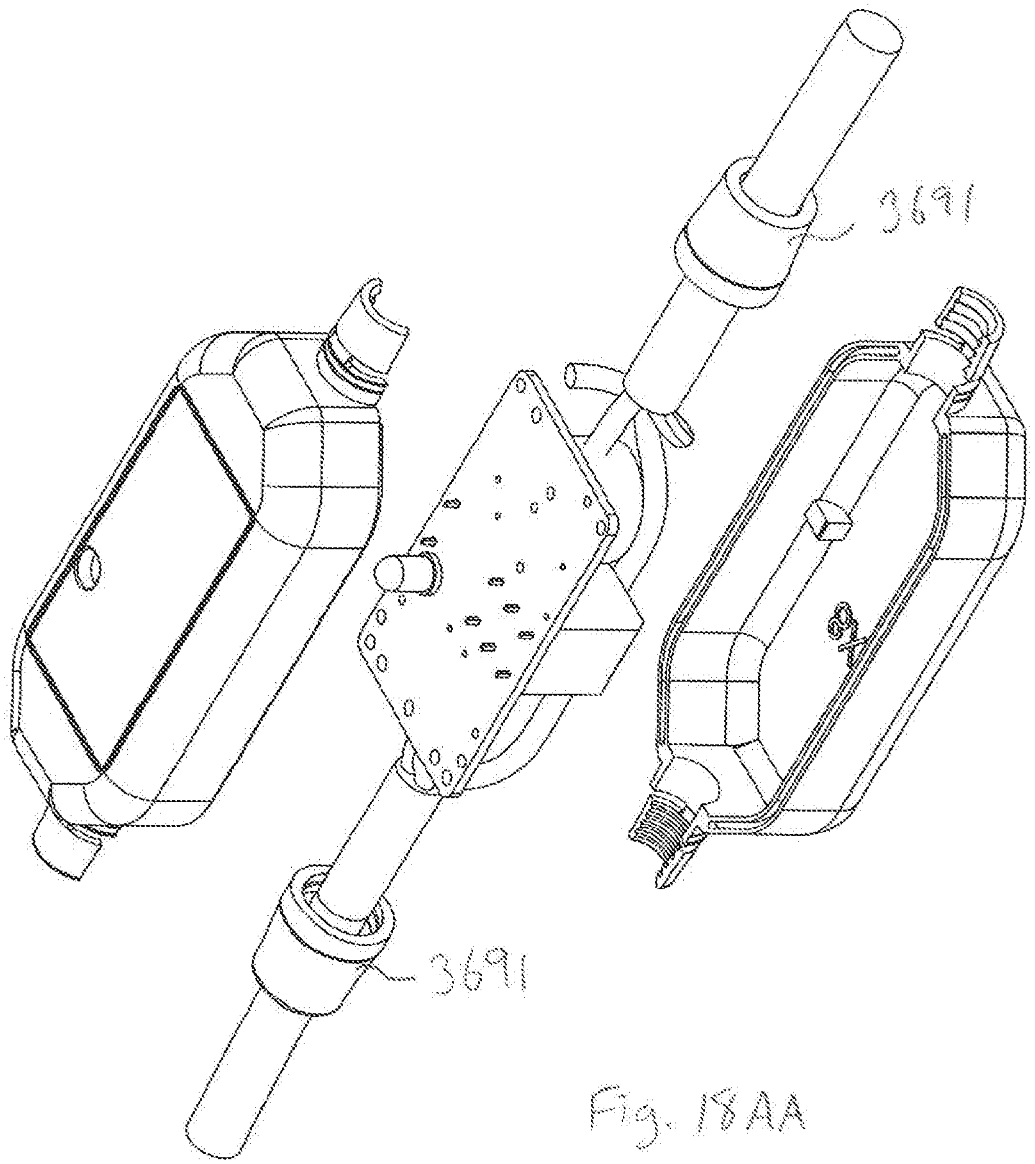
Figure 18B:
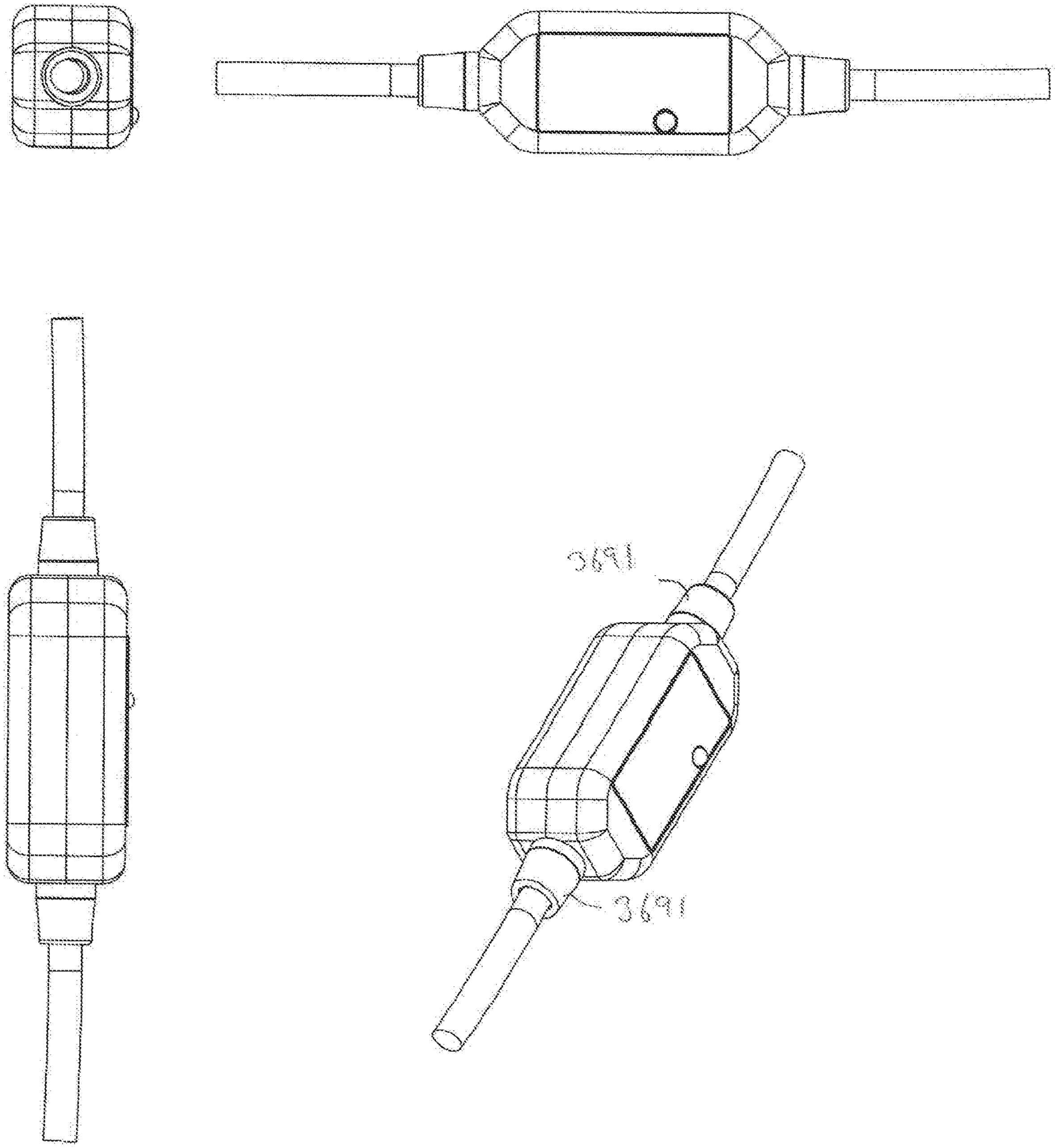
Figure 18C:
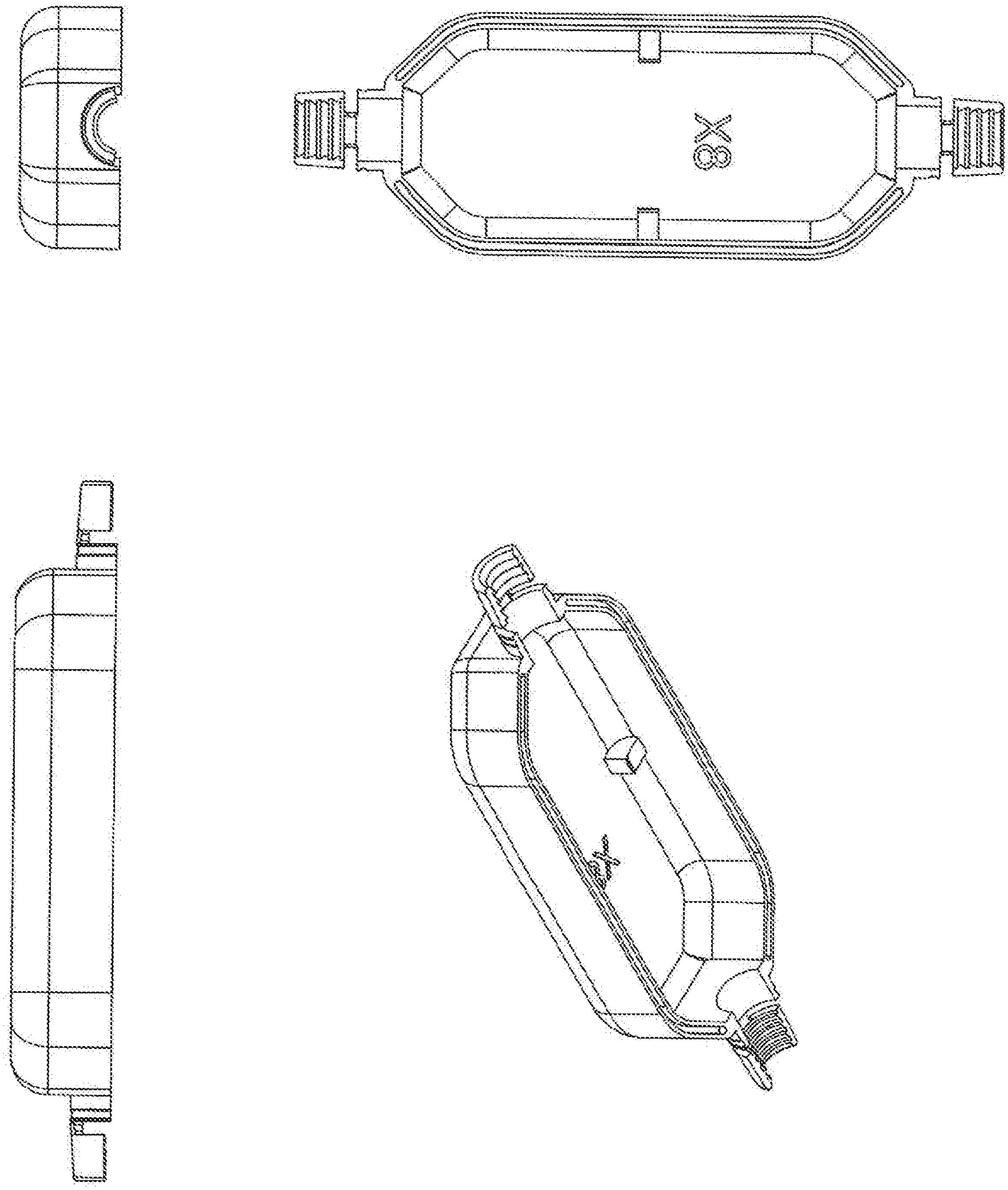
Figure 18D:
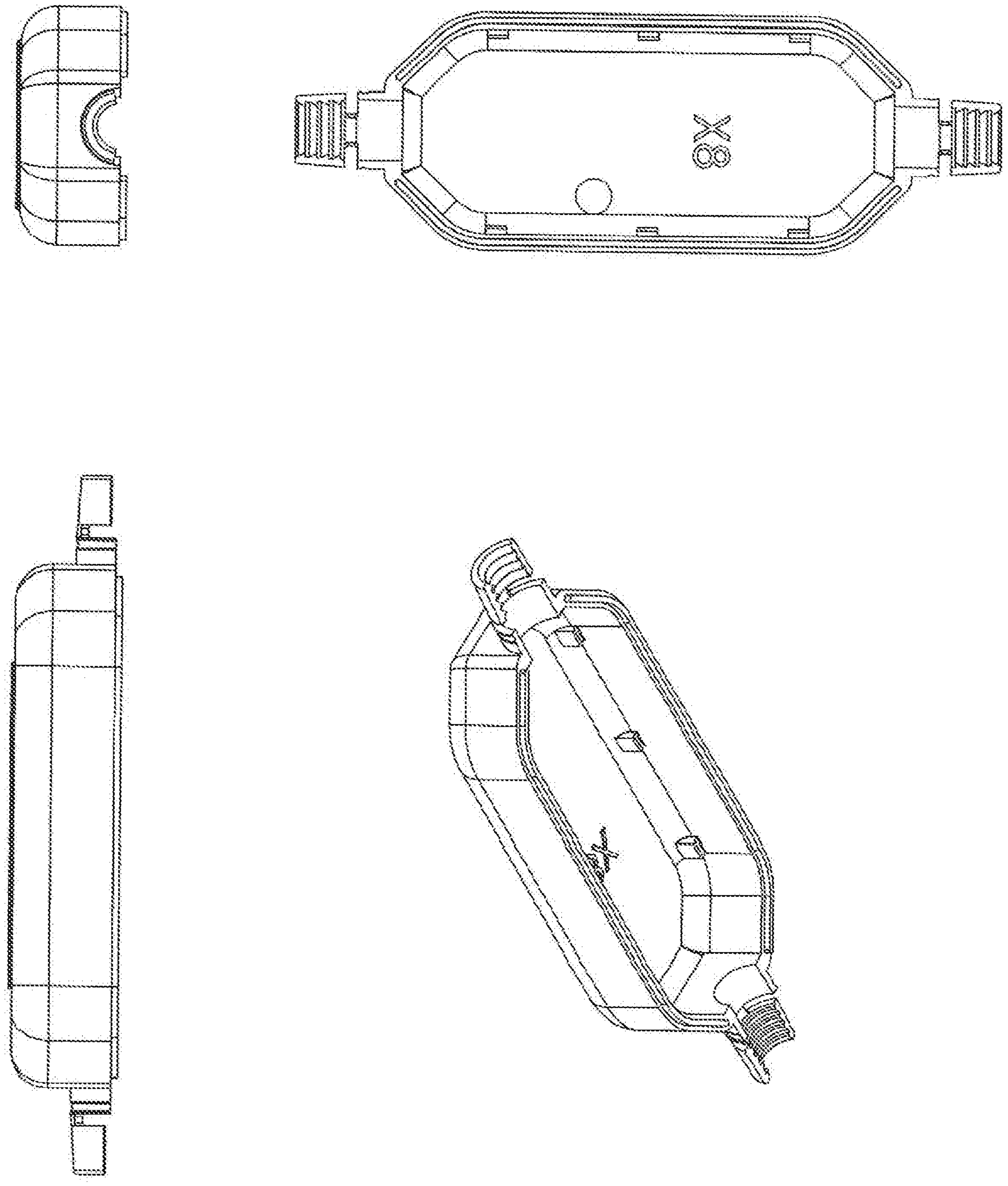
Figure 18E:
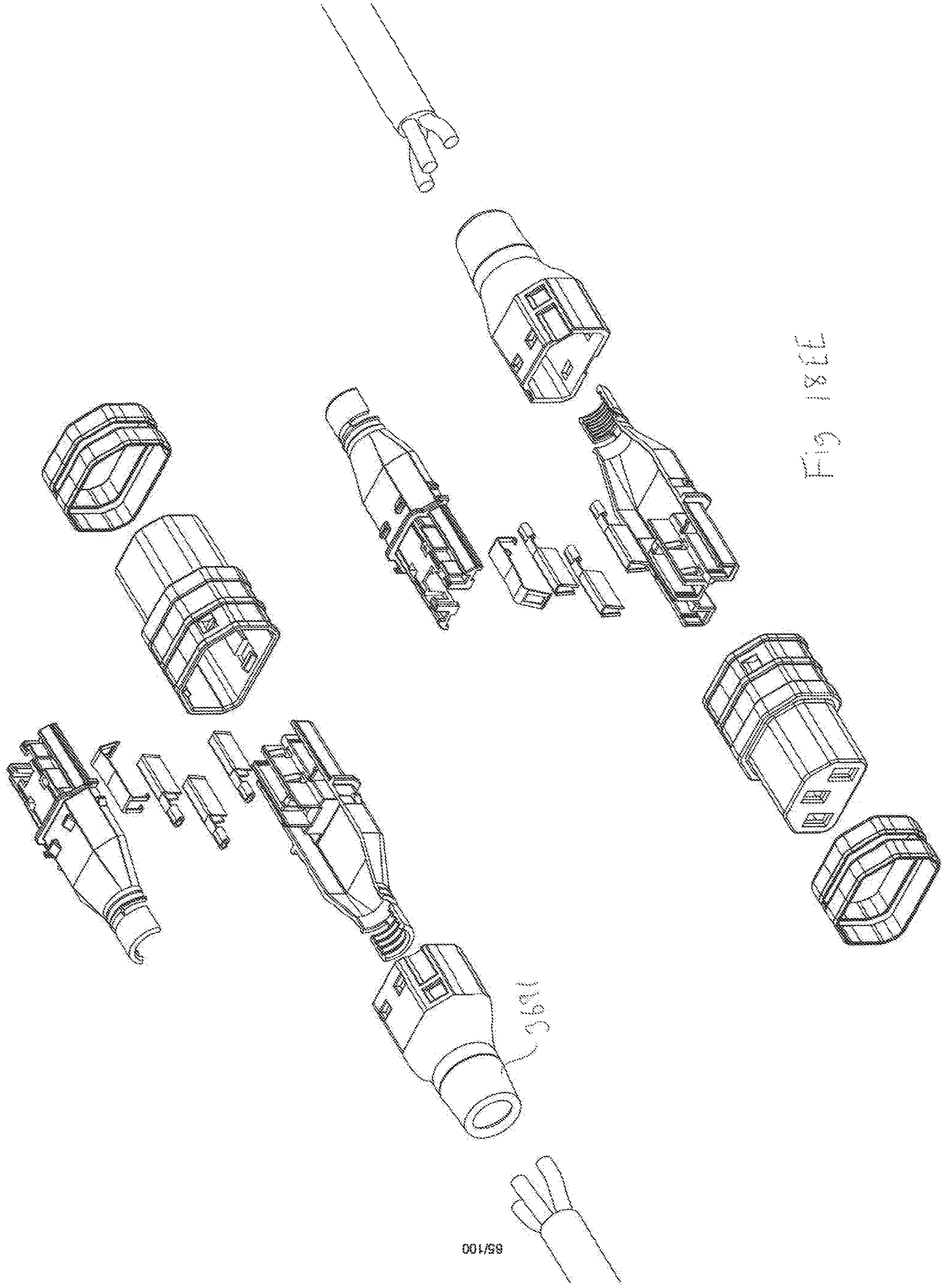
Figure 18F:
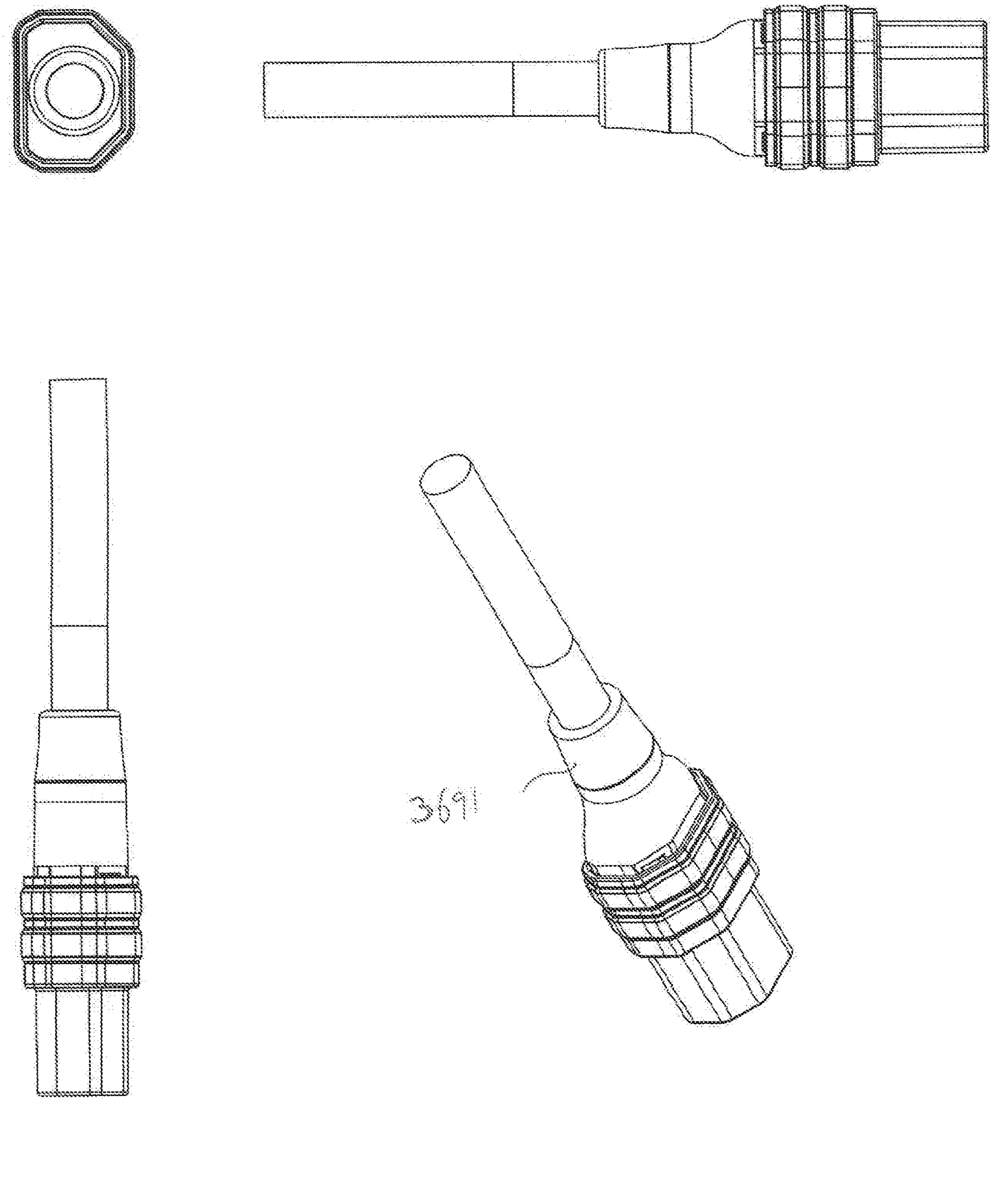
Figure 18H:
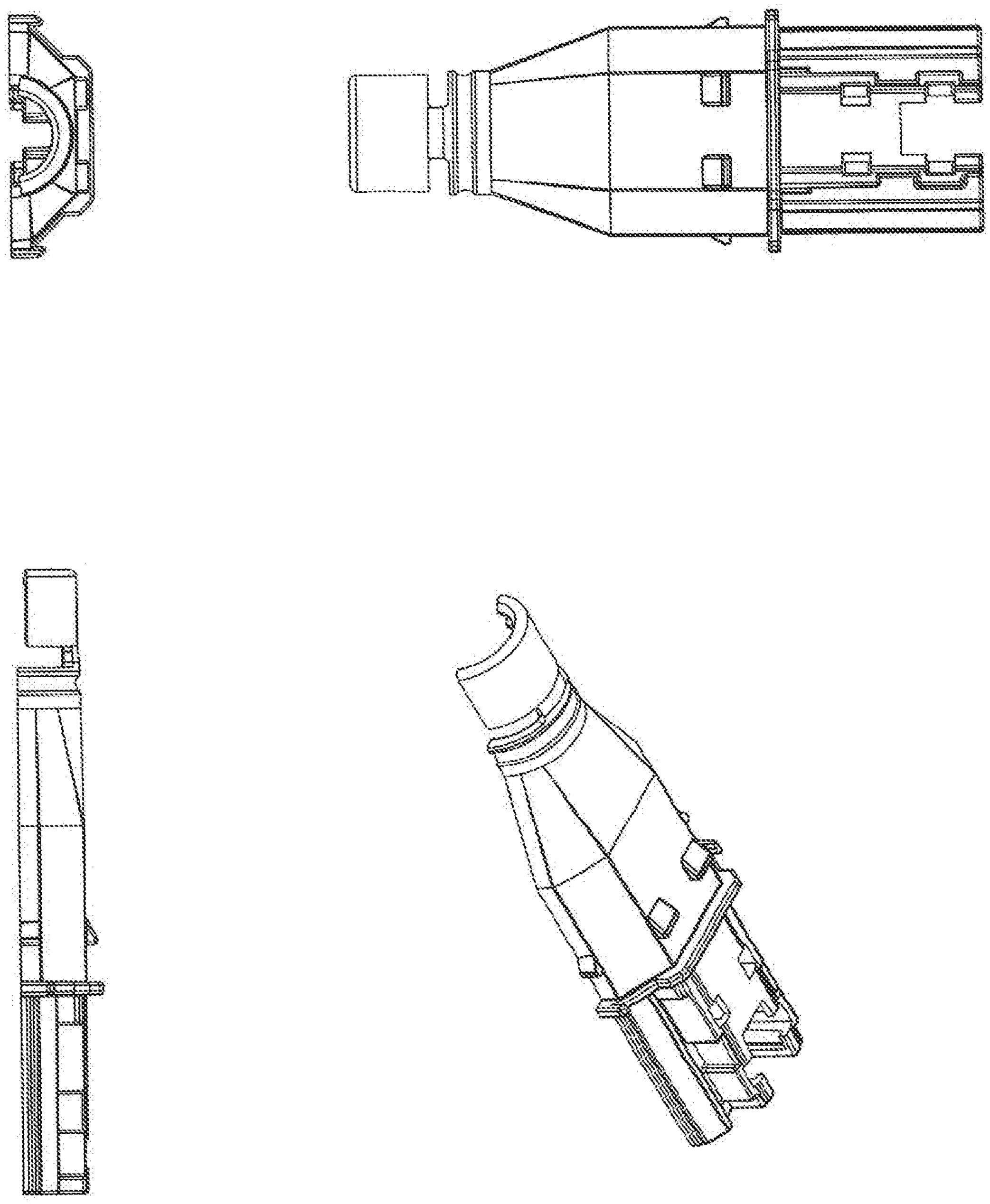
Figure 18:
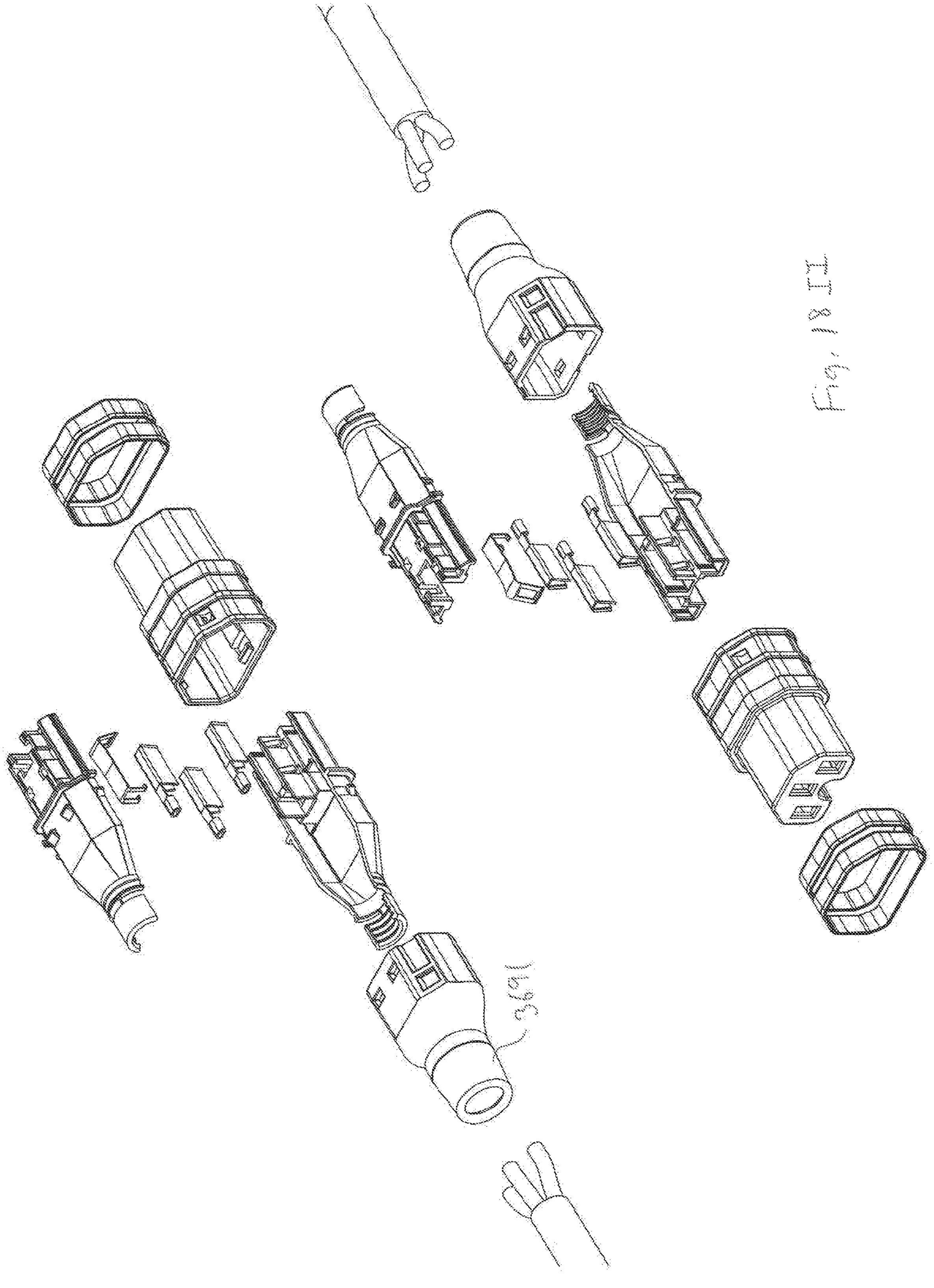
Figure 18J:
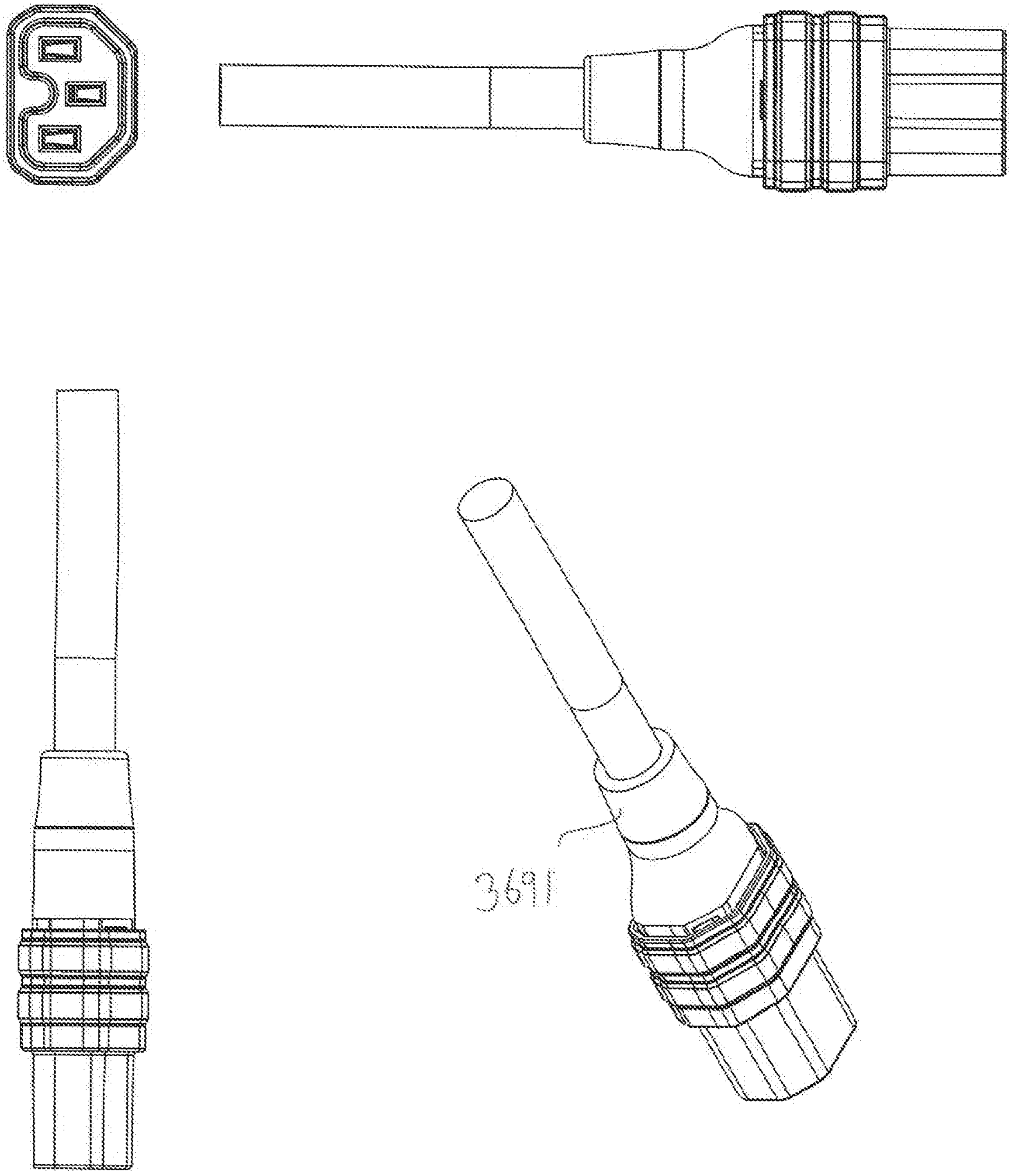
Figure 18K:
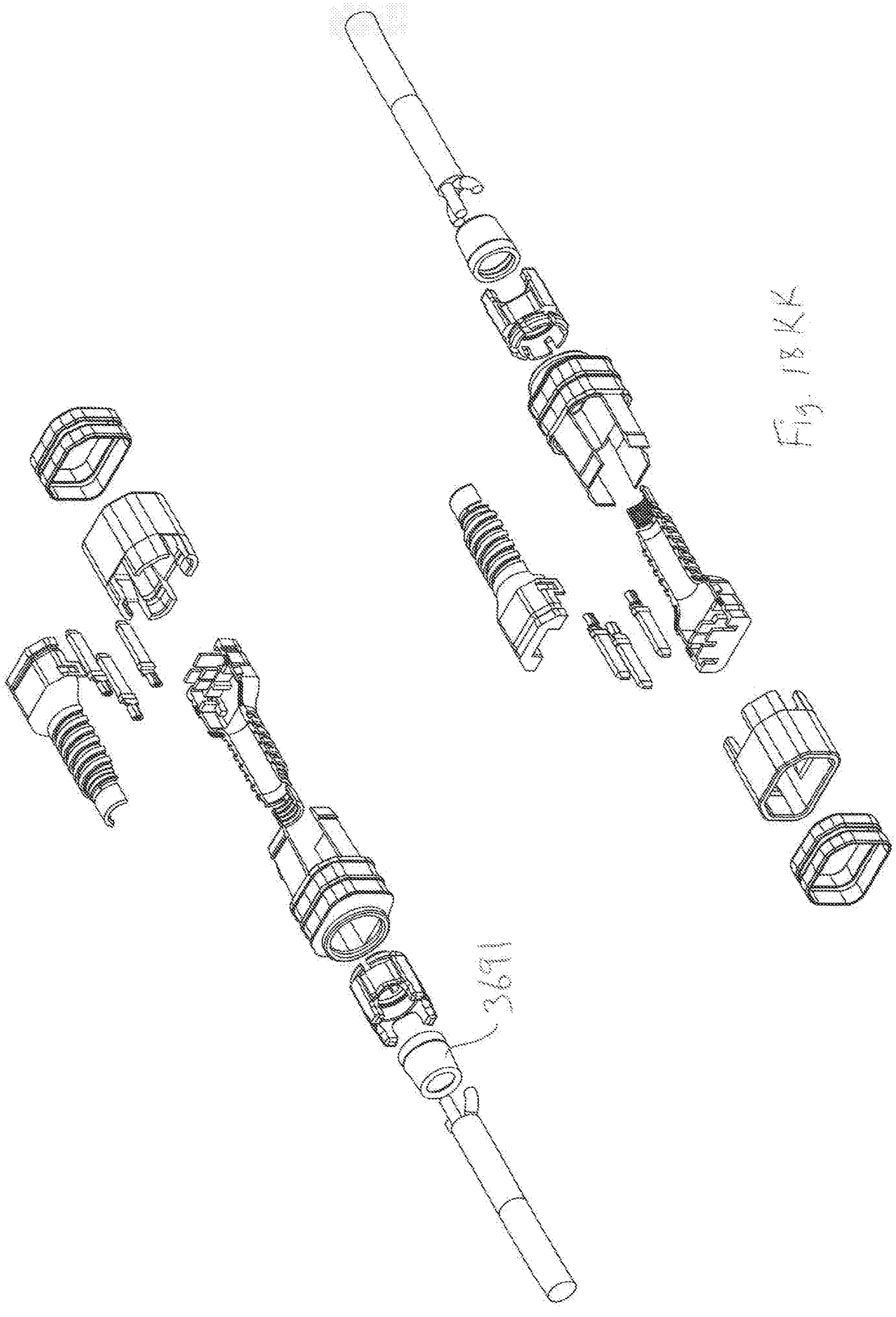
Figure 18L:
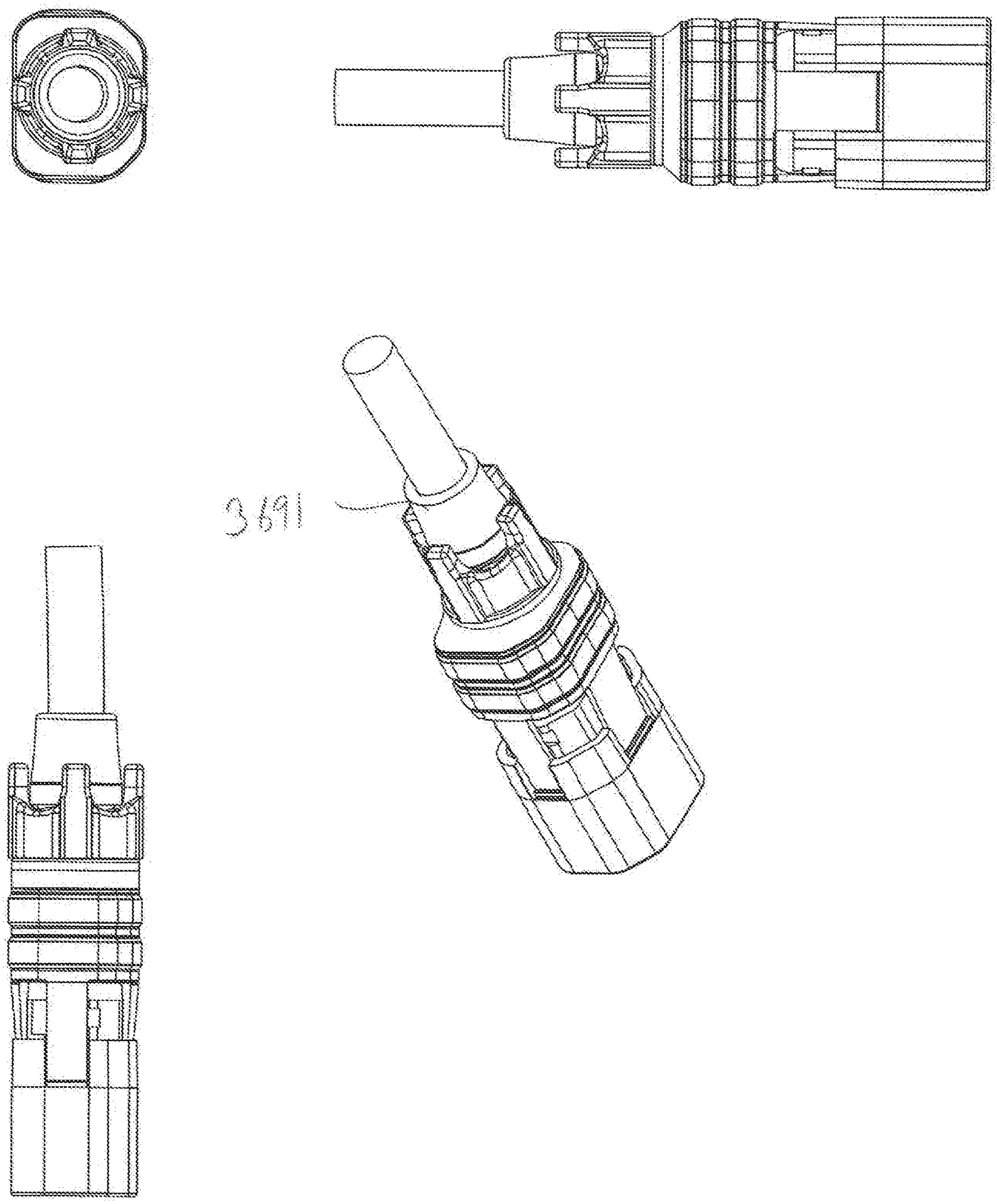

FIGS. 18-K2, 18-K2*b*, and 18-K3 show several other instantiations of the invention, incorporating a different ergonomic method to actuate and release the locking function. These variations are well suited to plugs with dielectric insulating shells or barriers, such as the IEC C14, C20 and other models.

The first design, shown on FIG. 18K2 does not use a nut to move the shuttle 3580, instead the user pushes and pulls the shuttle to lock and release the plug to receptacle connection. The shuttle tab geometry can be modified to allow this to work as desired. The detail of the engagement method between the modified dielectric shell 3581 and the modified shuttle tab geometry is shown in section C-C. This section shows the plug and receptacle in the locked position in FIG. 18-K2 and in the unlocked position in FIG. 18-K2. The user first pushes the plug via the shuttle, seating it in the receptacle and then continues to push the shuttle, and then will feel the shuttle retention feature 3582 seating into the matching feature on the dielectric shell. This is useful to indicate that the connection is now in the locked state. Conversely, when the connection is unlocked, the user will pull the shuttle and then feel the shuttle retention feature unseating from the matching feature on the dielectric shell as it is removed. The user can then remove the plug from the receptacle. The section E-E shows an additional detail 3583. This feature shows how a single piece dielectric shell could be attached to a rear section integrating a contact carrier that can then have an access mechanism for insertion of the contacts during construction. This method is useful to present the user with a cord that has few or no visible joining lines and therefore present the impression of solidity and reliability.

The locking tab(s) (FIG. 18K2) 3580 of the shuttle described above have been modified as shown in cross-section "C-C" of FIG. 18K2. The tabs 3584 of the shuttle 3580 now incorporate a profile 3582, which in combination with the paired feature of the modified outer barrier shell 3581, tends to increase the frictional force maintaining the connection between the plug and receptacle when more force is applied to separate them. This is because a force tending to separate the plug and receptacle will act to move the outer barrier shell rather than the shuttle tab prongs. This tends to make the locking connection more secure as more force is applied to pull it apart. The ergonomic push/pull release is a valuable feature in some applications. The ability of the locking mechanism to become more secure when a separating force is applied to the locked plug and receptacle can also be a desirable characteristic in some applications. It can optionally include provisions for programmable release as discussed earlier in this and other incorporated filings.

FIG. 18K3 show another instantiation of the invention, incorporating a different ergonomic method to actuate and release the locking function. This design, shown on FIG. 18K3 does not use a nut to move the shuttle 3590, instead the user pushes and pulls the dielectric shell 3591 via a rear extension to lock and release the plug to receptacle connection. The shuttle in this case is not the user interface. The shuttle tab geometry can be modified to allow this to work as desired. The detail of the engagement method between the modified dielectric shell 3590 and the modified shuttle tab geometry 3592 is shown. The matching engagement features are on the shuttle 3592 and the dielectric shell 3594. The user first pushes the rear extension of the dielectric shell, inserting it and will feel the retention feature seating into the matching feature on the shuttle. This is useful to indicate that the connection is now in the locked state. Conversely, when the connection is unlocked, the user will pull the rear extension of the dielectric shell and then feel the retention feature unseating from the matching feature on the shuttle as it is removed. The user can then remove the plug from the receptacle. In other respects, this instantiation functions in a manner similar to that described in FIG. 18-K2.

FIGS. 18L-X show another instantiation of the invention, incorporating an alternate tab geometry that incorporates a locking function with different characteristics. This example is of a traditional IEC-14 or IEC-20 type plug but could be other types utilizing an outer pin dielectric barrier (FIG. 18K) 3569. In FIG. 18L the outer pin barrier is generally concentric around the pins and will be the object of the gripping by the mating receptacle when applied.

The locking tab(s) (FIG. 18K) 3567 of the shuttle described above have been modified as shown in FIGS. 18L-O. The tabs 3609 of the shuttle 3603 now incorporate a ramped profile 3608, which in combination with the mirror ramps feature 3607 of the modified outer barrier shell 3602, tends to increase the frictional force maintaining the connection between the plug and receptacle when more force is applied to separate them. This tends to make the locking connection more secure as more force is applied to pull it apart. This can be a desirable characteristic for some applications. It can optionally include provisions for programmable release as discussed earlier in this and other incorporated filings.

To make this new tip design function properly, the locking nut (FIG. 18K) 3566 is modified so that the insertion and locking sequence of operations goes as follows. 1) The user turns the nut so that the tips are near or at maximum insertion depth. 2) The user inserts the cord cap into the matching receptacle. 3) The user turns the nut, which withdraws the prong tips, which then progressively frictionally lock via the action of the mirror ramps, securing the connection. Some notes about the implementation are as follows. 1) To make the user interface easy to use, the threads on the nut 3566 can be reversed so that the user turns the nut clockwise to secure the connection, and counter-clockwise to release it, although the tabs are withdrawn by turning the nut clockwise and inserted by turning it counter-clockwise. 2) The threading on the nut can optionally be made of a much coarser pitch requiring fewer turns in either direction to lock or unlock the plug to receptacle connection. This is desirable because it is quicker and simpler for the user to operate. In one preferred instantiation the nut would not need to turn more than one ¾ turn to secure and release the connection.

Figure 18M:
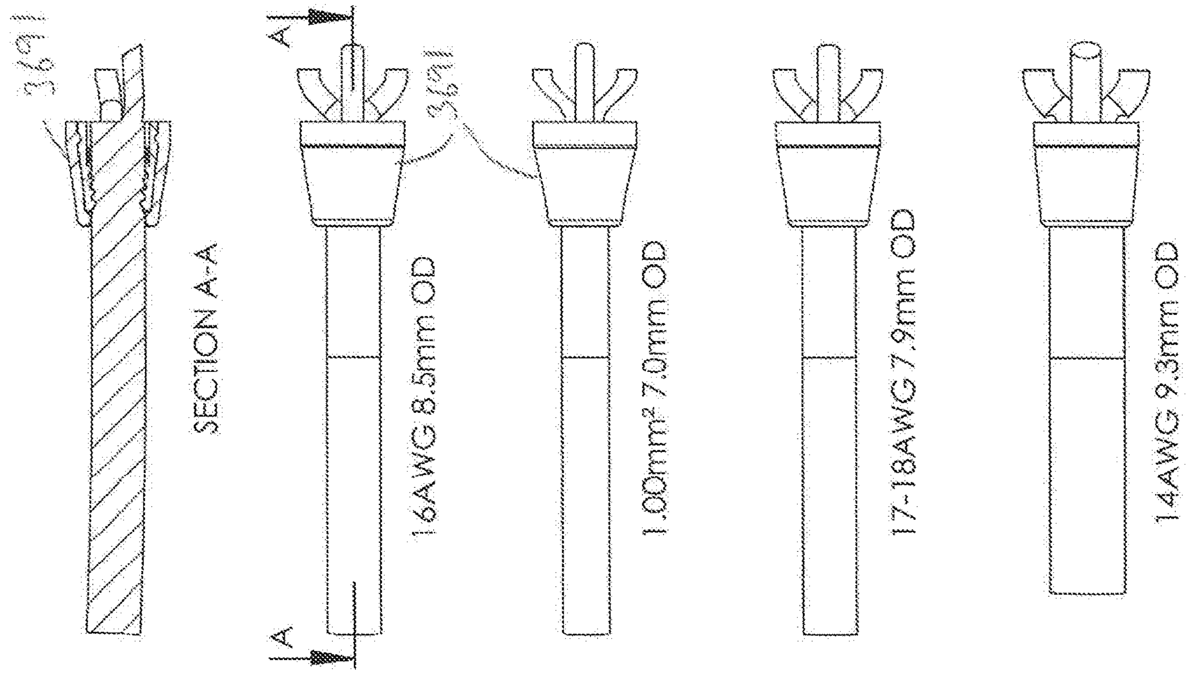
Figure 18:
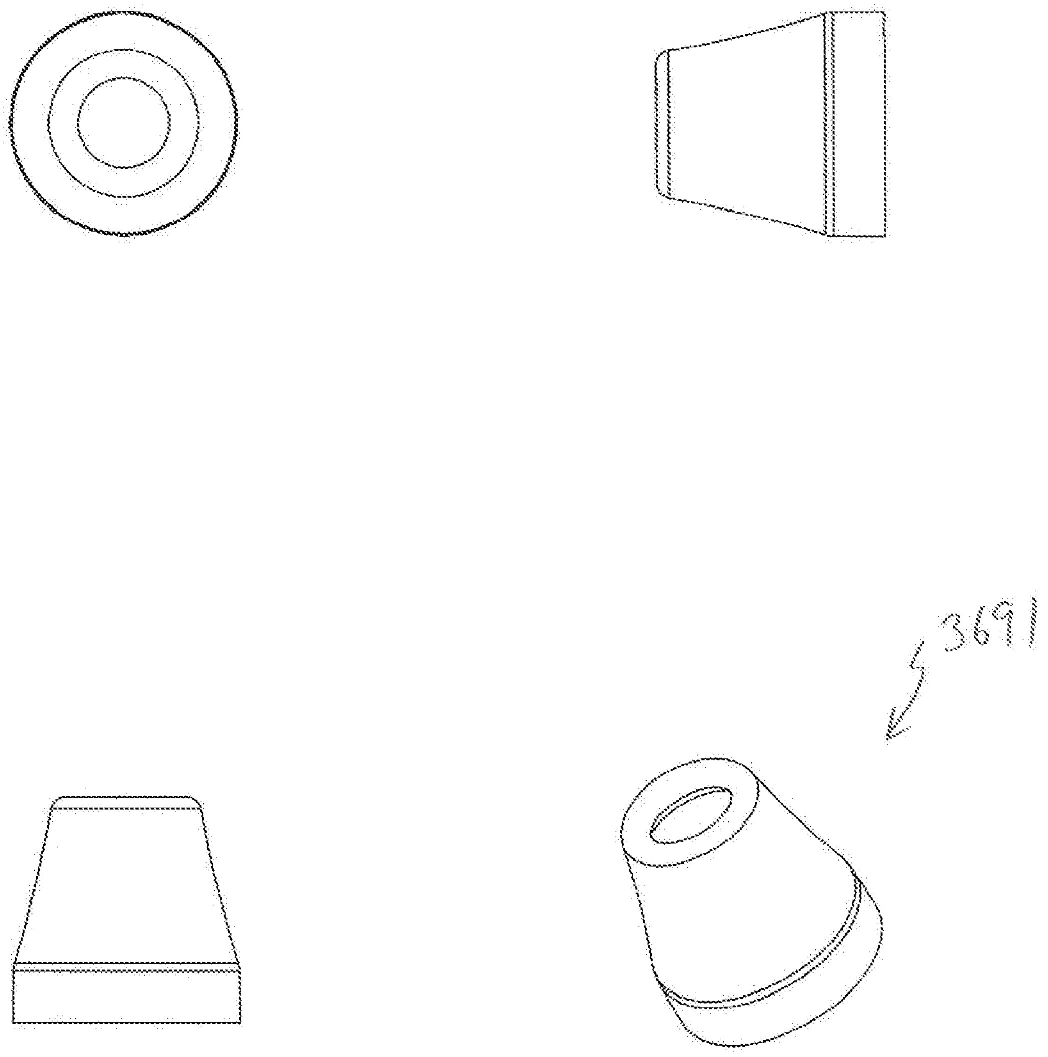
Figure 18:
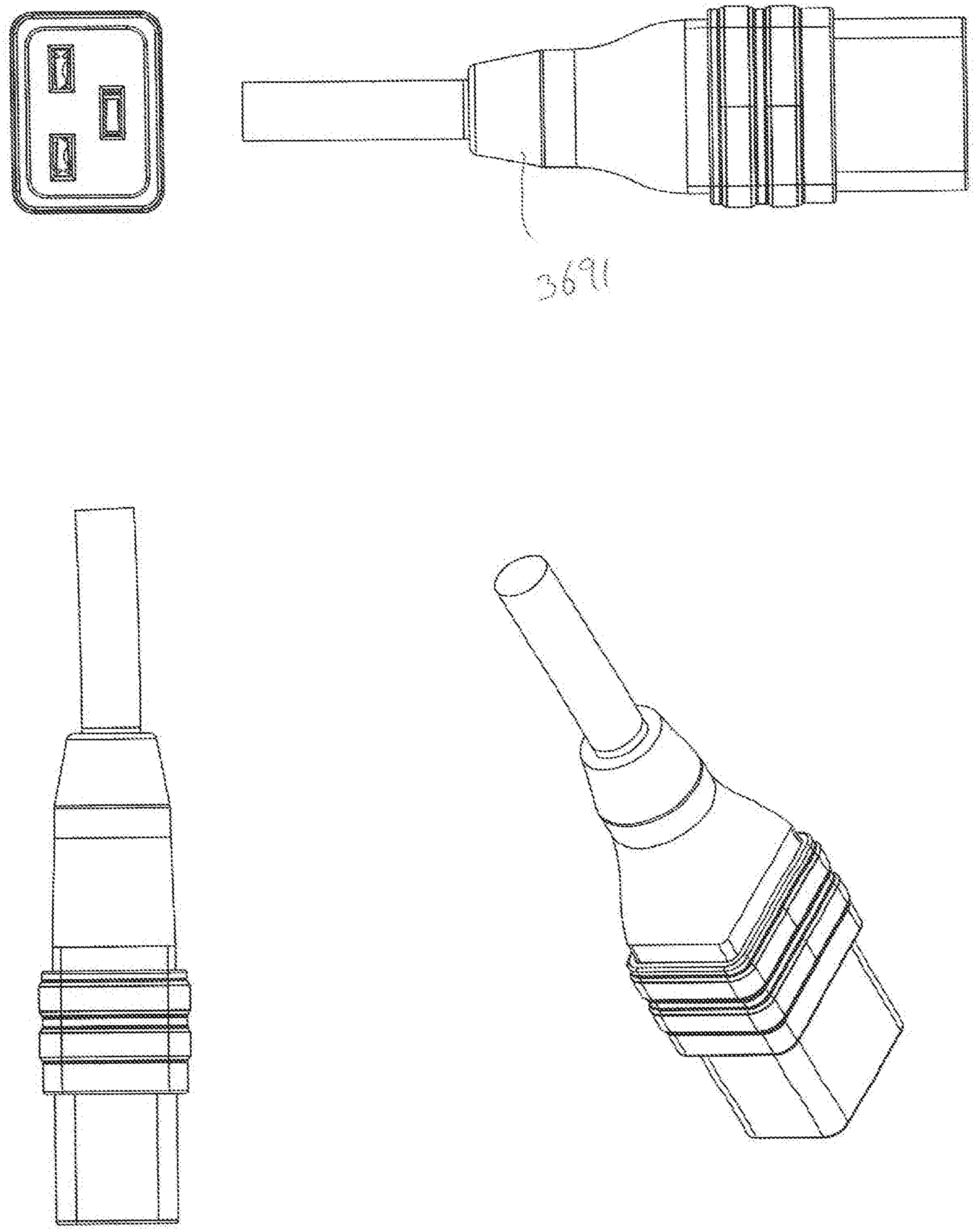
Figure 18Q:
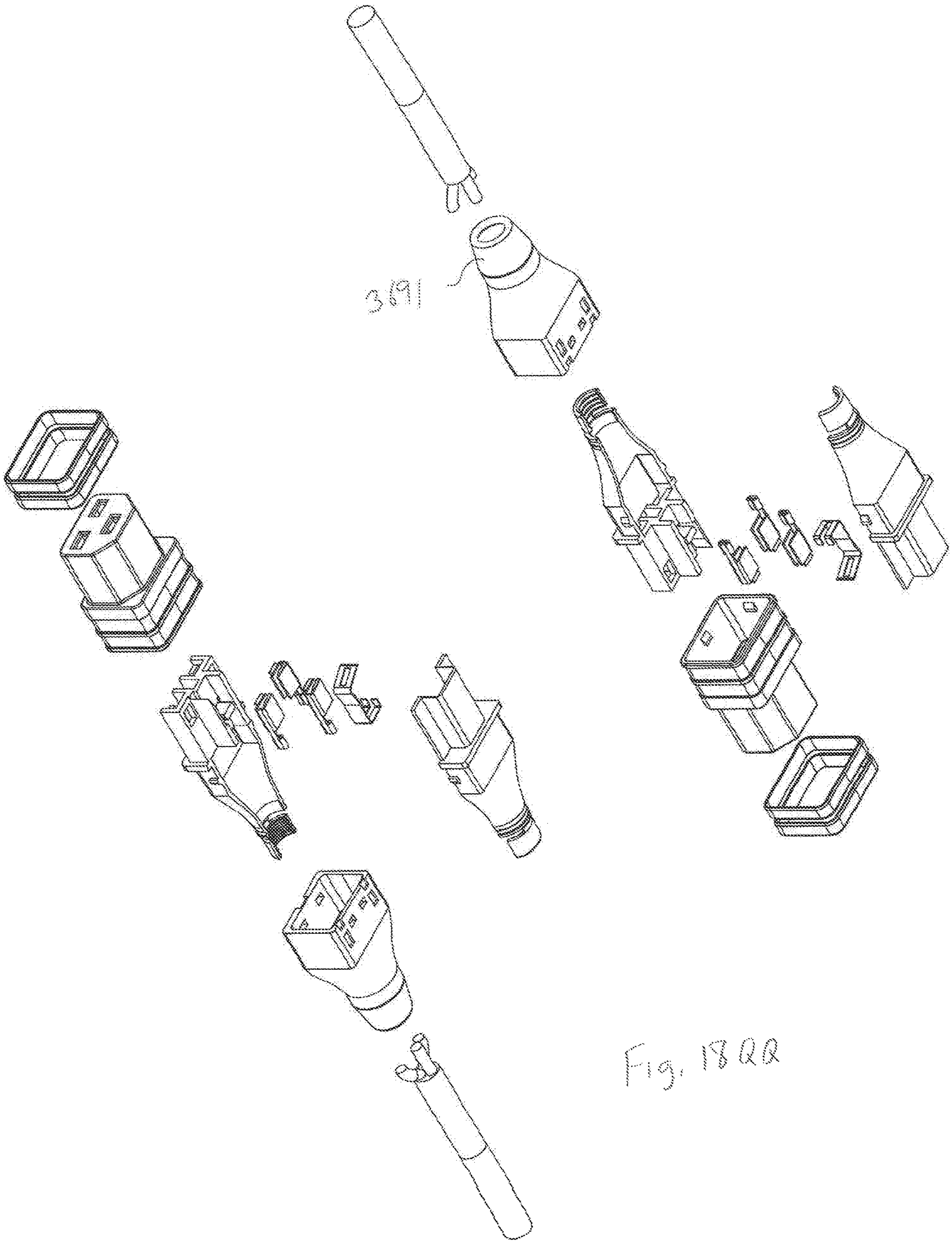
Figure 18R:
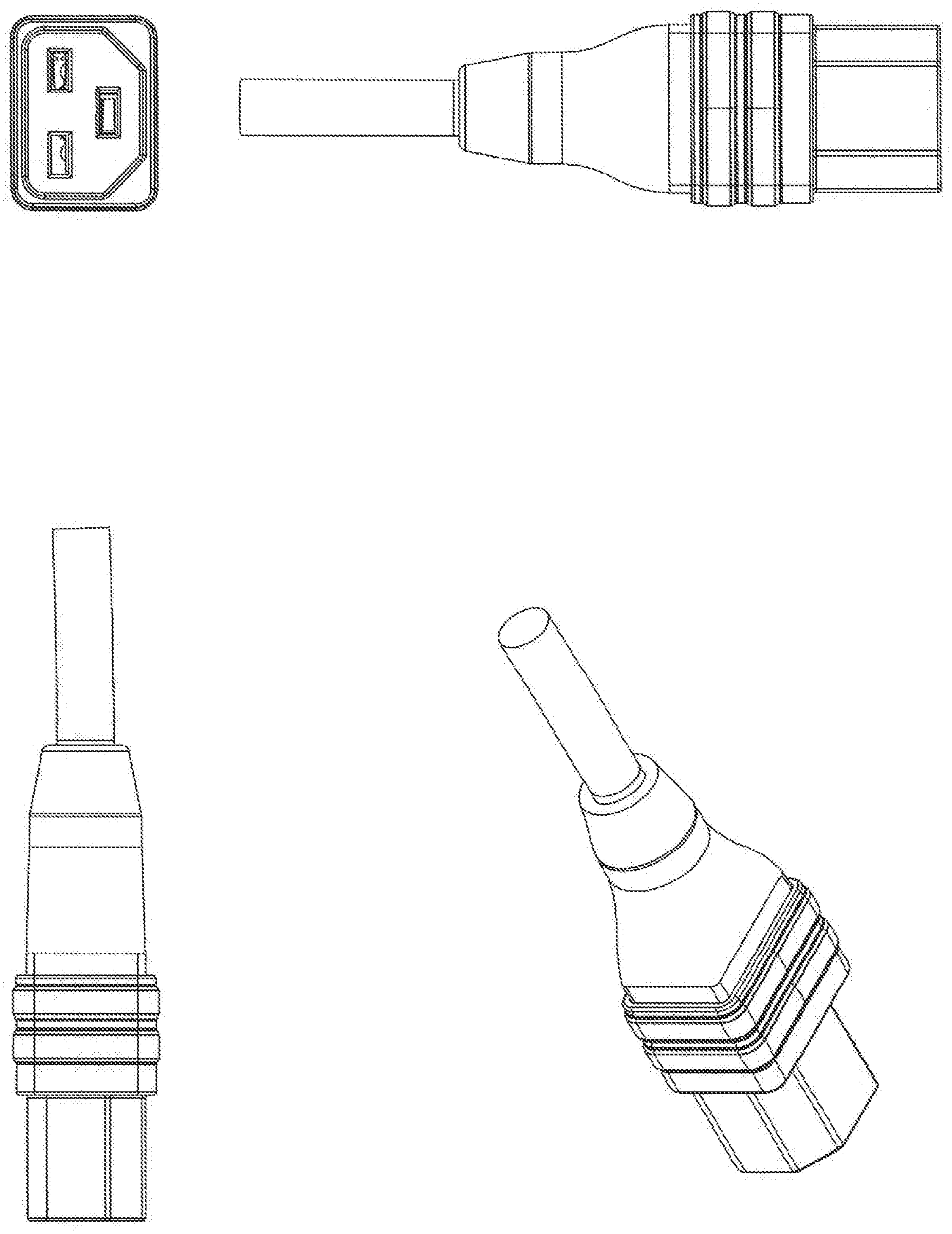
Figure 18:
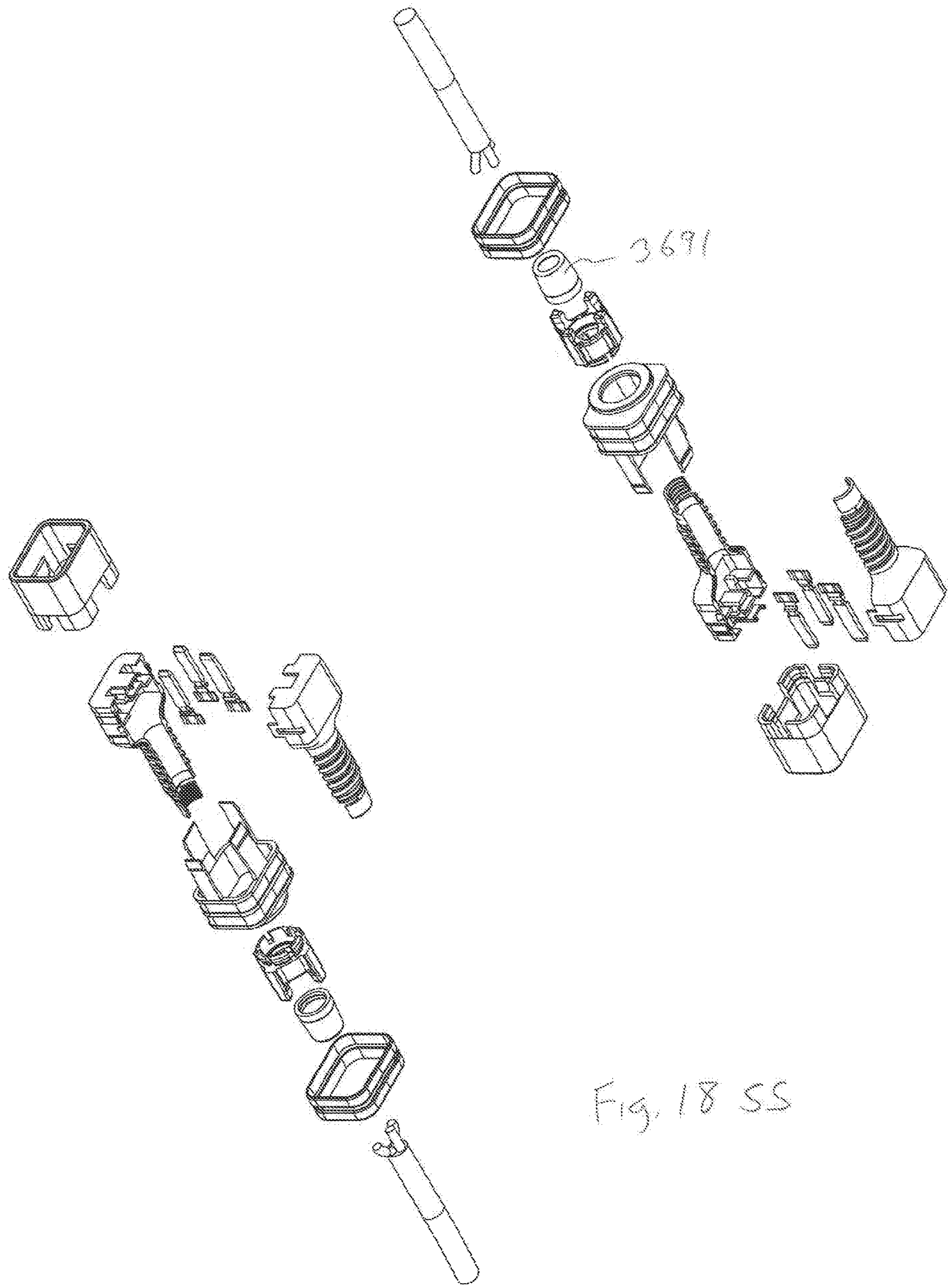
Figure 18T:
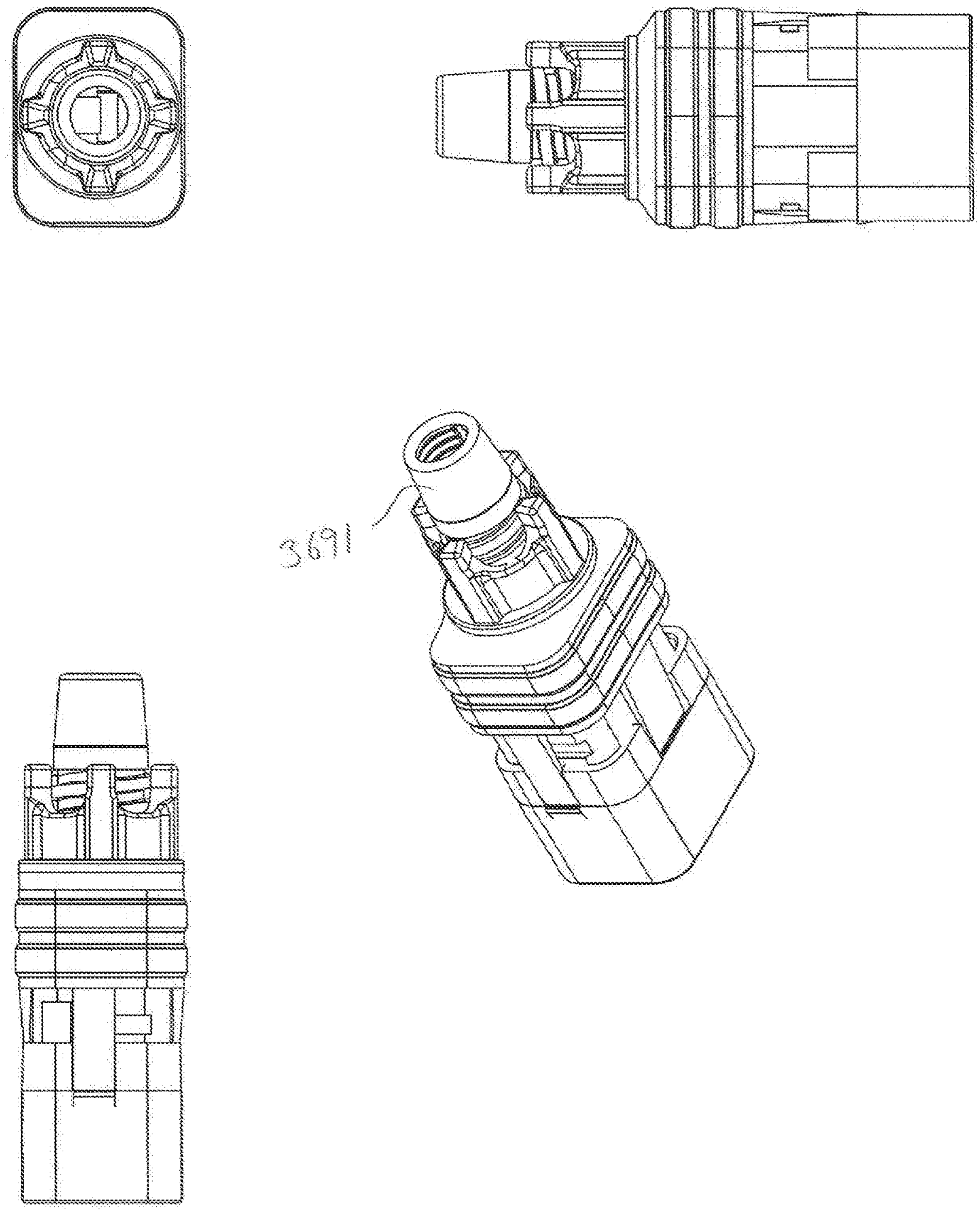

FIG. 18M shows the basic functionality of the alternate instantiation described above in more detail, as first described in FIG. 18L. The plug and receptacle are fully mated in this figure. The plug assembly components involved in the frictional locking consist of the plug barrier outer shell 3602 and the shuttle 3603. For simplicity, only the cross section of the barrier and shell are shown. The mating receptacle 3605 is also shown as a simplified cross section. The simplified cross section shows the essential components of this locking alternative instantiation.

FIG. 18N shows the basic functionality of the alternate instantiation described above in more detail, as first described in FIG. 18L. In the un-locked position, the mated pair 3610 has four insertion tabs, the same as many other preferred instantiations, of which three are shown in the drawing 3610, as the fourth tab is essentially hidden by the middle tab 3609 shown. The blown-up section 3611, shown in the unlocked position, demonstrates the interaction of components of the assembly. The shuttle 3603 lock tip 3608 is shown with the example plastic tip having an inclined plane which is mated with a similar mirror image incline plane 3607 of the outer shell 3602. The outer shell 3602 is shown pushed towards the mating receptacle 3605, and the shuttle 3603 is also shown moved into the unlocked position, which is essentially pushed as far as possible towards the mating receptacle. Thus, the ramp faces are in the minimal engagement position.

The locked position overview of the mated pair 3612 shows that the shuttle 3603 has been moved in relationship to the barrier outer shell 3602 in a manner which moves the shuttle 3603 away (to the left) from the mating receptacle 3605. At the same time the outer shell 3602 has not moved away from the mating receptacle 3605. The movement of the shuttle 3603 relative to the barrier shell 3602 is accomplished by any one of the actuation means described earlier. A threaded assembly with a manually turned nut is described above. The movement of the shuttle can also be accomplished by the use of a cam lever action, or other means suitable to draw together the shuttle 3602 and the outer shell 3503 in the indicated way as shown by the arrows in diagram section 3612.

Since the forces applied to the barrier shell and the shuttle are symmetrical but opposing, and only interactive with one-another, no forces are directly applied to the mating receptacle 3605 other than perpendicular to the axis of insertion/extraction. Thus, there is little or no tendency to extract the plug from its optimally electrical connected position within the receptacle when the locking mechanism is engaged.

The blow-up section for the locked position 3613 shows detail about the relationship of the inclined planes of the tip of the shuttle 3603 and the mating inclined plane of the outer shell 3602. In the locked position the relationship of the shuttle inclined plane 3608 has moved away from the mating receptacle 3605, and the reverse tip 3606 of the shuttle 3603 has slid along the inclined plane forcing the tip 3606 to press into the inner surface of the mating receptacle 3605 core. The point of interference shown at 3606 is the result of the shuttle motion as it moves away from the mating receptacle 3605. This is important because the action to "lock" the plug into the receptacle is also tending to draw the plug and receptacle together. This helps ensure the fully engaged relationship of the plug and receptacle thus guaranteeing a good electrical and mechanical connection.

Simultaneously, as the heel of the shuttle tip inclined plane 3608 is moving away (to the left) from the mating receptacle 3605, it is sliding along the tip of the inclined plane 3607 of the outer shell 3602 and forcing interference between the tip of the outer shell inclined plane 3607 and the inner surface of the outer plastic shell of the mating receptacle 3605. Essentially the tip halves have wedged themselves in the slot in the mating receptacle. There is a tip halve (8 in total, four from the outer shell, four from the shuttle prongs) on each of the four flat surfaces of the barrier shell that engages with the four flat surfaces of the slot in the mating receptacle that receives the outer shell when engaged.

To summarize, what is shown are alternate methods of securing (locking) two mating connectors utilizing friction only. The description of the mechanical characteristics of the receptacle demonstrates a mechanism for securing (locking) the receptacle to a standard and un-modified mating plug of the same standard.

This method of securing an electrical connection can be easily adapted to deliver various release tension ranges as necessitated by application or by regulating agencies. Minor modifications to the shape, placement and geometry of the tabs, tapered openings, and thread pitch all can have various effects on the securing force and the types of force necessary to disconnect a "locked" mating of the plug and receptacle. The simple nature of this design is robust and yet easy to manufacture. The reduced parts count and use of all injection-moldable materials reduces manufacturing cost.

The great majority of conventional power cords now made use a construction technique known as Poly-Vinyl-Chloride (PVC) over-molding as their construction method of choice. This is a well-developed construction technique where no or a few precision molded and metallic components and assemblies, such as contact carriers, wire, etc. are over-molded with PVC plastic material in an injection molding machine, to give them their final form and dimensions and ensure that they are mechanically connected into one assembly and robust. The PVC over-molding is commonly used to form such elements as the outer covering and strain relief in many cord caps. The over-molding may or may not cover some or all of the precision molded parts which are typically made of other plastics such as nylon that are suitable for the intended application. The precision molded parts may further be designed to be joined by gluing, hypersonic welding or other techniques that are commonly used to join parts of such materials. This joining may be done typically before, but sometimes after the PVC over-molding operation is performed.

The PVC over-molding construction became dominant in the late 1960's to early 1970's in power cord construction techniques. It is more labor intensive and requires larger investment in and expertise using injection molding machines. Appropriate tooling of injection molding molds is a requirement for this construction technique, which is both an expense and a long-lead time item bringing new designs to market. The economics of this technology were such that by the early 2000's almost all manufacturing of this type of cord had moved to Asian manufacturers in Taiwan and China. It is also true that this manufacturing method is best suited to large manufacturing runs per SKU, because the setup time needed for each run of a different SKU can add cost. This resulted in longer lead times for product deliveries because ocean shipment is the rational cost choice for such products as power cords that weigh more and can be bulky. This creates a longer than optimal supply chain for value-added unique power cord designs such as the Zonit zLock™, which are wanted for data center and other mission critical applications by clients that think, "It is just a power cord", and do not realize the complexity and constraints of the supply chain for these unique products. Also, these specialty designs such as zLock™ are typically made in much lower numbers per manufacturing run, which adds both time and cost. Further, the long-term competition for global resources and the resulting trade wars have made the choice of where to manufacture more and more important. Reducing lead-times for zLock™ and minimizing the time and cost needed to change SKU models on the production line both result in more sales and better margins.

Changing the construction technique of a zLock™ power cord to consist of all or mostly high-precision metal and plastic components that can be snapped or pressed together to form the final assembly has significant advantages.

1) The manufacture of the components can be fully separated from the final assembly process. Furthermore, the manufacturing of the components can easily be moved from one plastic injection manufacturer to another, just move the molds, which are typically owned by the end customer. This ensures that no single point of failure exists in this step of the manufacturing process.

2) The resources required to do final assembly are quite simple, just manpower and very simple assembly machinery, such as jigs and mechanical presses (if needed) that can be hand or power operated. These are widely available.

3) The setup costs for doing different models of power cords are minimal, since the main setup cost will be to switch a roll of wire and may be a reel of contacts on an automatic striper/crimper machine, which is quickly done. Also, that machine is not a large investment, and many wire harness shops have them. The final assembly task of assembling the components and connecting them together to form a power cord is almost a constant cost per cord and can be automated for further economic benefit.

4) The location of final assembly can be placed where it is needed for best transport logistics, low labor cost and tax/regulation/tariff benefits. This method also ensures that no single point of failure exists in this step of the manufacturing process. If one contract manufacturer cannot meet required deadlines, cost points or quality requirements, moving the final manufacturing program to another that can is very simple. This incites more competitive bidding by contract manufacturers to win the contract and more attention to detail when running the program to keep it.

The zLock™ instantiations using these new construction techniques we will discuss below can use a variety of design techniques. We will discuss a few of the more obvious; many of these are discussed in other zLock™ patent filings incorporated herein with different construction methods.

1. Part joining methods that are or can be used in these designs. Note that one or methods can be combined as needed.
   a. Barbed post and matching aperture
   b. Mushroom plastic post riveting
   c. Gluing with alignment posts and holes
   d. Gluing of part edges with or without alignment grooves
   e. Ultra-sonic welding
   f. Other suitable methods
2. Parts that could use these methods in this set of designs
   a. Inner shell contact carrier joining of halves
   b. Optional separate contact carrier
   c. Concentric ring or sleeve over back of inner shell
   d. Other parts or assemblies in this filing.

3. Strain relief options, inner shell and any other required components are modified to match the method chosen. See FIGS. 18Q-T.

a. Labyrinth path with or without additional bushing for power cord b. Contact/prong crimp with flange or other to prevent pull-through c. Grip ring on power cord preventing pull-through d. Gluing power cord to strain relief e. Concentric ring or sleeve to securely clamp inner shell halves together.

This goes over the inner shell halves.

f. Concentric barbs.

g. Optional strain relief cord radius control sleeve, an additional element that can be placed on the cord and clamped by the back half of the inner shell where the cord exits. It could be made of a different, possibly more flexible material than the inner shell halves if desired. This can be done in a variety of ways. One simple way would be to have a flange on the cord radius control sleeve that is captured by a matching groove in the interior of the inner shell halves. Another method would be to have a rib on the interior of the cord radius sleeve that is captured by a matching groove on the outside of the rear of the inner shell halves.

4. Inner shell construction—One inner shell shown is designed as one piece that folds over and is therefore self-aligning when joined. It joins together using barbed posts and matching apertures. It can also be designed as one folding piece or two separate pieces that are joined by any of the joining methods listed above. The choice of one or more of these methods to use is driven by cost and manufacturer capability and machinery. The design shown integrates the contact carrier, but that could be done as a separate part that is held by the inner shell if needed for construction and/or safety compliance reasons. The inner shell can incorporate the strain relief function entirely or do it in combination with an outer concentric ring or sleeve which has certain advantages described below. It can also incorporate an optional strain relief radius control sleeve as described above.

5. Shuttle and Nut construction—The shuttle and nut are each designed to be a single piece if possible, ideally formed in a single action mold. That is a preferred instantiation, others are possible.

6. Outer Shell construction—The outer shell is designed to be a single piece if possible, ideally formed in a single action mold. That is a preferred instantiation, others are possible, such as two pieces, etc.

7. Strain relief construction—There are several methods that can be used to create a suitable strain relief It can be done entirely by the inner shell or by a combination of the inner shell and a concentric outer ring or sleeve. The method chosen in one of the zLock™ instantiations discussed below.

FIGS. 18P-T show a variety of possible methods. FIG. 18Q shows how to use the ground contact extension to transfer the force tending to pull the plug and matching receptacle apart to the power cord. That force transfers from the spring retainer (See FIG. 18U) to the flange on the ground contact carrier and hence to the power cord via a crimp of the extended ground contact to the power cord. The crimp has a flange that prevents it from pulling through the inner shell assembly when it is joined and closed as is shown in FIG. 18Q and FIG. 18Q. The advantage of this method is that the strong and potentially brittle material of the retainer spring is not required to be crimped onto the power cord (which is a possible design variant, using suitable materials) the crimp is done using the more malleable metal of the contact.

Another strain relief method that can be used is to insert a labyrinthine or serpentine path feature in the back side of the inner shell assembly that grips the cord when closed. This is shown in FIG. 18R.

Another strain relief method that can be used is to insert a concentric barbs feature in the back side of the inner shell assembly that grips the cord when closed. This is shown in FIG. 18S.

The functioning of the labyrinth path strain relief can be improved by making the back side of the inner shell assembly a suitable shape, such as a cylinder or a slightly tapered cone and using a concentric ring of metal or a plastic sleeve with concentric retention rings or grooves that are matched by matching concentric grooves or rings on the outer face of the inner shell assembly. The outer ring or sleeve is pressed over the assembled halves of the inner shell and ensures that excellent compression of the power cord is achieved by the labyrinthine path in the interior of the inner shell halves.

The concentric compression component can also be modified to be a short sleeve (often shaped like a suitably shaped truncated cone) that is the outer surface of the assembly viewed from the rear of the cord cap where the power cord enters. It can be provided with a hole that closely matches the size of the power cord diameter and is what the end user views when looking at the exit of the power cord from the cord cap. In this case, one possible variant is to make the concentric ring in the form of a longer sleeve, and then press it onto the tapered walls of the inner shell assembly where the matching retaining rings and grooves on both parts will ensure that they stay firmly joined. The tapered sleeve can also be attached via barbed posts and a matching aperture, gluing or ultrasonic welding or any of the joining methods described earlier. Some of these described variants are shown in FIG. 18P. A strain relief radius control sleeve can be integrated into the concentric sleeve, it could be inserted through the large end of the sleeve, and then held in place by a retaining flange and a matching groove on the inner surface of the sleeve. Alternatively, it could be held by the inner shell halves as described above. This technique can also be used to provide threads for a nut to be used in a type of locking male plug, examples of which are shown in FIGS. 18W and 18X. In that case, the material used could be selected to be optimal for use as threads. The advantage of this design variant is that it shows few if any joining lines at all, because the joint between the concentric ring sleeve and the inner shell assembly is covered by the outer shell overhang in the female variants (for example, IEC C13/15/19 and covered by the nut in some male locking models (for example, IEC C14/20). This is desirable to form an impression of solidity and reliability in the mind of the end user.

In yet another aspect of the invention, a novel strain relief that can be used in many applications is shown in FIGS. 18AA-NN. In this instantiation of the invention, the concentric compression component 3691 can be made in a range of sizes to accommodate a range of power cord diameters and still function effectively as a strain relief mechanism. The advantage of this design is that the concentric compression component 3691 is a simple and cheap part to make and no other changes are required to the other elements of the assembly. Example instantiations of cord caps, according to various international standards (e.g., C13, C14, C15, C19-C21, etc.), employing strain relief extensions captured by a compression component 3691 are shown in FIGS. 18EE-18TT. An example of an in-line surge suppression circuit employing strain relief extensions captured by a compression component 3691 is shown in FIGS. 18AA-18DD. Various embodiments and details of the surge suppression circuit are described in the surge suppression case which is incorporated herein by reference.

FIGS. 18U-X illustrate several possible instantiations of the invention. These instantiations can function like any of the other described instantiations of the invention, and use any of their described features, but their method of construction is different, which allows the previously described advantages to be realized.

FIGS. 18U-X show examples of several embodiments of examples of zLock™ designs that can use these construction techniques. The designs shown are for locking IEC C13/15/19 and C14/20 cord caps, but the methods described can be used for other cord cap designs and standards both locking and non-locking.

We will describe the details of an IEC 13/15 assembly (the C13 and C15 assemblies are the same except for the indent in the outer C15 shell, as shown in FIG. 18U) using the new construction method for illustrative purposes, see FIG. 18U. The C19 assembly, FIG. 18V shares the new construction method and functions in essentially the same manner, with the contacts and retention spring turned 90 degrees. The assembly consists of the following elements: the power cord 3800, which inserts into the inner housing 3900. The electrical contacts 3810, 3830, which are crimped onto the appropriately stripped inner wires 3801 of the power cord. The contact carrier slots 3920 are integrated into the inner housing 3900. The inner housing also incorporates a strain relief function, in this example it is done via a stop 3930 that prevents the ground contact crimp 3830 on the power cord pulling through the aperture formed when the two halves of the inner shell 3900 are closed. A flange or other feature (see FIG. 18Q) may be included as part of the ground contact crimp, to help prevent pulling through the aperture of the closed inner shell halves. An optional external strain relief cord radius control sleeve (not shown) that slips over the power cord and is captured via a lip or other suitable method when the two halves of the inner housing are joined could also be used if needed for UL or other regulatory body compliance. A spring retainer 3840 that grasps an electrical contact, in this case the ground prong of the matching cord cap and transfers a force that would tend to pull the plug and receptacle apart, to the ground contact 3830 via a flange 3831 on the ground contact and hence to the crimp 3832 of the ground contact on the power cord 3800. An outer shell 3950 is pressed onto the closed halves of the inner shell assembly and is retained by one or more formed pegs 3901 on the side(s) of the inner shell assembly that match to the one or more formed apertures 3951 in the outer shell. One or more elastomeric rings 3960 which fit into the one or more grooves 3952 on the back half of the outer shell and provide both an aid to gripping the outer shell and a color identification method which can be useful for data center operators to use in marking certain properties of a power cord connection such as what power source, or phase or priority or other characteristic that is important to the data center operator. This design releases from the locked position by pulling back on the outer shell as has been described in previous filings that are incorporated into this filing. We will now describe the details of one possible instantiation of an IEC C14 assembly using the new construction method for illustrative purposes, see FIG. 18W. The C20 assembly, FIG. 18X shares the new construction method and functions in essentially the same manner, with the contacts turned 90 degrees. The assembly consists of the following elements: the power cord 4100, which inserts into the inner shell 4200 which incorporates the dielectric shield that goes around the electrical prongs. The inner shell encloses, locates, and supports the electrical prongs 4102. The electrical prongs 4102, are crimped onto the appropriately stripped inner wires 4101 of the power cord. The electrical prong carrier 4203 is integrated into the inner shell housing. The shuttle 4210 has one or more prongs 4211 with shaped tips 4212 that insert through slots 4250 in the inner shell housing 4200. The shuttle is moved back and forth via the nut 4215, which has one or more flanges 4216 that is captured by a one or more slots 4217 in the shuttle, which keep the shuttle and nut attached and make them move together when the nut is turned.

In this example strain relief is done via a stop that prevents the ground prong crimp on the power cord pulling through the support feature formed when the two halves of the inner shell are closed. The other strain relief methods described earlier could also be used.

The inner shell can incorporate a combination nut thread and strain relief function, or it can be a separate piece 4110, as shown. In that design option it can be formed by a threaded sleeve that is connected to the inner shell 4200. It could be connected by being pushed over a rear extension of the inner shell housing and retained by concentric retention rings or grooves that are matched by matching concentric grooves or rings on the outer face of the inner shell assembly. It can also be retained by having a retention groove in the inner shell that captures a flange on the concentric sleeve or by any other of the other joining methods detailed earlier. It can incorporate a retaining pin or other feature to ensure that it does not rotate once pressed on. The sleeve also can be manufactured with no joining line, so it can provide a smooth nut turn function.

The prongs 4211 on the shuttle 4210 are moved and wedge between the walls of the mating receptacle and the dielectric shell securing the connection between the plug and receptacle. This can be done in several ways as described earlier. The assembly of the inner shell, outer shell, and shuttle with nut acts to transfer a force that would tend to pull the plug and receptacle apart, to the power cord 4100 via the crimped ground prong or any other strain relief feature used to secure the power cord in the inner shell assembly. The shuttle 4210 shown in is fitted onto the inner shell assembly and is retained by the nut behind it as described earlier. One or more elastomeric rings can be provided which go into the one or more grooves 4218 on the back half of the shuttle to provide both an aid to gripping the shuttle and a color identification method which can be useful for data center operators to use in marking certain properties of a power cord connection such as what power source, or phase or priority or other characteristic that is important to the data center operator. This design releases from the locked position by turning the nut to release the locked connection, as has been described herein and in previous filings that are incorporated into this filing.

A new feature that we have created for a specific equipment issue is now described. Several models of power cord receptacle have appeared on the market with shrouds that prevent the end user from easily removing a locking power cord.

See FIG. 18Y for a photograph of an example.

A simple solution is to provide a way to extend the outer housing via a tool that allows the user to draw back the outer shell, releasing the locking plug. The tool can be designed to be used in the following ways.

1. Inserted, used, and then removed. In this case a simple sheet metal tool as shown in FIG. 18Z will work. It is pushed into the receptacle shroud, where it will catch the dividing rib on the outer shell where the two elastomeric rings sit, allowing the user to pull back the outer shell and remove the plug.

2. Inserted, used, and left attached. In this case the inner and outer shells of the plug are slightly modified. One or more channels are molded into the outer surface of the inner shell. An indent is molded into one or more surfaces of the outer shell with the wall nearest the rear perpendicular and the front wall angled at 45 degrees. The recess is aligned to the channels of the inner shell. The tool has one or more prongs with hooks on their tips that are inserted into the channels of the inner shell and pushed in until the hook tips expand out and catch on the perpendicular wall of the outer shell. The user can then pull back the tool and release the locking plug. The tool can be left attached if desired. To remove it the user pushes it in just a bit which disengages and forces the hook tips closer together and then squeezes it slightly, which keeps it disengaged, and then can pull the prongs back out of the channels in the inner shell, removing the tool.

Figure 19:
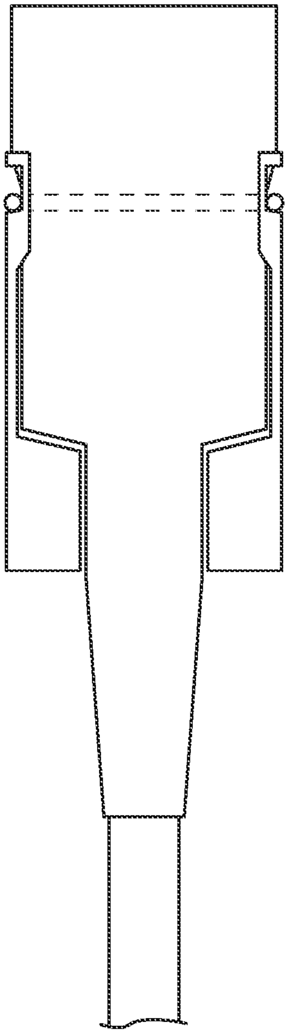
FIGS. 19-22 illustrate the operation of another embodiment of a retention mechanism in accordance with the present invention.
Figure 20:
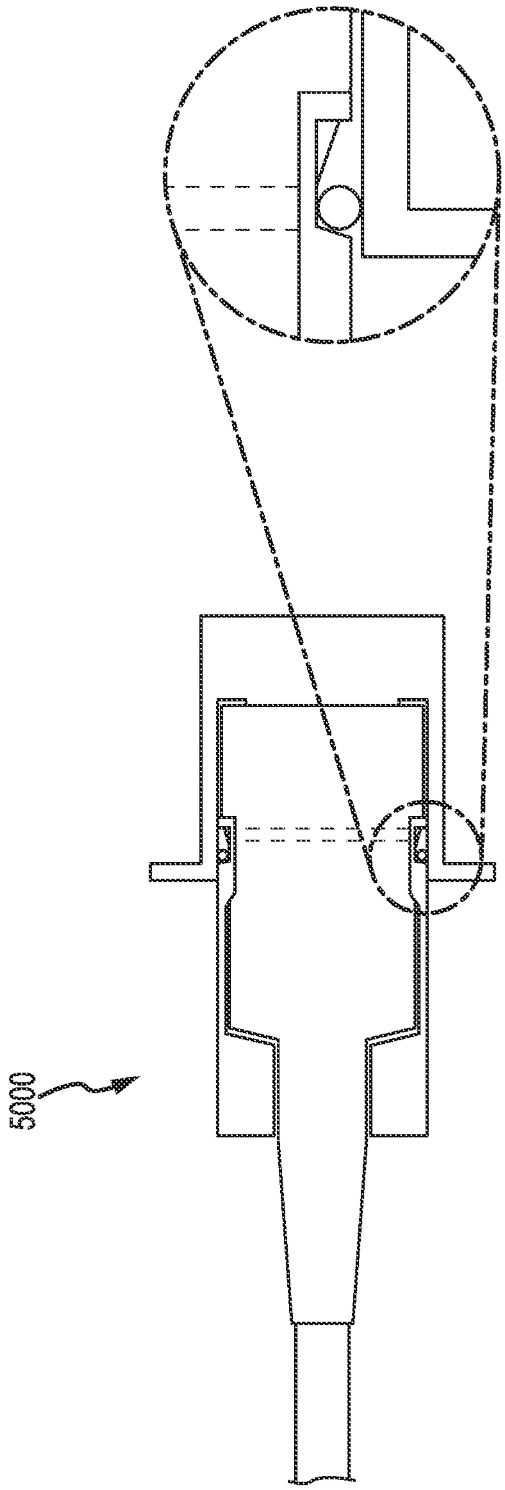
Figure 21:
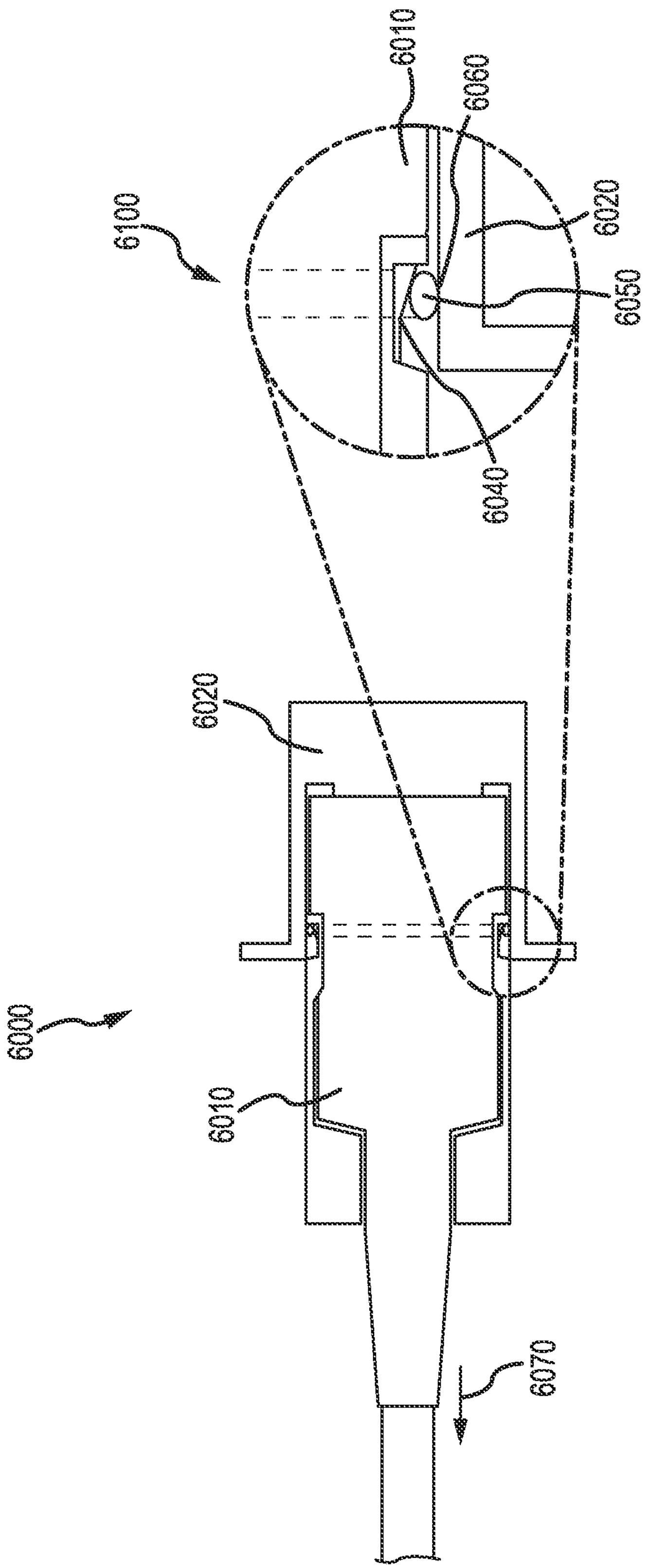
Figure 22:
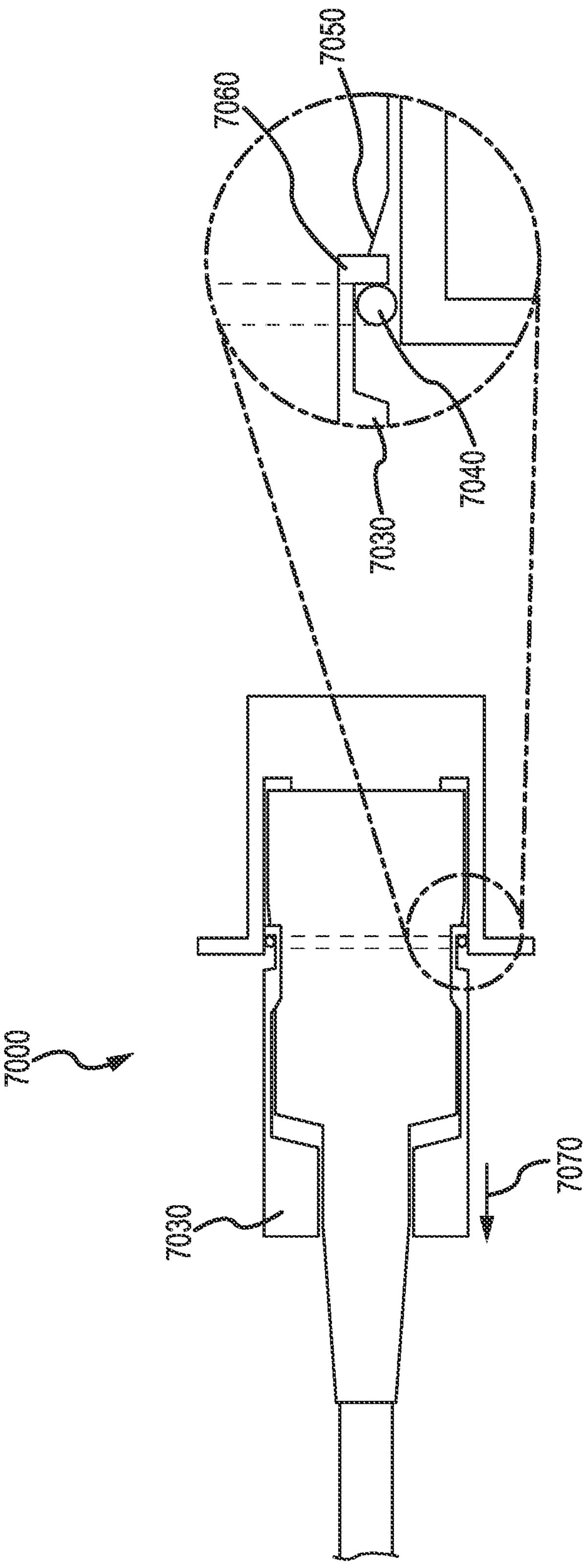

FIGS. 19-22 illustrate the operation of another embodiment of a mechanism for securing a mated electrical connection that may be included in a secure connection of the present invention. This embodiment is one that automatically secures itself in response to a force 6070 that would tend to pull the connection apart. FIGS. 20-22 represents top views of the retention mechanism in the states of: 1) fully inserted 5000, 2) fully inserted under tension 6000, 3) being released 7000. FIG. 19 illustrates the plug and receptacle and the elements of retention mechanism. FIG. 20 illustrates the connection after the plug has been inserted into the receptacle, but no force has been applied that would tend to pull the connection apart. FIG. 21 illustrates the operation of the retention mechanism 6000 in reaction to a force on the plug 601 that tends to withdrawal the plug 6010 from the receptacle 6020. In reaction to a withdrawal of the plug 6010, the retention mechanism as shown in detail blowup 6100 via the action of the inclined ramp 6040 forces the elastomer 6050 into closer and closer contact with the walls of the receptacle 6060, causing the frictional interlock between the plug 6010 and the receptacle 6020 to increase. Thus, the very force 6070 that tends to withdraw the plug 6010 from the receptacle 6020 acts to engage the retention mechanism 6000 to frictionally interlock with the walls of the receptacle 6060, thereby preventing the withdrawal of the plug 6010, and maintaining the electrical connection of the mated assembly. The retention mechanism 6000 may be constructed of any suitable material as described earlier. FIG. 22 illustrates the operation of the retention mechanism during release of the secure connection. When the user desires to release the connection, they can grasp and pull the outer shell 7030 which will retract, pulling 7070 the elastomer 7040 back down the ramp 7050, via the extension of the outer shell 7060, uncompressing the elastomer 7040 thus releasing the connection.

Figure 23:
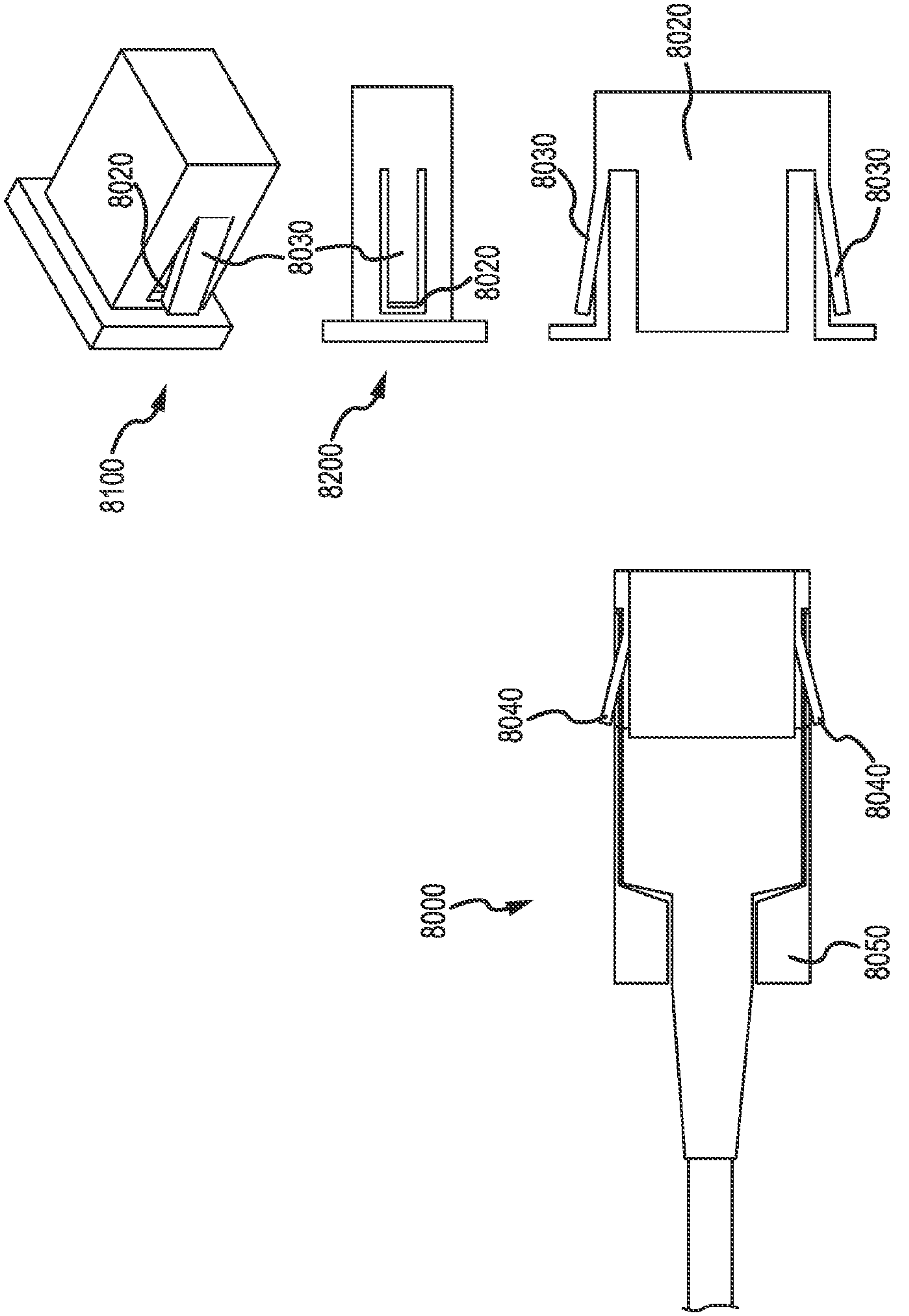
FIGS. 23-24E illustrate an embodiment of plug that includes a tab or hook retention mechanism in accordance with the present invention.

FIGS. 23-24 illustrate the operation of another embodiment of a mechanism for securing a mated electrical connection that may be included in a secure connection of the present invention. This embodiment is one that automatically secures itself in response to a force that would tend to pull the connection apart. FIG. 23 illustrates a side top of the plug 8000 that incorporates the secure mechanism, and side view 8010 and perspective views 8020 of a typical standard receptacle. The receptacle has fingers 8030 that are used to secure the receptacle 8020 when it is snapped into a panel. These fingers 8030 are typically provided in individually molded snap-in receptacles 8020 and typically provided in molded models of receptacles that provide two, three, or more receptacles in one molded unit for snap-in insertion into a plugstrip. The fingers 8030 splay when the receptacle 8020 is inserted, leaving an opening in the body of the receptacle 8020. Where the fingers are not provided, the manufacturer could alter the molding to ensure they or a similarly shaped and located slot or hole are provided in every model of individual or multiple receptacles, at low cost with little or no impact on regulatory body approvals, making it easy and inexpensive to offer. The plug 8000 has tabs 8040 (that optionally can be shaped as hooks) that will expand and insert themselves into the openings in the body of the receptacle 8020 when the plug 8000 is inserted into the receptacle 8020. The ends of the tabs 8040 can be located and shaped so that they can insert themselves into and transfer forces that would tend to pull the connection apart to the walls of the receptacle, but not pass through the opening in the wall of the receptacle 8020. This ensures that the tabs 8020 cannot become wedged by the walls of the receptacle in response to a force that would tend to pull the connection apart and therefore separate the plug 8000 and receptacle 8020. This shaping of the tabs 8020 ensures that the secure connection will function properly and always release when desired. To release the connection the user grasps the outer shell 805 and pulls it back to pull the plug 8000 out of the receptacle 8020.

Figure 24A:
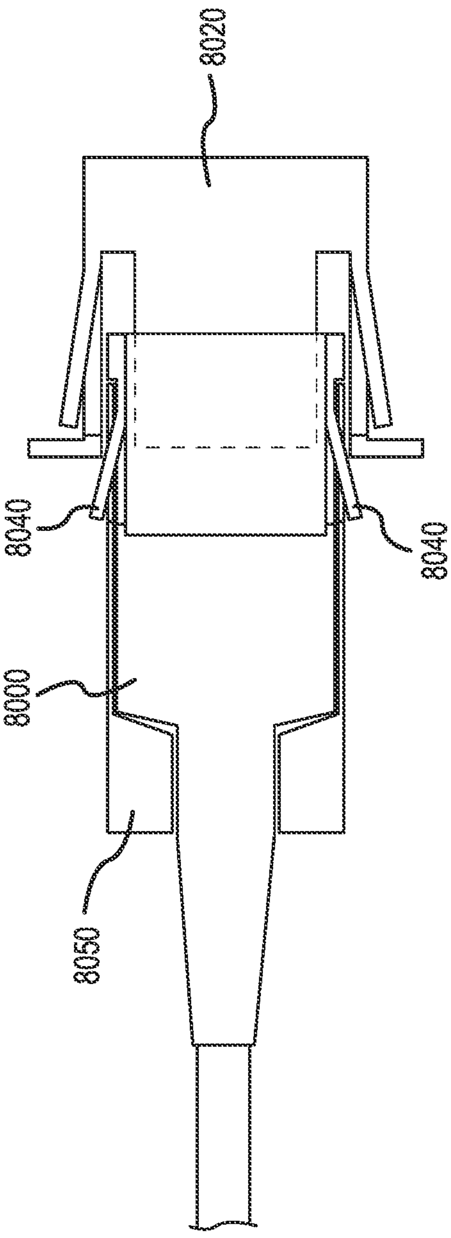
Figure 24B:
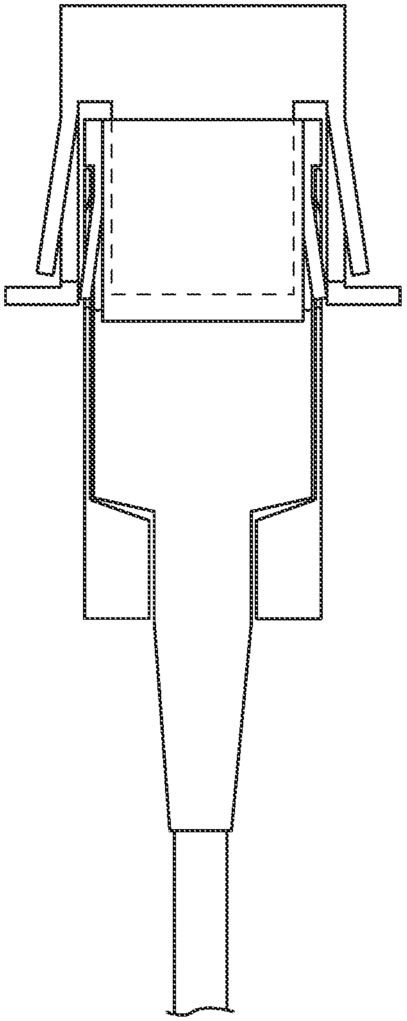
Figure 24C:
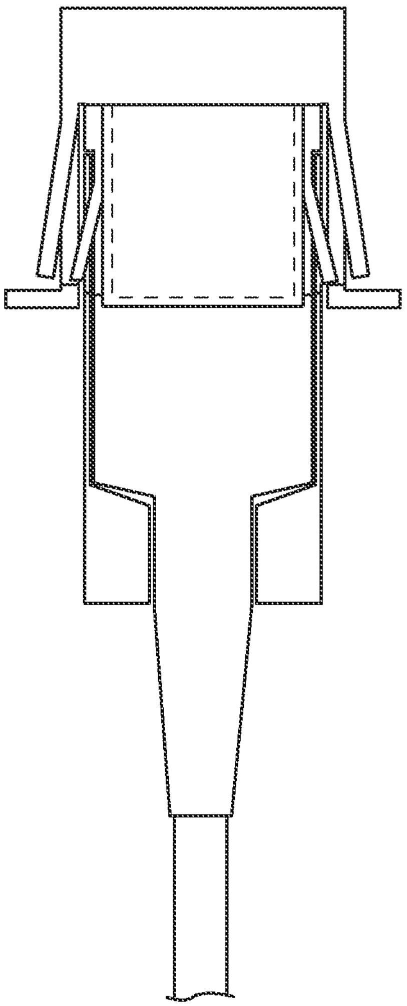
Figure 24D:
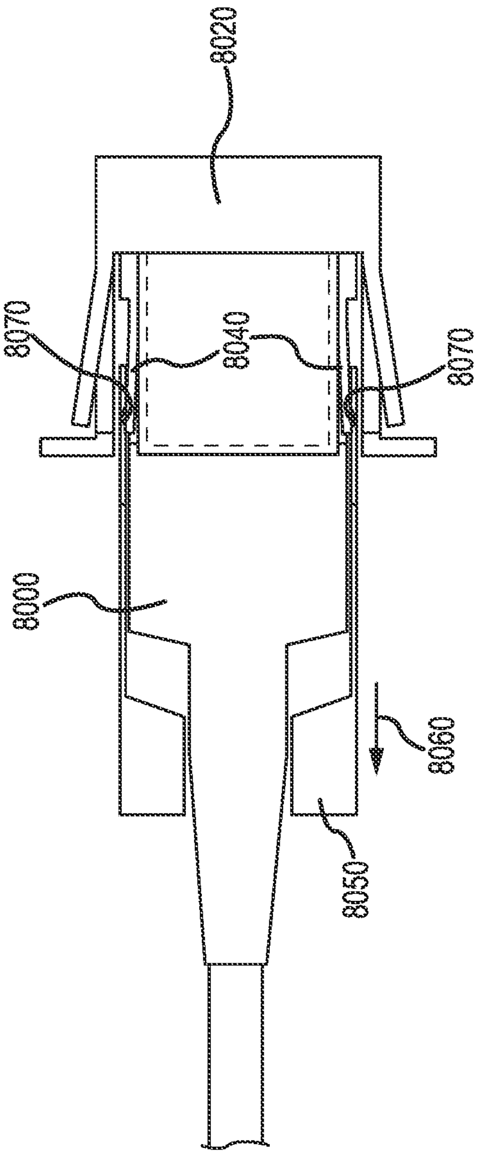
Figure 24E:
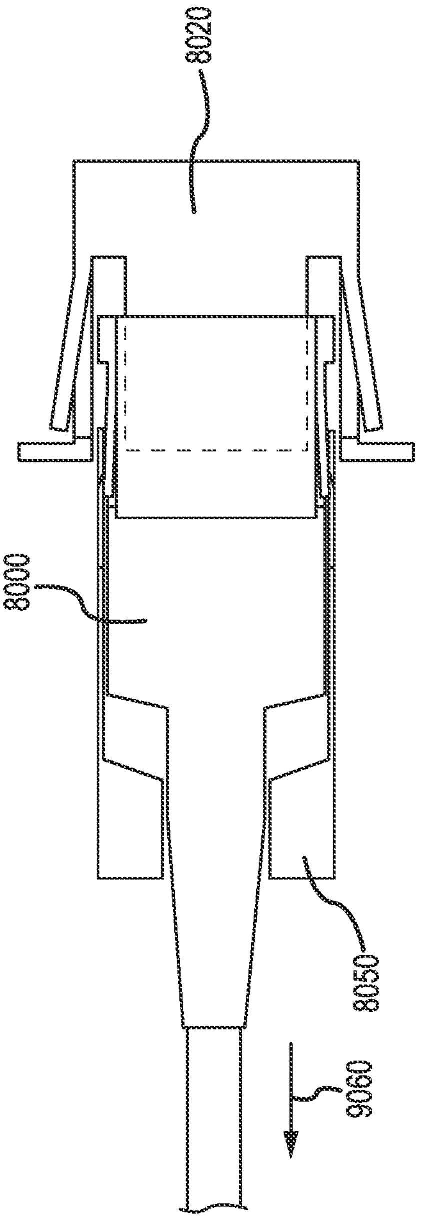

FIGS. 24A-24E represents top views of the retention mechanism with an electrical contact prong in the states of: 1) partially inserted FIG. 24A, 2) being inserted but not yet secured FIG. 24B, 3) fully inserted and secured 9020 FIG. 24C, 4) fully inserted while being released 9030 FIG. 24D, 5) being removed, thus breaking the connection 9040 FIG. 24E. As described above and demonstrated in FIGS. 24A-24E, the plug 8000 has tabs 8040 (that optionally can be shaped as hooks) that will expand and insert themselves into the openings in the body of the receptacle 8020 when the plug is inserted into the receptacle 8020. To release the connection the user grasps the outer shell 8050 and pulls 8060 it back to pull the plug 8000 out of the receptacle 8020 as demonstrated in FIG. 24D and FIG. 24E. The outer shell 8050 is equipped with suitably shaped substantially rectangular openings for the tabs 8040 to extend through and when the outer shell 8050 is pulled 8060 back by the user, the edge 8070 of the rectangular opening that is closest to the front of the male plug will depress the tabs 8040, freeing the plug 8000 to disconnect from the receptacle 8020. The retention mechanism may be constructed of any suitable material as described earlier. It should be noted that this embodiment of the mechanism could easily be combined with the earlier versions described that use a user activated manual retention mechanism. This instantiation would use the actuation nut described earlier to control the position and movement of the outer shell. The release position of the actuation nut would position the outer shell to depress the tabs, preventing their engagement with the receptacle, but not preventing the plug from being inserted into or removed from the receptacle. The secure position of the actuation nut would allow the tabs to engage with the receptacle, securing the connection. This version might be useful in some circumstances.

Figure 26A:
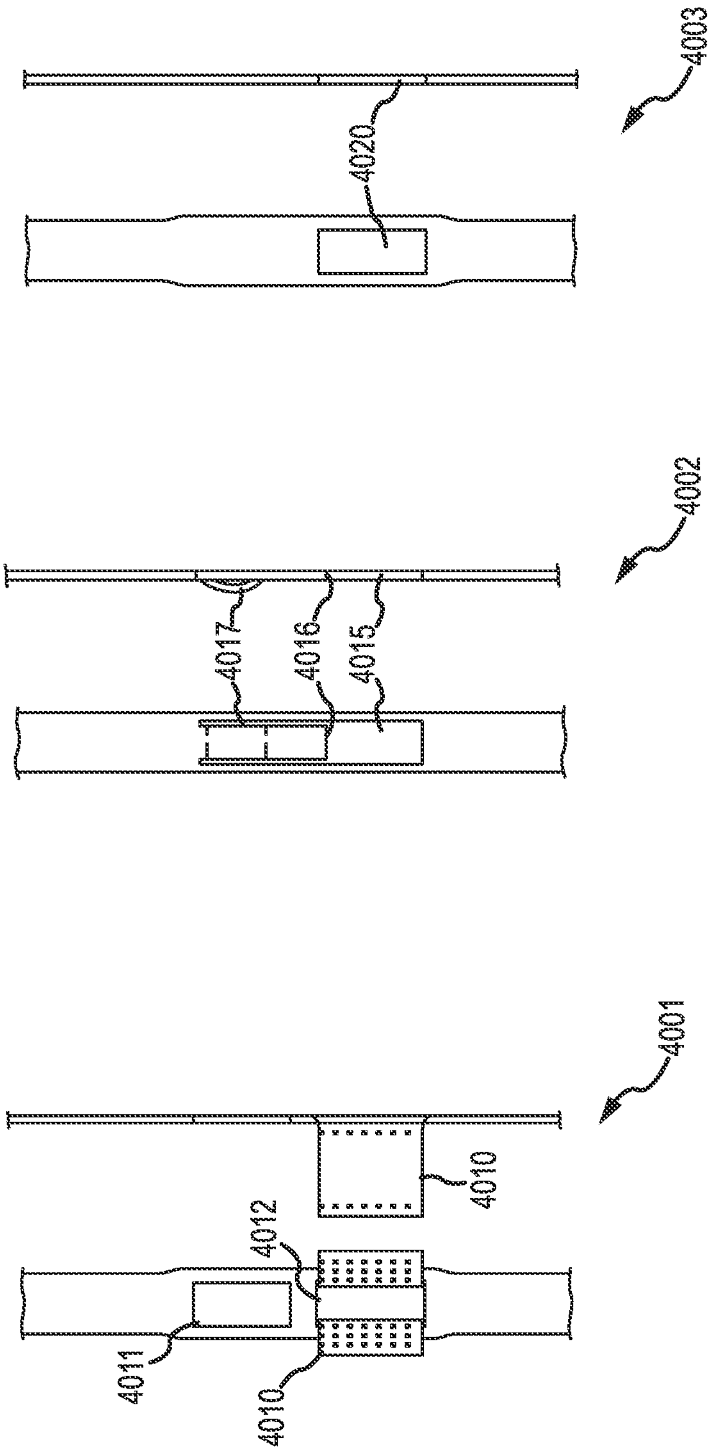
FIGS. 26A-26I show embodiments of a locking plug strip in accordance with the present invention.
Figure 26B:
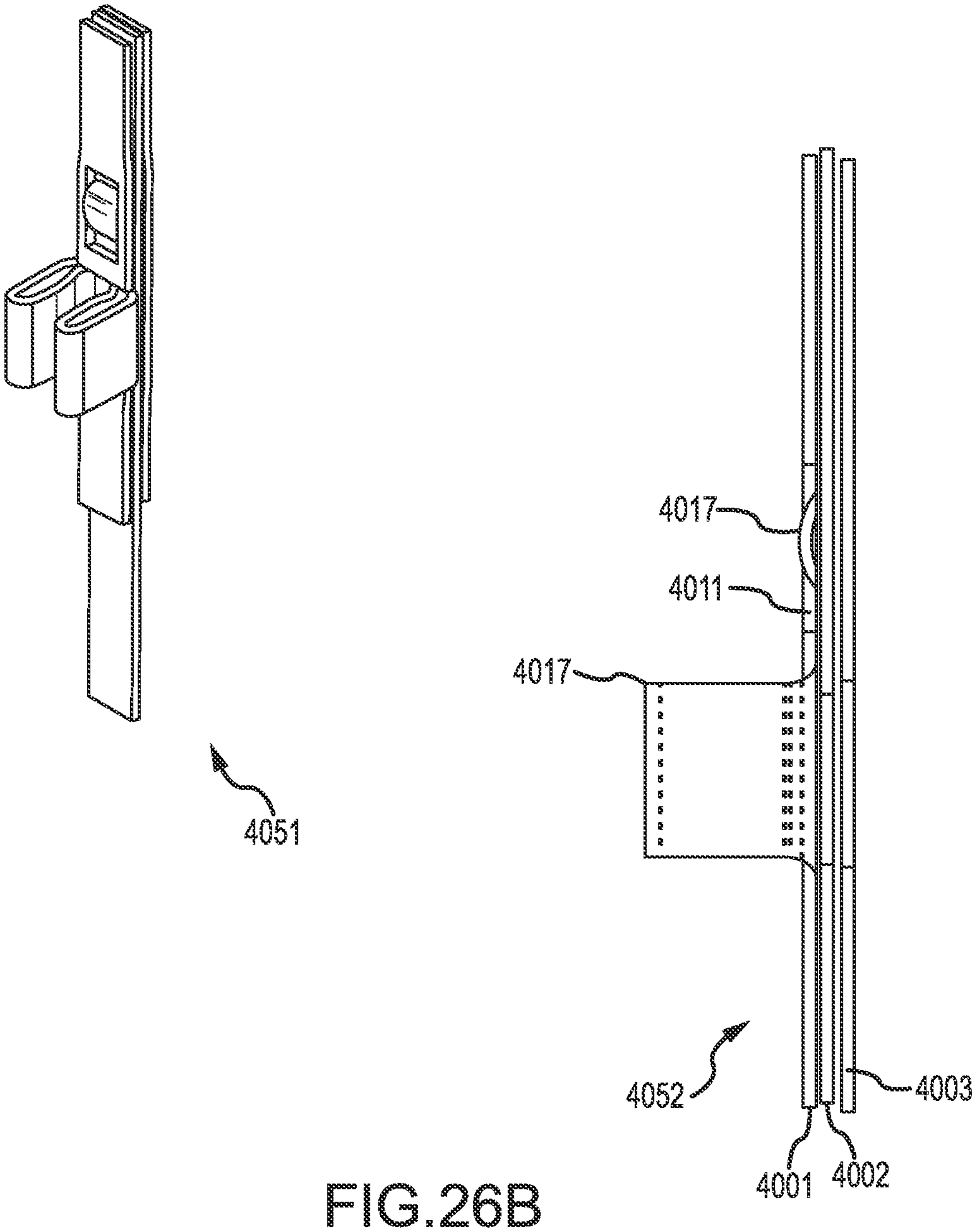
Figure 26C:
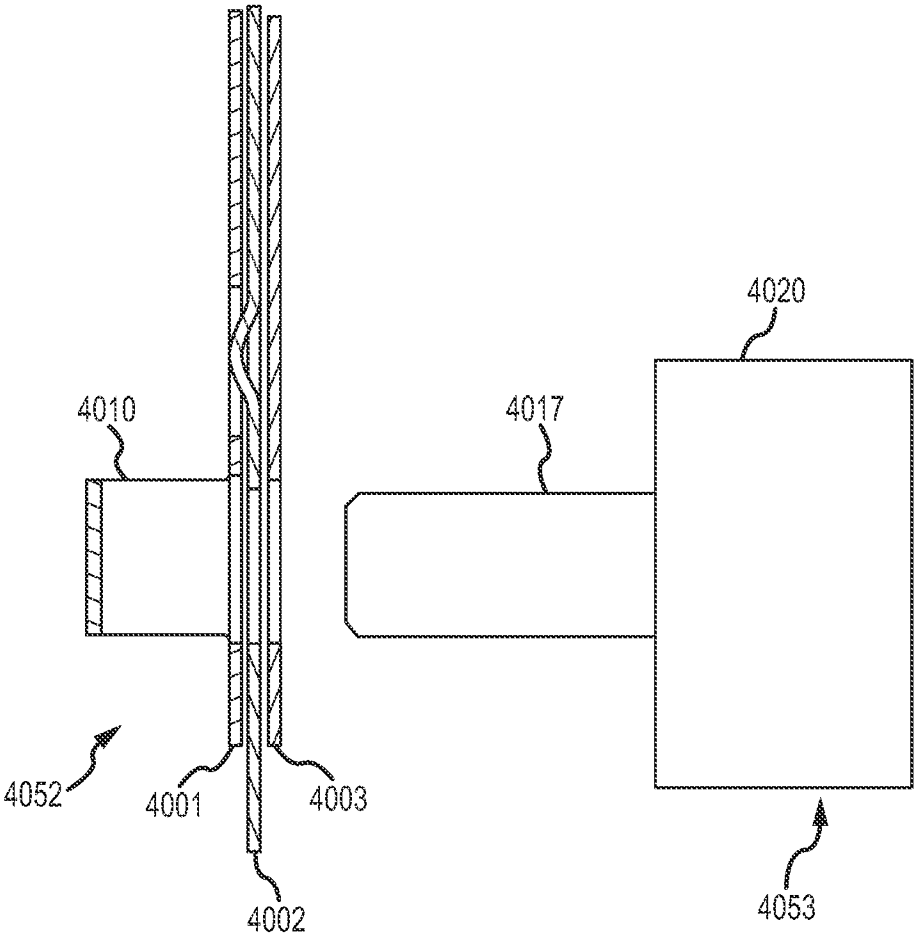
Figure 26D:
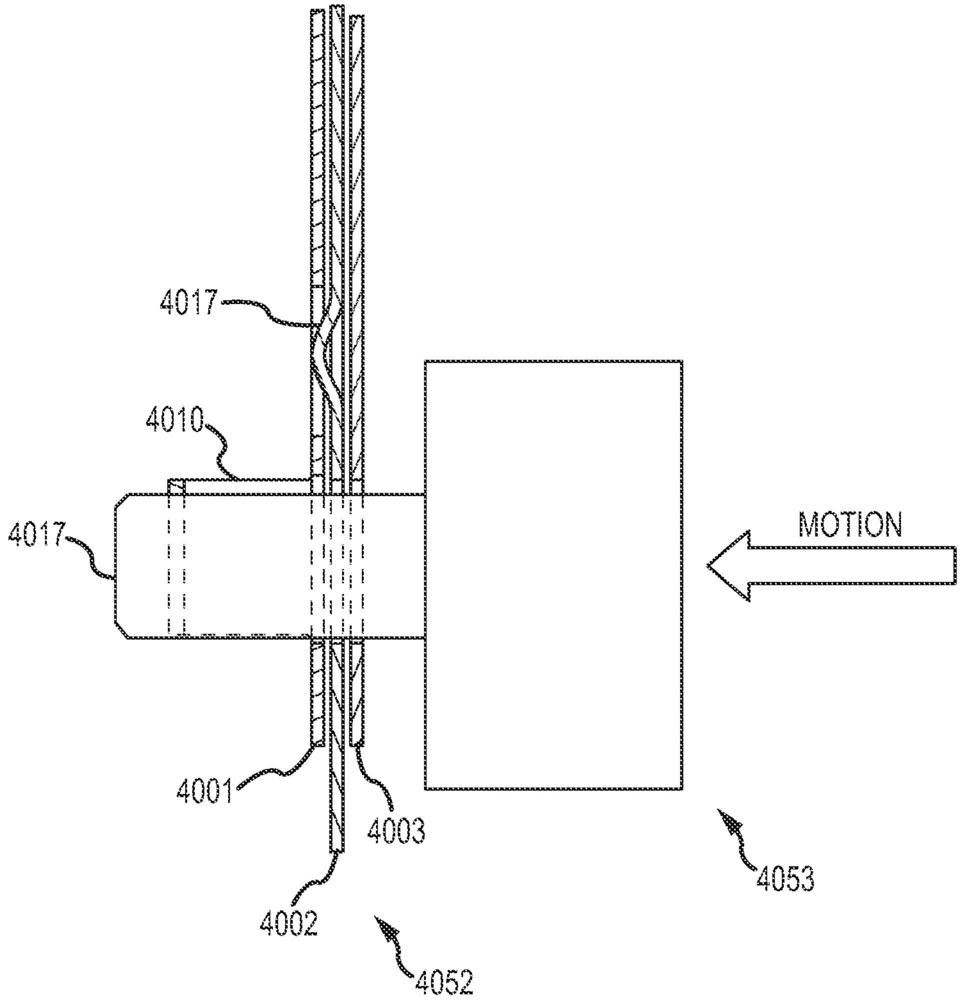
Figure 26E:
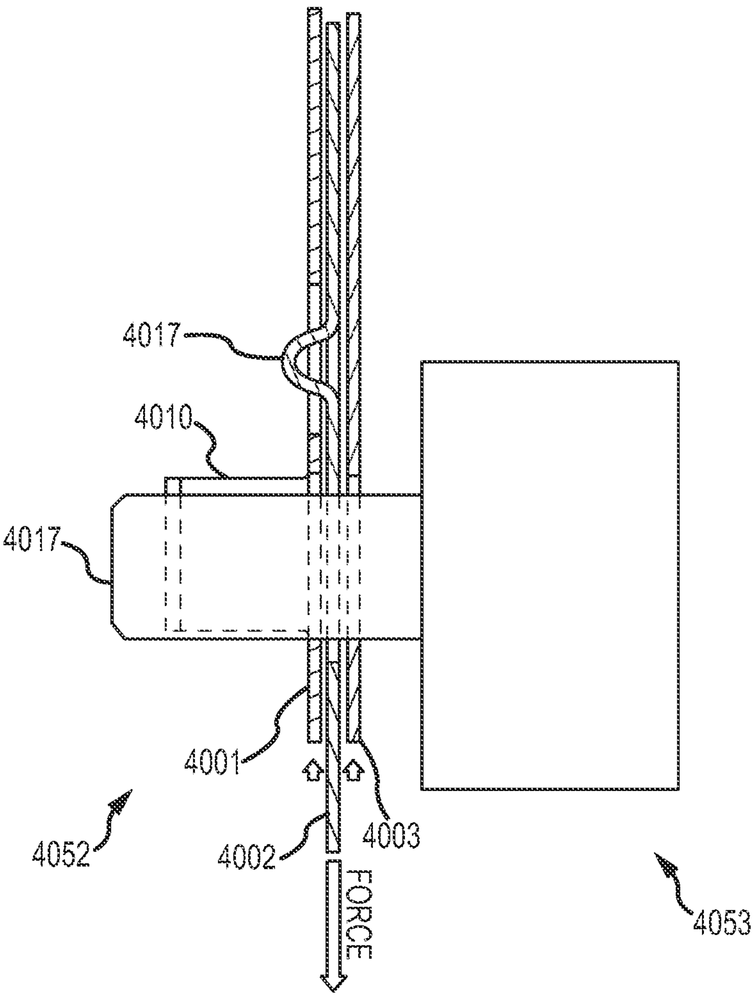
Figure 26F:
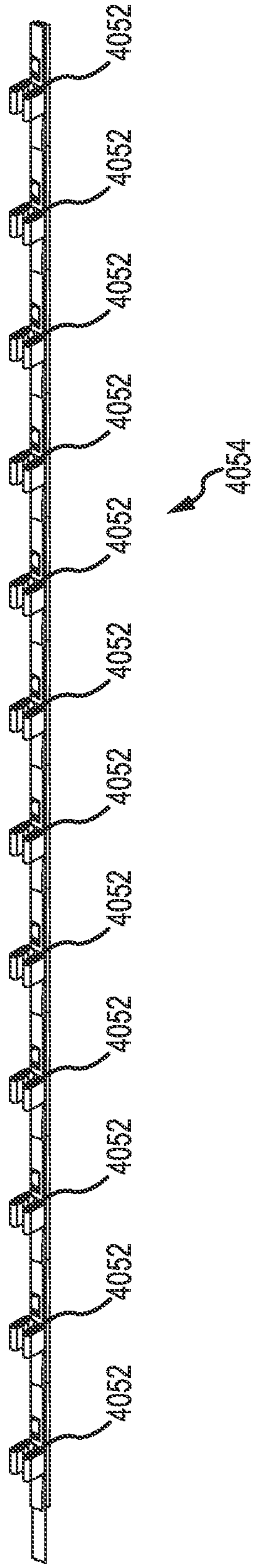
Figure 26G:
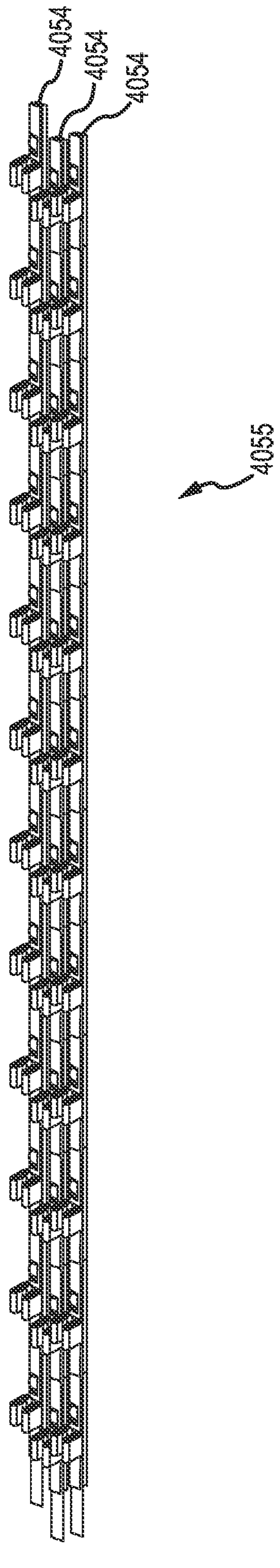
Figure 26H:
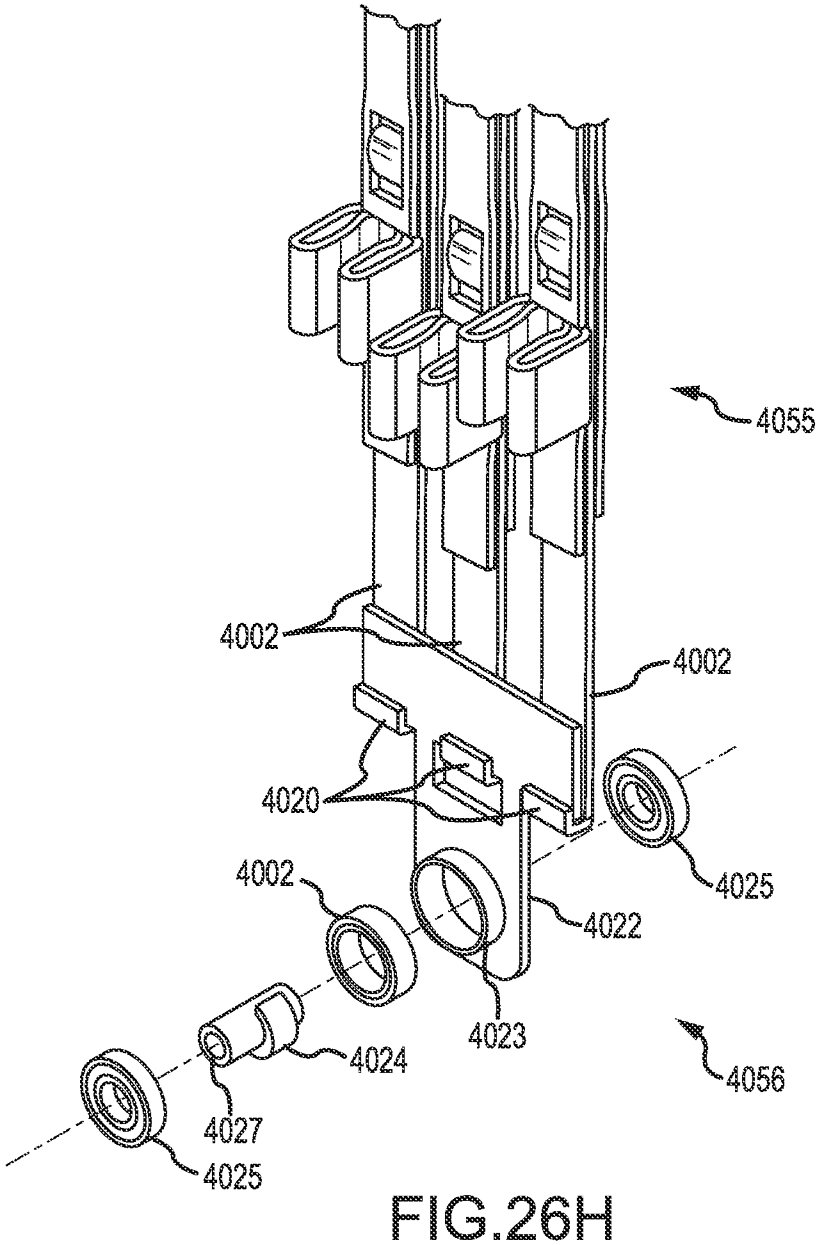
Figure 26I:
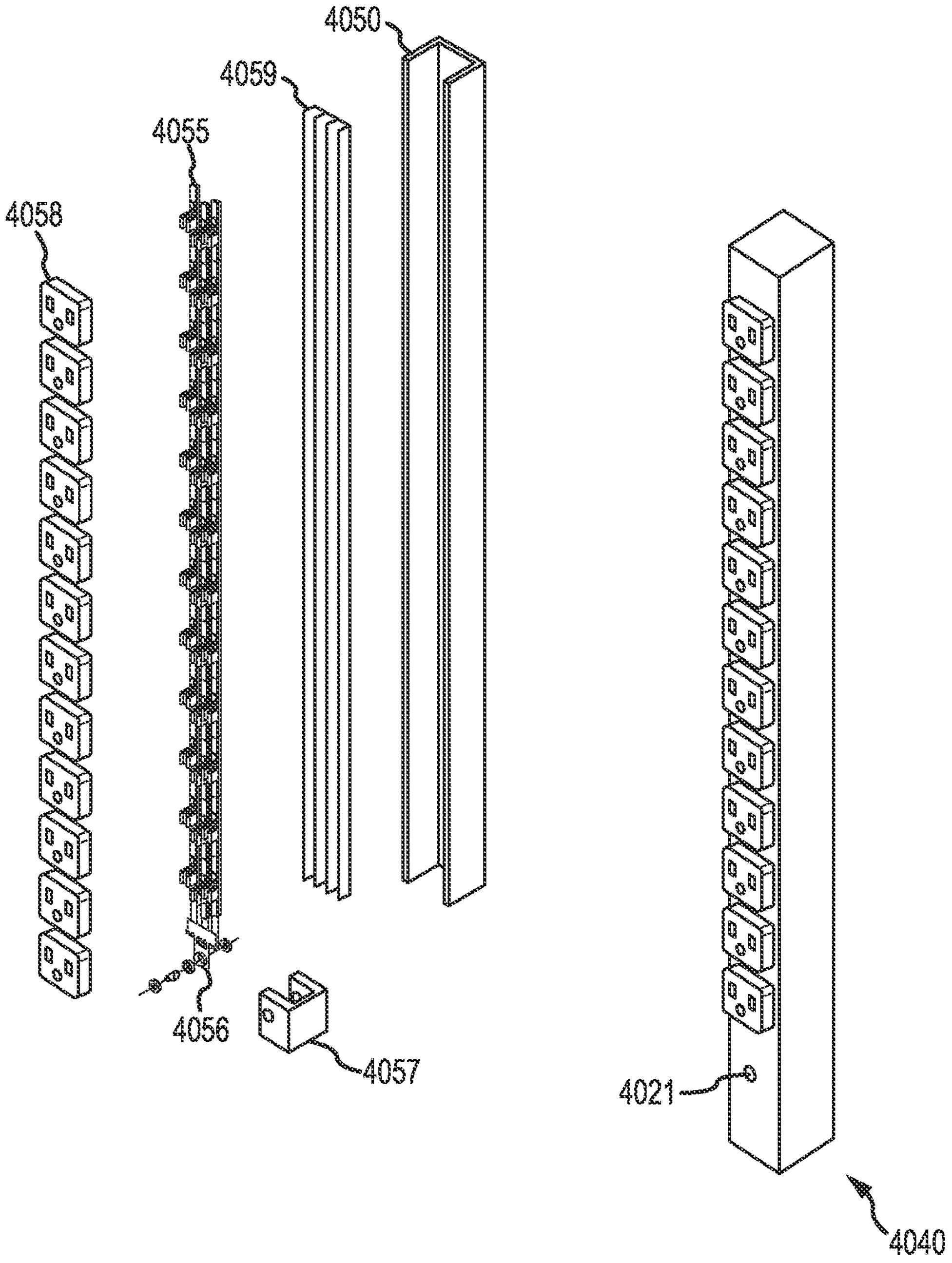

FIGS. 26A-I depict another possible method to secure cords to plugstrips. The locking mechanism has been incorporated into the plugstrip, so that every cord is locked at once and all can be released at one time. FIG. 26I shows a multiple electrical outlet assembly 4040 comprised of 12

National Electrical Manufacturers Association (NEMA) type 5-15 receptacles (other receptacle types could be used, the 5-15 type is used as an example) oriented in a line and assembled into a narrow profile long "strip". This configuration is commonly utilized in electronic equipment racks, and is often referred to as a plugstrip, and will be referred to hereinafter as such. Any number of receptacles, from one to any practical limit, can be manufactured using this method. The plugstrip that is the object of this invention is unique in that it incorporates a locking feature for the purpose of securing the plugs of electrical cords that are to be attached to the plugstrip. The locking or un-locking of the receptacles to the attached electrical plugs is accomplished by an operation of rotating a hex socket screw 4021 on the front of the panel with a small tool. This does not necessarily need to be a hex socket, it could be a knob or handle integrated into (or separate from) the assembly, or some other means of actuating the internal mechanism. It could be a proprietary connector with matching tool, knob, or lever, etc. to restrict the ability to unlock and relock the plugstrip to authorized personnel. It could be a motor or solenoid driven locking mechanism controlled either locally (by a button or switch or secure key-actuated switch or secure digital authentication data fob or secure code keypad such as have been used for car doors, for example or digital passkeys, ID cards, or other suitable physical access control mechanisms) or a remotely controlled motor drive. The remote control could be accomplished via any suitable communications mechanism with or without security features as needed, for example over the Internet, an internal data network, via wireless network, (any of which could be implemented as a secure connection, using encryption, authentication, tokens, etc.) or any other suitable means.

A unique concept of the invention is the ability to lock or unlock all of the receptacles from attached plugs by a single, simple operation. In addition, the design allows for a predictable pull-out force (programmable release) to extract any attached plug, when the assembly is in the locked position. This may be necessary to meet Agency requirements, such as Underwriters Laboratories (UL). The design allows for a wide variation in manufactured tolerances of the attached plugs. In addition, the design of this assembly allows for lowered cost of manufacturing and higher reliability due to the simplicity of the design. This design can be adapted to a variety of plug types and is not limited to the example of NEMA type 5-15 plugs.

A key design feature of the locking assembly is a unique prong capture mechanism that can be assembled in any length with any number of capture points that will correspond to the number of receptacles the plugstrip is supplying. FIG. 26A outlines three basic components of each prong capture assembly. These assemblies will be located at each receptacle, in combination of at least one assembly per receptacle, but can, and will likely, be applied to every prong capture location of any one receptacle, as well as all of the receptacles. The assemblies must be kept separate for each of the electrical conductors for electrical isolation reason. The components shown in FIG. 26A are all metallic in nature and most likely be fabricated of a good conducting metal such as brass, beryllium copper, or other reasonably tensile strong material, but is not limited to those materials. The primary electrical prong receiver 4001 is shown at the left of the figure. It is comprised of a machine stamped and die-formed piece. The prong wipes 4010 are formed from the base stamped metal and are rolled inward in a manner commonly practiced in the industry to provide an aperture for the mating prong to enter and exit reasonably easily, but with very secure electrical connection to the mating prong. A hole in the stamping 4012 is located behind the electrical wipes 4010 to allow the prong of the mating connector to fully penetrate the assembly. An additional hole is punched in the metal 4011 just above the first hole. This hole 4011 will allow operational room for a spring of an additional component of the finished assembly. The second component of the grip assembly is the prong bearing stamping 4002 that performs the function of actually holding the inserted prong when actuated to do so. It is again an electrically conductive metal and must have some degree of brittleness. This is necessary since there is an integral spring 4017 formed into the stamping. While observing the side view of the component, it can be seen that the metal of the spring 4017 is deflected to the left in an arc. The purpose of this spring will be discussed later when the assembled components are described. In addition, a hole is stamped into this component 4015 that allows the prong of the mating plug to penetrate this stamping, without interference. A third component, the back-prong support 4003 is shown, and it is a simple stamping with a hole in it 4020 at the same relative location as on the prong receiver 4001 at the lower aperture 4012.

FIG. 26B shows an orthogonal view 4051 and a side view 4052 of the three aforementioned components 4001, 4002, 4003 into an assembly. It is now apparent why the hole 4011 was necessary in the prong receiver component 4001. The spring 4017 protrusion now has a place to be without interference. In this view, it can also be observed that the three lower apertures align to allow penetration by an engaging prong of a plug to be attached.

In FIG. 26C, an additional component is shown, the prong and a partial view of a representative plug with a single prong 4013 and is not part of the completed assembly of this invention but is used to clarify the function of the components in the process of locking the two pieces 4052, 4053 together. The representative plug and prong 4053 assembly is comprised of a prong 4017 and an insulating carrier 4020. It would be generally part of a three-prong plug assembly but could be a member of any combination of prongs. This system will work for any shape prong, simply by matching the shape of the apertures of the various sub-components to the desired prong to be captured. The prong receiver assembly 4052 is shown inside view and is comprised of the primary electrical prong receiver 4001, the prong bearing stamping 4002, and the back-prong support 4003. The electrical prong wipe 4010 is not yet engaged by the mating prong 4017 at this time.

FIG. 26D shows the electrical plug 4053 fully entered into the prong receiver assembly 4052. The aligned apertures of the three components 4001, 4002, 4003 allow the insertion of the prong 4017 through them and into the electrical wipes 4010. At this point, the three apertures are essentially aligned and allow the prong 4017 to pass freely through them. The spring 4017 is shown in the relaxed state.

In FIG. 26E, the prong bearing stamping 4002 is shown with force being applied in the down direction. The top of the aperture in this stamping is now bearing down on the top of the prong 4017. Concurrently, the bottoms of the apertures in primary electrical prong receiver 4001 and the prong bearing stamping 4002 are applying a counterforce in the opposite direction to the prong 4017 resulting in a shearing action. Since the relative strength of the prong is great, the shearing force only acts to capture the prong, and not damage it. The spring 4017 is represented as being compressed at this time. This allows a measurable range of motion for the prong bearing stamping 4002 after initial contact with the prong 4017. This is necessary as prong dimensions change from manufacturer to manufacturer, and the placement of multiple prong receivers in a line necessitate a means to compensate for minor manufacturing variances. This spring 4017 also serves to allow a predetermined level of force to be applied to the prong 4017 for a given range of vertical deflection of the prong bearing stamping 4002. At this point, the prong is captured and "locked".

FIG. 26F describes a plurality of the aforementioned prong receiver assemblies 4052 contiguously arranged in a linear configuration. All three components of the component 4052 are replicated in a row on a single set of three stampings. The final multiple prong capture assembly 4054 is comprised of three metallic components assembled together.

FIG. 26G illustrates three of the multiple prong capture assembly 4054 arranged beside each other in a manner that produces the aperture locations of each in compliance with the arrangement of prongs of a mating plug. This arrangement is not limited to three conductors, and variations including only one capture plate and two electrical wipe plates are only one example of the variations possible. At least one capture plate assembly is necessary to capture a plug. The assembly is the electrical conduction and capture subassembly 4055.

FIG. 26H represents one possible method of providing the force to the prong bearing stampings 4002. Note the hooked ends 4020 of the prong bearing stampings hooked around the edge of the cam plate 4022. When force is applied to the bearing hole 4023 of the cam plate 4022, the force will be transmitted to the three prong bearing stamping hooks 4020. The cam plate 4022 is shaped to allow some side-to-side motion of the plate with respect to the prong bearing stamping hooks 4020 to allow for the lateral action associated with the cam motion. The cam 4024 is held in position in bearings 4025 and is actuated by a receiving hex socket 4027 in this example instantiation. The cam 4024 and bearings 4025 are carried in a c-frame later described. When the cam 4024 is rotated via a tool inserted into the hex socket 4027, it rotates eccentrically about an axis of the bearings 4025. The eccentric motion is transmitted to the cam bearing 4002 and into the cam bearing receiver 4023, and hence to motion in the cam plate 4022. Since only a small deflection is necessary, the force amplification of the force applied to the tool (or knob or other means of turning the cam as previously discussed) is amplified many-fold, the force necessary to lock all the plugs is maintained at an easy to achieve level.

FIG. 26I shows the sub-assembly components, dielectric receptacle faces 4058, the electrical conduction and capture subassembly 4055, Cam actuator 4056, cam support c—frame 4057, dielectric separator 4059, and back housing 4050 of an assembled plugstrip 4040 (FIG. 26I). The end caps, cord assembly and electrical attachments are not shown, but are implied in a final assembly, and are attached by traditional means.

The invention has several novel features, among them: Locking and un-locking of all receptacles simultaneously, the spring can be manufactured with characteristics resulting in predictable pull-out tensions for captured plugs, any practical length and number of receptacles is possible from one actuation point, the profile area behind the receptacle face is absolute minimum, simple stampings allow lower cost assembly and manufacturing, and a simple twist operation, either by a tool or other means previously discussed, is all that is necessary to lock and un-lock the assembly.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for assembling an electrical cord connector body, comprising:
- providing first and second connector body housing portions formed from molded plastic, wherein said first and second connector body housing portions include first and second interface surfaces, respectfully, that are configured to butt against one another to define a housing interface;
- disposing a one or more electrical components on said first connector body housing portion;
- positioning said second connector body housing portion over said first connector body housing portion so that said first and second interface surfaces are in an aligned, butting relationship, wherein said positioning comprises aligning mating elements of said first and second connector body housing portions; and
- securing said first and second connector body housing portions together, wherein said securing comprises snapping together said first and second connector body housing portions.

2. A method as set forth in claim 1, wherein said one or more electrical components include connection contacts for forming an electrical connection between an electrical plug and an electrical outlet.

3. A method as set forth in claim 2, wherein said connection contacts comprise prongs of said electrical plug.

4. A method as set forth in claim 2, wherein said connection contacts comprise receptacle contacts of said electrical outlet.

5. A method as set forth in claim 1, wherein said one or more electrical components include a locking mechanism for selectively locking an electrical connection between first electrical connectors of said connector body and second electrical connectors of a meeting connector device.

6. A method as set forth in claim 1, wherein said one or more electrical components include a surge suppression circuit disposed on said electrical cord.

7. A method as set forth in claim 1, wherein said one or more electrical components include an automatic transfer switch.

8. A method as set forth in claim 1, wherein said first and second housing portions are provided as a single molded piece.

9. A method as set forth in claim 8, wherein said positioning comprises folding said molded piece so that said second connector body housing portion is positioned over said first connector body housing portion.

10. A method as set forth in claim 1, wherein each of said first and second connector body portions comprises a strain relief extension for engaging an electrical cord and said securing comprises forcing a compression member over the strain relief extensions of said first and second connector body portions such that said compression member secures together said first and second connector body portions.

11. A method as set forth in claim 10, further comprising providing a set of compression members sized to match different electrical cords and selecting said compression member based on a size of said electrical cord.

12. An electrical connector body, comprising:

a first connector body housing portion formed from molded plastic;

a second connector body housing portion formed from molded plastic wherein said first and second connector body housing portions include first and second interface surfaces, respectfully, that are configured to butt against one another to define a housing interface;

one or more alignment features, disposed at said housing interface, for assisting in aligning said first and second connector body housing portions for securing said housing portions together to form a housing;

structure for snapping together said first and second connector body housing portions; and one or more electrical components disposed within an interior of said housing.

13. An electrical connector body as set forth in claim 12, wherein said one or more electrical components include a locking mechanism for selectively locking an electrical connection between first electrical connectors of said connector body and second electrical connectors of a mating connector device.

14. An electrical connector body as set forth in claim 13, wherein said one or more electrical components include connection contacts for forming an electrical connection between an electrical plug and an electrical outlet.

15. An electrical connector body as set forth in claim 14, wherein said connection contacts comprise prongs of said electrical plug.

16. An electrical connector body as set forth in claim 14, wherein said connection contacts comprise receptacle contacts of said electrical outlet.

17. An electrical connector body as set forth in claim 13, wherein said one or more electrical components include a locking mechanism for selectively locking an electrical connection between first electrical connectors of said connector body and second electrical connectors of a meeting connector device.

18. An electrical connector body as set forth in claim 13, wherein said one or more electrical components include a surge suppression circuit disposed on said electrical cord.

19. An electrical connector body as set forth in claim 13, wherein said one or more electrical components include an automatic transfer switch.

20. An electrical connector body as set forth in claim 13, wherein said first and second housing portions are provided as a single molded piece.

21. An electrical connector body as set forth in claim 18, wherein said molded piece is configured to facilitate folding so that said second connector body housing portion is positioned over said first connector body housing portion.

22. An electrical connector body as set forth in claim 13, wherein each of said first and second connector body portions comprises a strain relief extension for engaging an electrical cord and said electrical connector body further comprises a compression member over disposed over the strain relief extensions of said first and second connector body portions such that said compression member secures together said first and second connector body portions.

23. An electrical connector body as set forth in claim 22, wherein said compression member is selected from a set of compression members based on a size of said electrical cord.

* * * * *